(12) United States Patent
Choi

(10) Patent No.: US 11,423,811 B2
(45) Date of Patent: Aug. 23, 2022

(54) DISPLAY DEVICE

(71) Applicant: LG ELECTRONICS INC., Seoul (KR)

(72) Inventor: Wuram Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 17/135,894

(22) Filed: Dec. 28, 2020

(65) Prior Publication Data

US 2021/0201715 A1    Jul. 1, 2021

(30) Foreign Application Priority Data

Dec. 27, 2019    (WO) ................ PCT/KR2019/018651

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,743,542 B2* | 8/2017 | Heo | .................. | G09F 9/301 |
| 9,760,975 B2* | 9/2017 | Kim | .................. | G02F 1/133305 |
| 9,772,657 B2 | 9/2017 | Takayanagi et al. | | |
| 9,844,152 B2* | 12/2017 | Heo | .................. | H05K 1/028 |
| 10,111,344 B2* | 10/2018 | Han | .................. | H05K 5/0017 |
| 10,162,387 B2 | 12/2018 | Takayanagi et al. | | |
| 10,201,103 B2* | 2/2019 | Kim | .................. | H04N 5/655 |
| 10,288,922 B2 | 5/2019 | Cho | | |
| 10,314,183 B2* | 6/2019 | Heo | .................. | G09F 9/301 |
| 10,347,160 B2 | 7/2019 | Takayanagi et al. | | |
| 10,362,690 B2* | 7/2019 | Han | .................. | H01L 51/524 |
| 10,390,443 B2* | 8/2019 | Kim | .................. | H05K 5/0217 |
| 10,506,726 B2* | 12/2019 | Kang | .................. | H05K 5/0247 |
| 10,531,582 B2* | 1/2020 | Park | .................. | G09F 9/301 |
| 10,534,402 B1* | 1/2020 | Kim | .................. | G09F 15/0062 |
| 10,537,026 B2* | 1/2020 | Shin | .................. | G06F 1/1605 |
| 10,582,628 B2* | 3/2020 | Kim | .................. | B65H 16/06 |
| 10,588,223 B2* | 3/2020 | Han | .................. | H05K 1/028 |
| 10,642,315 B2* | 5/2020 | Kim | .................. | H05K 1/189 |
| 10,687,428 B2* | 6/2020 | Kim | .................. | G09F 9/301 |
| 10,694,627 B2* | 6/2020 | Park | .................. | H05K 5/0017 |

(Continued)

FOREIGN PATENT DOCUMENTS

| | | |
|---|---|---|
| KR | 20160129668 | 11/2016 |
| KR | 20170006013 | 1/2017 |

(Continued)

*Primary Examiner* — Lisa Lea-Edmonds
(74) *Attorney, Agent, or Firm* — Lee Hong Degerman Kang & Waimey

(57) ABSTRACT

The present disclosure relates to a display device. The display device may include a flexible display panel configured to display an image, a panel roller, an outer circumferential surface of which is wound by the flexible display panel and in which a timing controller board is installed, and a pair of elastic assemblies respectively disposed at both ends of the panel roller to provide elastic force to the panel roller in a direction in which the flexible display panel is wound.

17 Claims, 68 Drawing Sheets

(56) References Cited

U.S. PATENT DOCUMENTS

| | | | |
|---|---|---|---|
| 10,765,021 B2* | 9/2020 | Shin | G01R 33/072 |
| 10,905,019 B2* | 1/2021 | Kim | B65H 16/06 |
| 10,973,136 B2* | 4/2021 | Park | H05K 5/0217 |
| 10,976,778 B2* | 4/2021 | Pyo | G09F 9/301 |
| 11,083,098 B2* | 8/2021 | Heo | G06F 1/1675 |
| 11,127,323 B2* | 9/2021 | Kim | G09F 9/301 |
| 11,229,128 B2* | 1/2022 | Kim | H05K 5/0017 |
| 11,246,227 B2* | 2/2022 | Han | G09F 9/301 |
| 11,262,803 B2* | 3/2022 | Pyo | G06F 1/1601 |
| 2013/0127799 A1 | 5/2013 | Lee | |
| 2016/0320804 A1 | 11/2016 | Takayanagi et al. | |
| 2016/0324021 A1 | 11/2016 | Takayanagi et al. | |
| 2017/0013726 A1 | 1/2017 | Han et al. | |
| 2017/0329369 A1 | 11/2017 | Takayanagi et al. | |
| 2019/0029131 A1 | 1/2019 | Han et al. | |
| 2019/0064578 A1 | 2/2019 | Cho | |
| 2019/0098776 A1 | 3/2019 | Jeon | |
| 2020/0068728 A1* | 2/2020 | Kang | G06F 1/1601 |
| 2020/0170129 A1 | 5/2020 | Han et al. | |
| 2021/0158727 A1* | 5/2021 | Choi | F16M 13/005 |
| 2021/0161023 A1* | 5/2021 | Pyo | H05K 5/0217 |
| 2021/0201714 A1* | 7/2021 | Kim | G09F 9/301 |
| 2021/0201715 A1* | 7/2021 | Choi | G06F 1/1652 |
| 2021/0201716 A1* | 7/2021 | Pyo | G06F 1/181 |
| 2021/0204427 A1* | 7/2021 | Pyo | H02K 11/22 |
| 2021/0204428 A1* | 7/2021 | Kim | H01L 51/5237 |
| 2021/0209973 A1* | 7/2021 | Pyo | G06F 1/181 |
| 2021/0272484 A1* | 9/2021 | Pyo | G06F 1/181 |
| 2021/0296932 A1* | 9/2021 | Lee | G09G 3/20 |
| 2021/0352809 A1* | 11/2021 | Kim | H02K 7/06 |
| 2022/0011620 A1* | 1/2022 | Lee | G06F 1/1637 |

FOREIGN PATENT DOCUMENTS

| | | |
|---|---|---|
| KR | 20190023908 | 3/2019 |
| KR | 20190036978 | 4/2019 |

\* cited by examiner

DISPLAY DEVICE

CROSS-REFERENCE TO RELATED APPLICATION

Pursuant to 35 U.S.C. § 119 (a), this application claims the benefit of an earlier filing date and right of priority to International Application No. PCT/KR2019/018651 filed on Dec. 27, 2019, the contents of which are hereby incorporated by reference herein in its entirety.

BACKGROUND

1. Field of the Invention

The present disclosure relates to a display device.

2. Description of Related Art

In the information society, there is a growing demand for display devices. In recent years, research into various types of display devices, such as liquid crystal displays (LCDs), plasma display panels (PDPs), electroluminescent displays (ELDs), and vacuum fluorescent displays (VFDs), has been performed, and a wide range of display devices have been used.

A display device using an organic light emitting diode (OLED) has an advantage over a liquid crystal display device in features such as luminance and viewing angles, and, since it requires no backlight unit, is implemented as a ultrathin display device.

A flexible display panel can be bent or wound around a roller. A rollable display device wound around or unwound from the roller when necessary can be implemented by using the flexible display panel. The structure, in which the flexible display panel is wound around or unwound from the roller, has been studied. In this case, the question is that the flexible display panel is wound around or unwound from the roller while ensuring a balance.

SUMMARY

The present disclosure is directed to a display device that may strike a balance between left and right sides of a flexible display panel when the flexible display panel is unwound from a panel roller.

Objectives of the present disclosure are not limited to the above-mentioned ones, and other objectives and advantages of the disclosure which are not mentioned can be understood from the following description, and more clearly understood from the embodiments of the disclosure.

It will be readily understood that the objectives and the advantages of the disclosure can be realized by means in the patent claims and combinations thereof.

A display device according to the present disclosure may include a flexible display configured to display an image, a panel roller an outer circumferential surface of which is wound by the flexible display and in which a timing controller board is installed, and a pair of elastic assemblies disposed respectively at both ends of the panel roller to provide elastic force to the panel roller in a direction in which the flexible display is wound.

Accordingly, when the flexible display is unwound from the panel roller and ready to display an image, tension in left and right areas of a display panel may be balanced, and a height of an upper end in the left and right areas of the display panel may be the same.

Each of the elastic assemblies may include a through hole, though which cables extending from the timing controller board in the panel roller pass, such that the cables extending from the timing controller board in the panel roller connect to the outside through both ends of the panel roller.

BRIEF DESCRIPTION OF DRAWINGS

The accompanying drawings constitute a part of this specification, illustrate one or more embodiments of the present disclosure, and together with the specification, explain the present disclosure, wherein.

DETAILED DESCRIPTION

Figure 1:
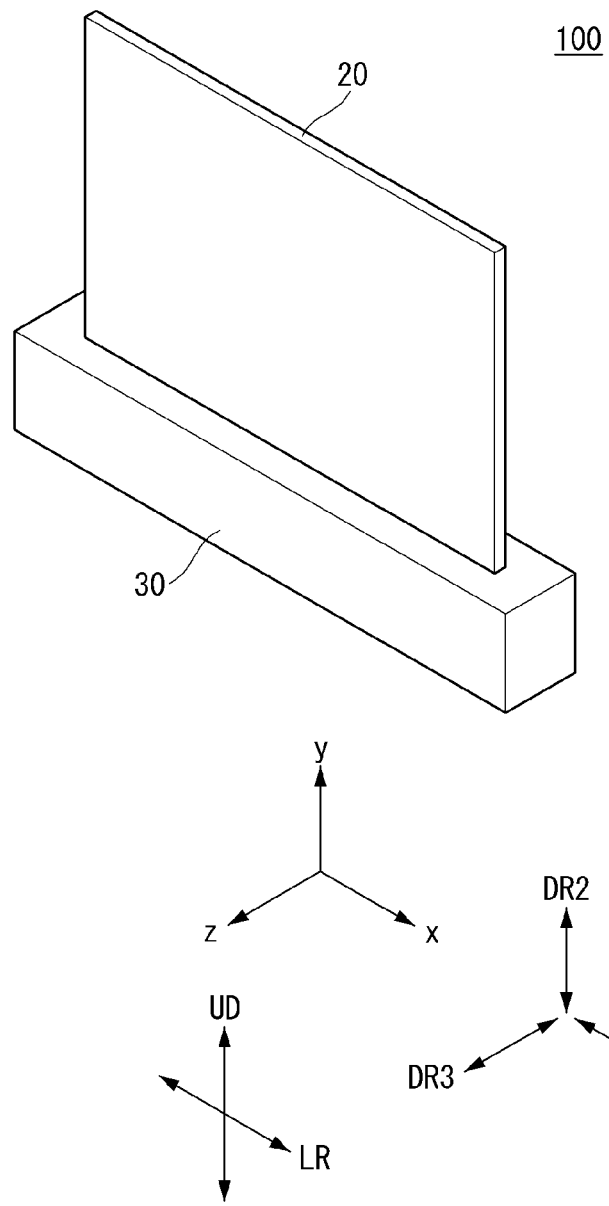
FIGS. 1 to 59 are views showing example display devices.

Below, embodiments are described with reference to the accompanying drawings. Through the present disclosure, like reference numerals denote like components, and repetitive description of the like components can be omitted.

In the following description, the terms "module", "unit" and the like are mixedly used only for ease of description, and are not intended to distinguish meanings or functions of the components.

In the description of the embodiments, the well-known technologies in relation to the subject matter of the disclosure are not described if they are deemed to make the gist of the disclosure unnecessarily vague. Additionally, the accompanying drawings are provided to help readers to better understand the embodiments herein and are not intended to limit the technical spirit in the disclosure. Further, all modifications, equivalents or replacements are construed as being included in the spirit and technical scope of the disclosure.

The terms "first", "second" and the like are used herein only to distinguish one component from another component. Thus, the components are not be limited by the terms.

When one component is described as being "connected", or "coupled" to another component, one component may be directly connected or directly coupled to another component; however, it is also to be understood that an additional component may be "interposed" between the two components, or the two components may be "connected", or "coupled" through an additional component. On the contrary, when any one component is "directly connected", or "directly coupled" to another component, any one component may be "connected", or "coupled" to another component without an additional component.

Throughout the disclosure, the singular forms "a", "an" and "the" are intended to include the plural forms as well, unless explicitly indicated otherwise.

In the following description, an embodiment is described with reference to a specific drawing. When necessary, reference numerals can be mentioned although they are not included in the drawing. The reference numerals, not included in the drawing, can be mentioned when they are included in the other drawings.

Referring to FIG. 1, a display device 100 may include a flexible display 20 and a housing 30. The housing 30 may form an inner space. At least a portion of the flexible display 20 may be inside the housing 30. At least a portion of the flexible display 20 may be outside the housing 30. The flexible display 20 may display a screen.

A direction parallel to a longitudinal direction of the housing 30 may be referred to as a first direction DR1, a +x-axis direction, a −x-axis direction, a left direction, or a right direction. A direction in which the flexible display 20 displays the screen may be referred to as a +z-axis direction, a forward direction, or a front direction. A direction opposite to the direction, in which the flexible display 20 displays the screen, may be referred to as a −z-axis direction, a rearward direction, or a rear direction. A third direction DR3 may be parallel to the +z-axis direction or the −z-axis direction. A direction parallel to a height direction of the display device 100 may be referred to as a second direction DR2, a +y-axis direction, a −y-axis direction, an upward direction, or a downward direction.

The third direction DR3 may be a direction perpendicular to the first direction DR1 and/or the second direction DR2. The first direction DR1 and the second direction DR2 may be collectively referred to as a horizontal direction, and the third direction DR3 may be referred to as a vertical direction. A left-right direction LR may be parallel to the first direction DR1, and an up-down direction UD may be parallel to the second direction DR2.

Figure 2:
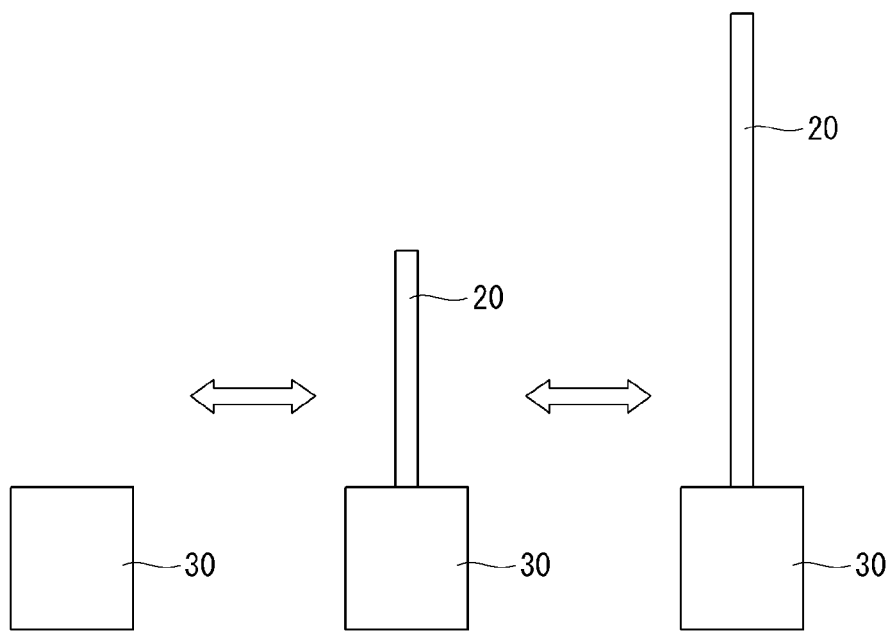

Referring to FIG. 2, an entire portion of the flexible display 20 may be inside the housing 30. At least a portion of the flexible display 20 may be outside the housing 30. A degree, to which the flexible display 20 is exposed to the outside of the housing 30, may be adjusted, when necessary.

Figure 3:
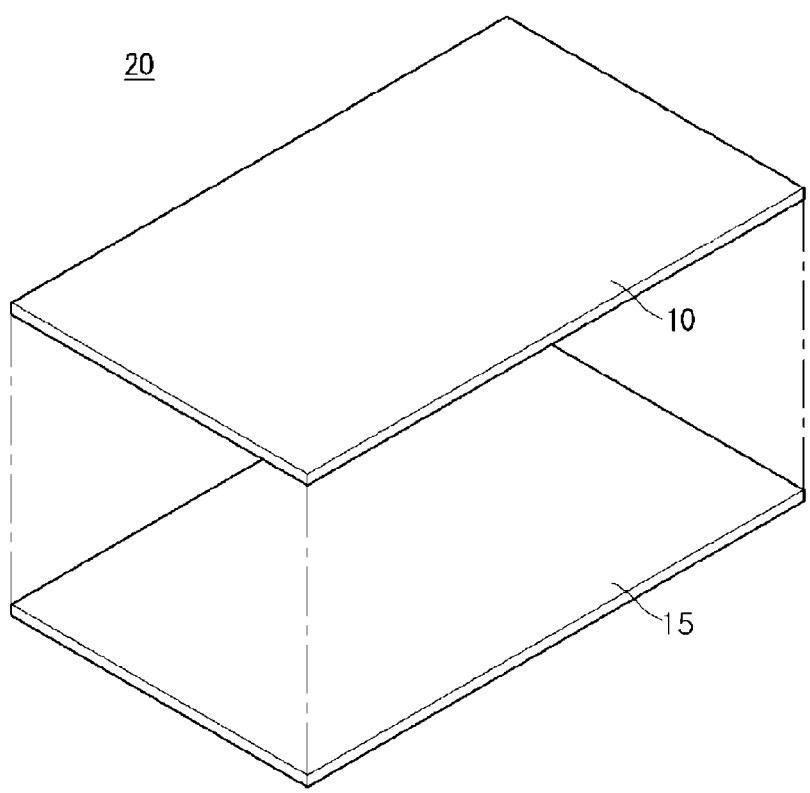

Referring to FIG. 3, the flexible display 20 may include a display panel 10 and a plate 15. The display panel 10 may be flexible. For example, the display panel 10 may be an organic light emitting diode (OLED) display panel.

The display panel 10 may have a front surface displaying an image. The display panel 10 may have a rear surface opposite the front surface. The front surface of the display panel 10 may be covered with a light transmission material. For example, the light transmission material may include a synthetic resin, or a film.

The plate 15 may be coupled, fastened, or attached to the rear surface of the display panel 10. The plate 15 may include a metallic material. The plate 15 may be referred to as a module cover 15, a cover 15, a display panel cover 15, a panel cover 15 or an apron 15.

Figure 4:
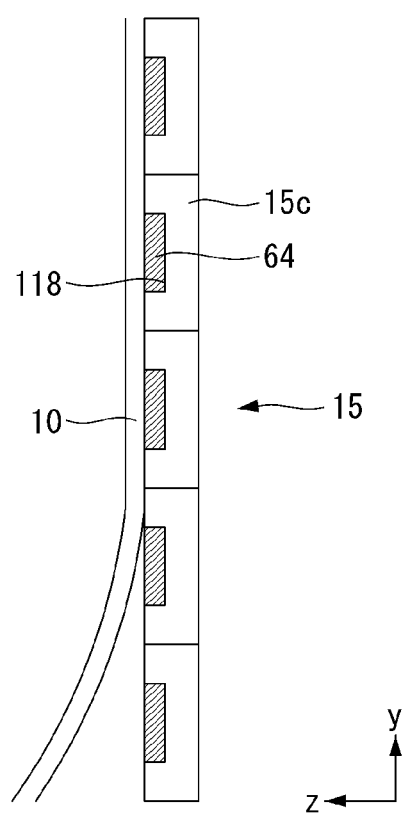

Referring to FIG. 4, the plate 15 may include a plurality of segments 15c. A magnet 64 may be disposed in a recess 118 of the segment 15c. The recess 118 may be disposed on a surface facing the display panel 10 of the segment 15c. The recess 118 may be disposed on the front surface of each of the segments 15c. The magnet 64 may not protrude out of the segment 15c because the magnet 64 is accommodated in the recess 118. Accordingly, the display panel 10 may be flat without being wrinkled although it comes into contact with the segment 15c.

Figure 5:
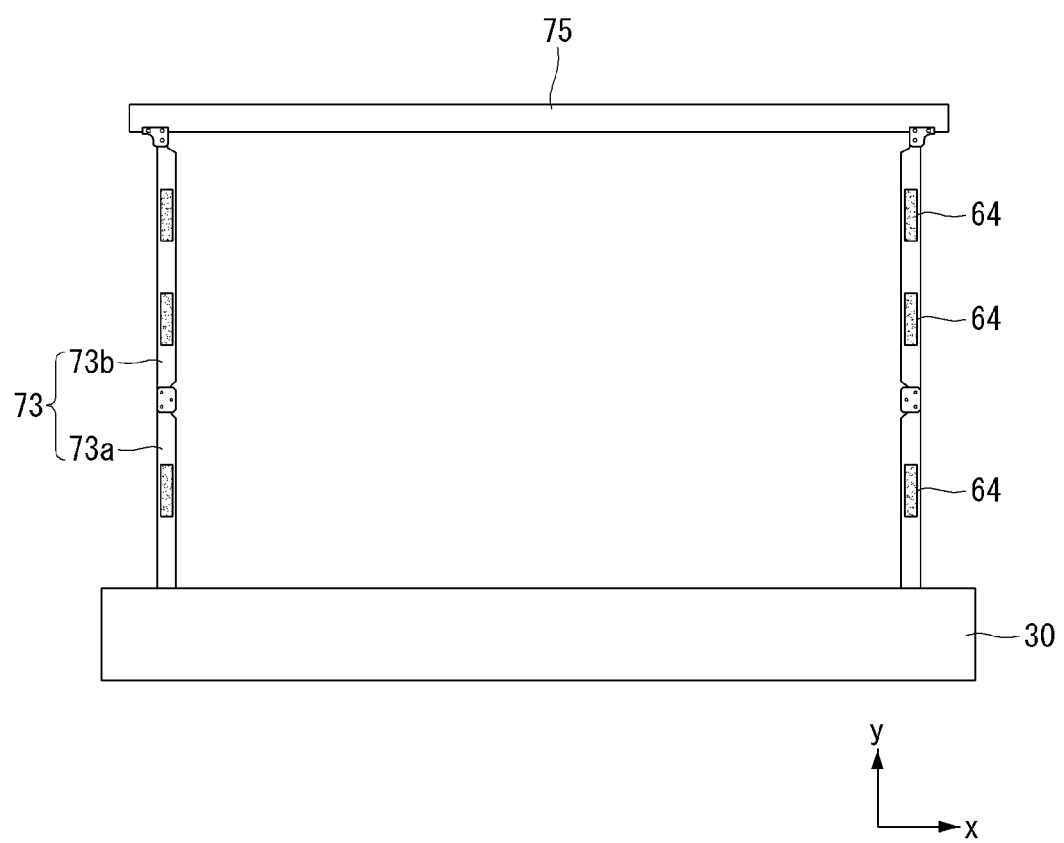

Referring to FIG. 5, a plurality of magnets 64 may be disposed on a link 73. For example, at least one magnet 64 may be disposed on a first arm 73a, and at least one magnet 64 may be disposed on a second arm 73b. The plurality of magnets 64 may be spaced apart from each other.

Figure 6:
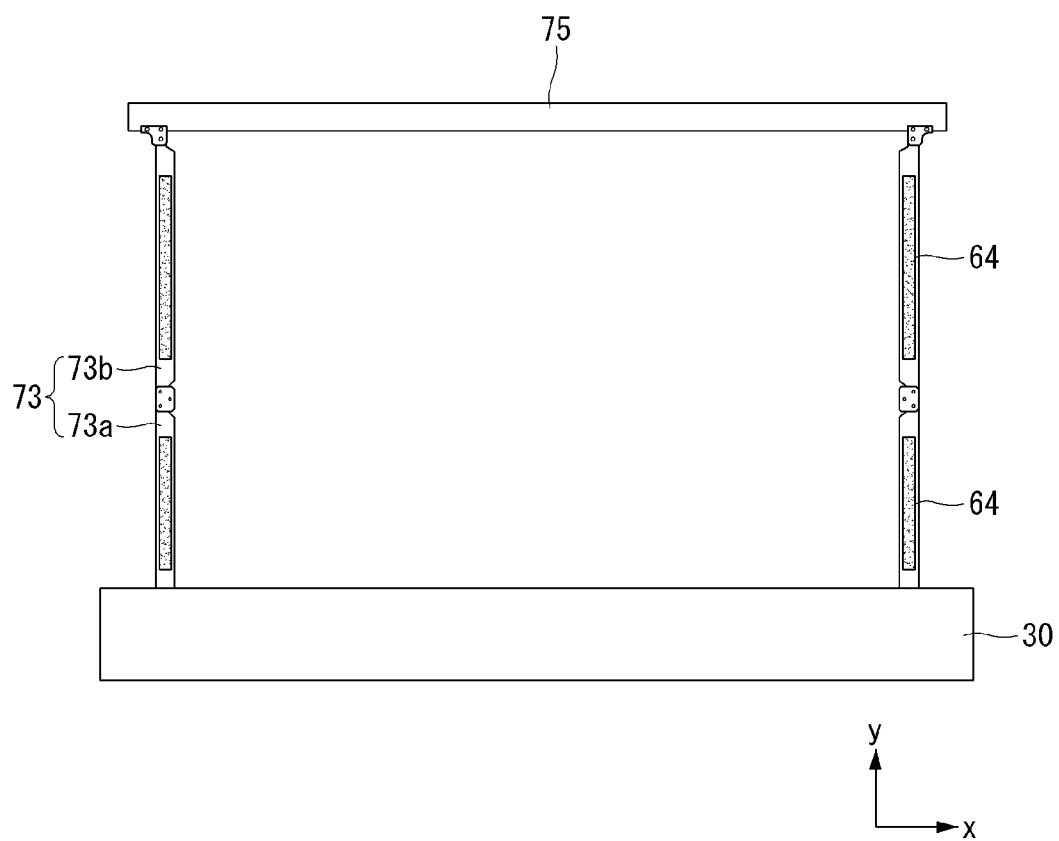

Referring to FIG. 6, a single magnet 64 may be disposed on each of the first arm 73a and the second arm 73b. In this case, the magnet 64 may have a shape that extends in a long-side direction of the first arm 73a and the second arm 73b. Since the magnet 64 has the shape that extends in the long-side direction of the first arm 73a and the second arm 73b, a surface area of a portion, where the link 73 closely adheres to the display panel and the module cover, may be increased. Accordingly, an adhesive force between the link 73 and the display panel and the module cover may be further increased.

Figure 7:
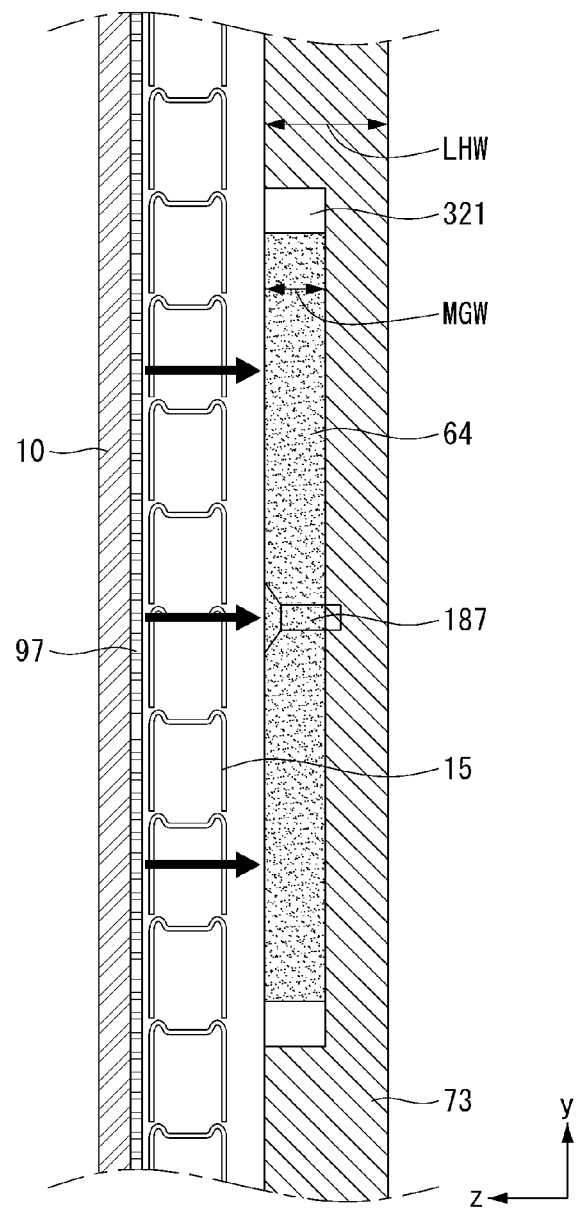

Referring to FIG. 7, the magnet 64 may be disposed in a depressed portion 321 formed on the link 73. The depressed portion 321 may have a shape depressed into the link 73. The magnet 64 may be combined with the link 73 by at least one screw 187.

A width LHW of the depressed portion 321 depressed into the link 73 may be the same as or greater than a thickness MGW of the magnet 64. When the thickness MGW of the magnet 64 is greater than the width LHW of the depressed portion 321, the display panel 10 and the module cover 15 may not closely adhere to the link 73. In this case, the display panel 10 may be wrinkled or may not be flat.

A panel protection portion 97 may be disposed on a rear surface of the display panel 10. The panel protection portion 97 may prevent damage done to the display panel 10, which is attributable to friction with the module cover 15. The panel protection portion 97 may include a metallic material. The panel protection portion 97 may have a very small thickness. For example, the panel protection portion 97 may have a thickness of about 0.1 mm.

Mutual attraction may act between the panel protection portion 97 and the magnet 64 because the panel protection portion 97 includes a metallic material. The module cover 15 disposed between the panel protection portion 97 and the link 73 may closely adhere to the magnet 64 although it does not include a metallic material.

Figure 8:
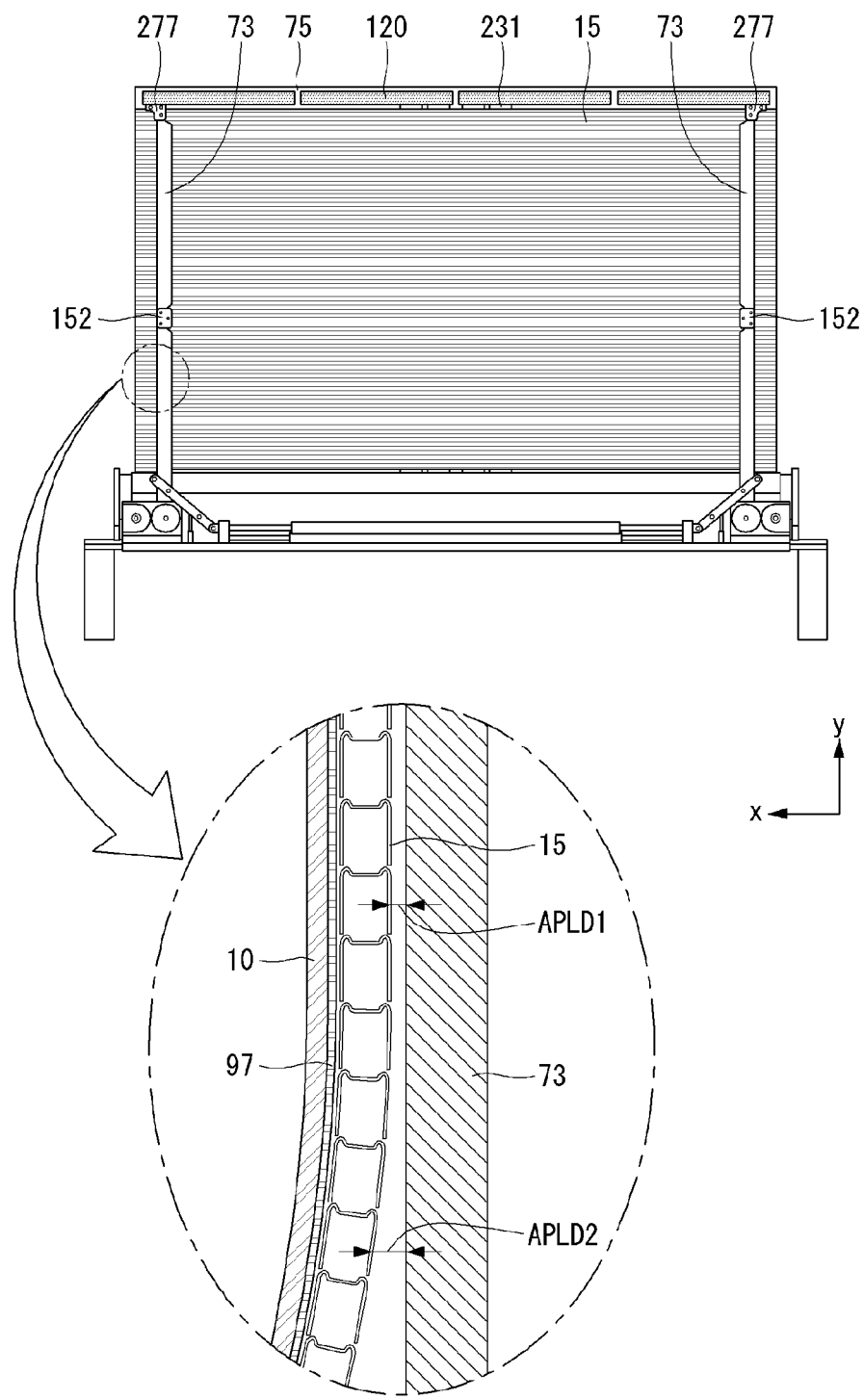

Referring to FIG. 8, the module cover 15 may closely adheres to the link 73 by an upper bar 75 on the upper side, and a guide bar (refer to 234 of FIG. 15) on the lower side. A portion of the link 73, positioned between the upper bar 75 and the guide bar 234, may not closely adhere to the module cover 15. Alternatively, a central part of the link 73 may not closely adhere to the module cover 15. The central part of the link 73 may be disposed near an arm joint 152. In this case, distances APRD1 and APLD2 between the module cover 15 and the link 73 may not be constant. In this case, the display panel 10 may be bent or curved.

Figure 9:
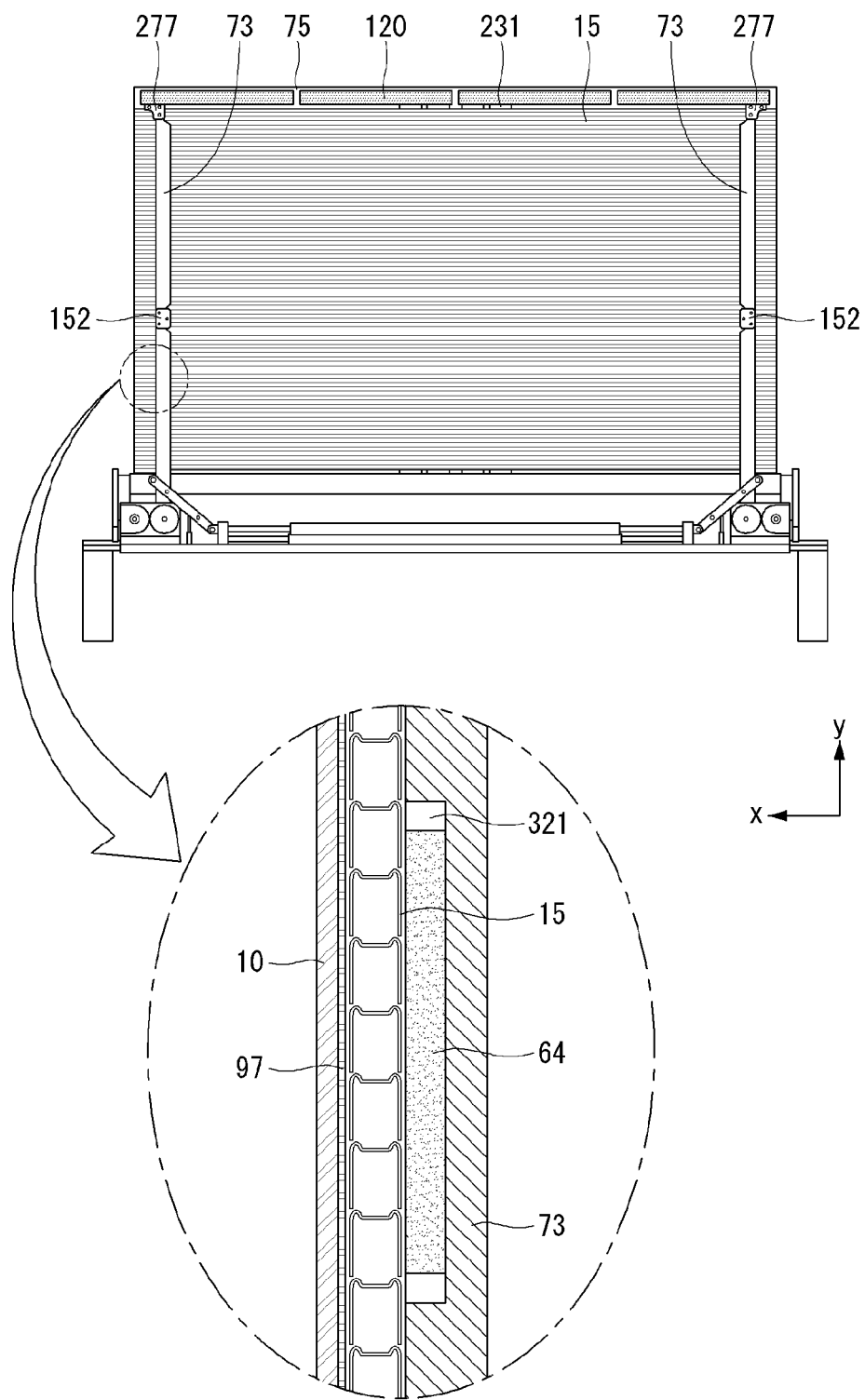

Referring to FIG. 9, when the magnet 64 is disposed on the depressed portion 321 of the link 73, the module cover 15 may also come into close contact with the magnet 64 because the magnet 64 attracts the panel protection portion 97. That is, the central part of the link 73 may closely adhere to the module cover 15.

Figure 10:
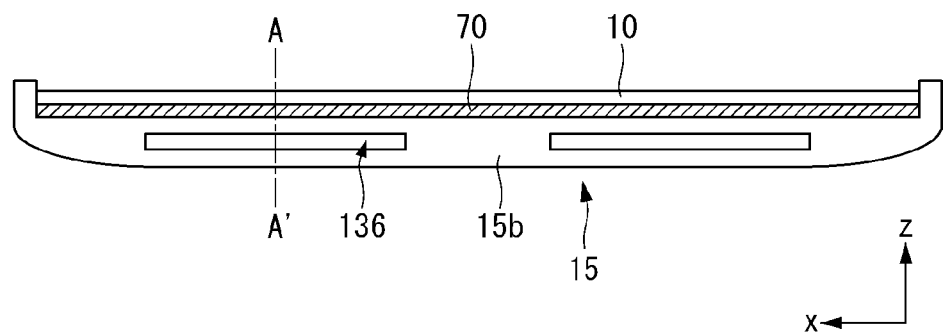
Figure 10:
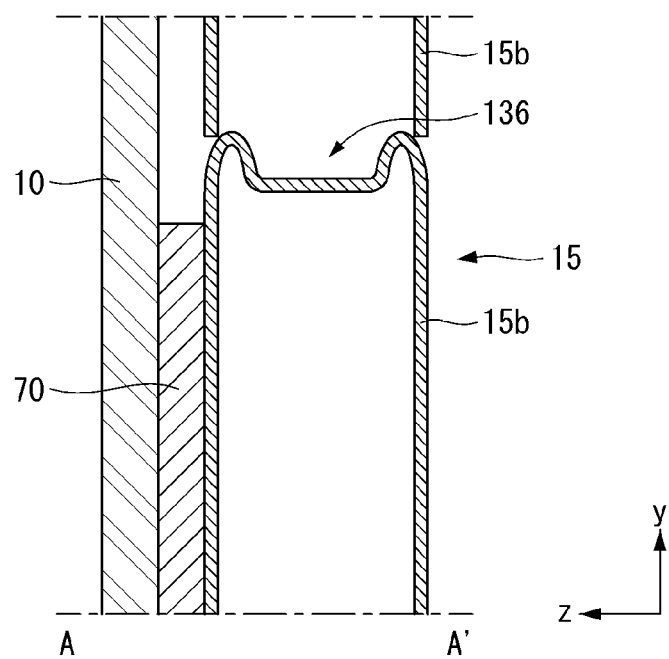

Referring to FIG. 10, a bead 136 may be formed on an upper surface of a segment 15b. The bead 136 may have a shape depressed into the segment 15b. The bead 136 may have a shape depressed in the −y-axis direction. For example, the bead 136 may be formed as a result of pressing of the segment 15b. A plurality of beads 136 may be formed on the segment 15b. The plurality of beads 136 may be spaced apart from each other. The bead 136 may improve stiffness of the segment 15b. The bead 136 may prevent deformation of the segment 15b, caused by an external impact.

Figure 11:
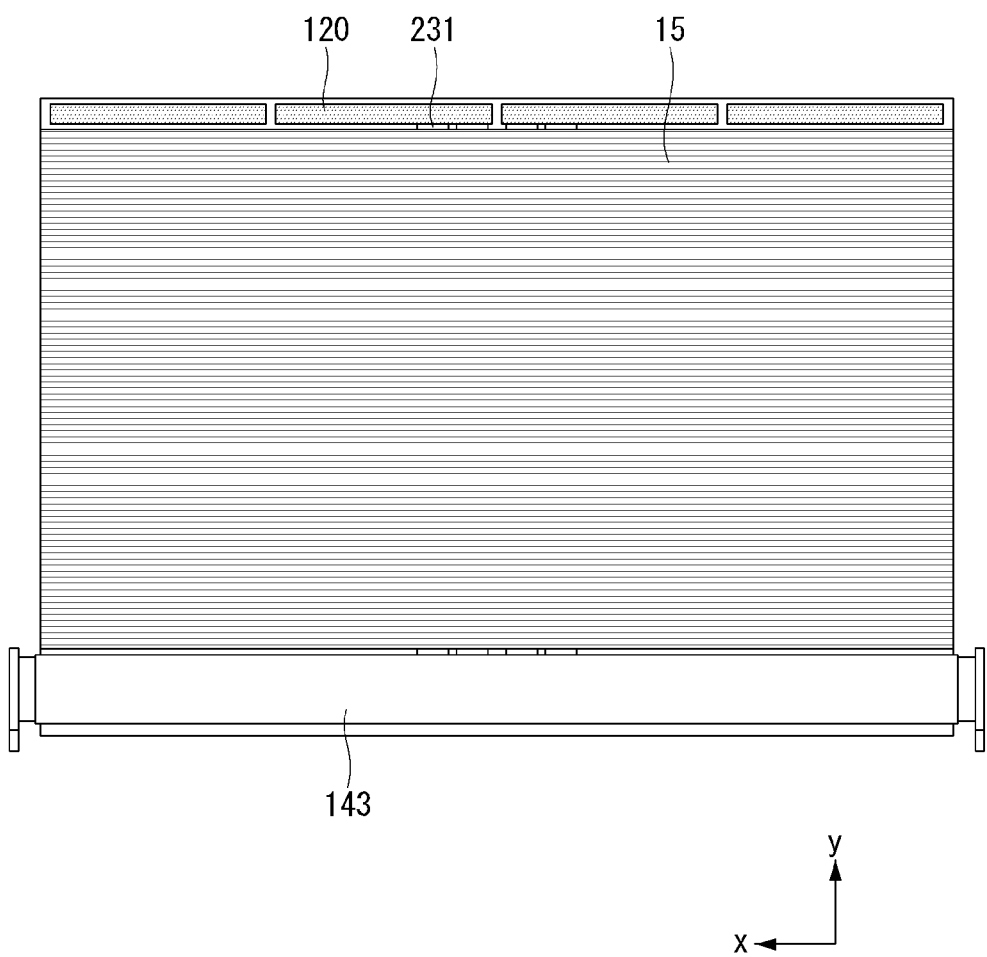

Referring to FIG. 11, a source PCB 120 may be disposed over the module cover 15. A position of the source PCB 120 may be changed as a result of movement of the module cover 15 when the source PCB 120 is rolled up or rolled down. The FFC cable 231 may be disposed at the central part of the module cover 15 with respect to the first direction or may be disposed at both ends of the module cover 15 with respect to the first direction.

Figure 12:
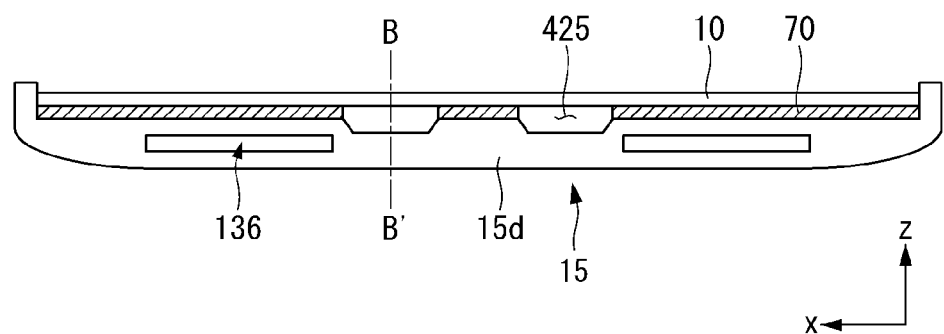
Figure 12:
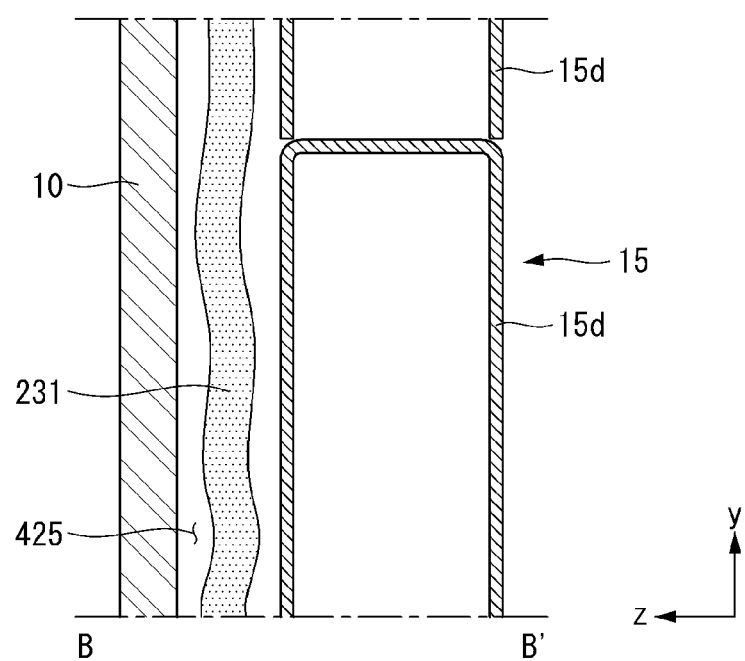

Referring to FIG. 12, a segment 15d may include a depressed portion 425 depressed in the −z-axis direction. The depressed portion 425 may form a space between the display panel 10 and the module cover 15. The FFC cable 231 may be accommodated in the space formed by the depressed portion 425. Further, the depressed portion 425 may improve stiffness of the segment 15d.

The bead 136 may be disposed on the segment 15d other than a portion where the depressed portion 425 is disposed. A bead 136 may not be disposed in the portion where the depressed portion 425 is disposed because a thickness of the segment 15d in the third direction is thin in the portion where the depressed portion 425 is disposed.

Figure 13:
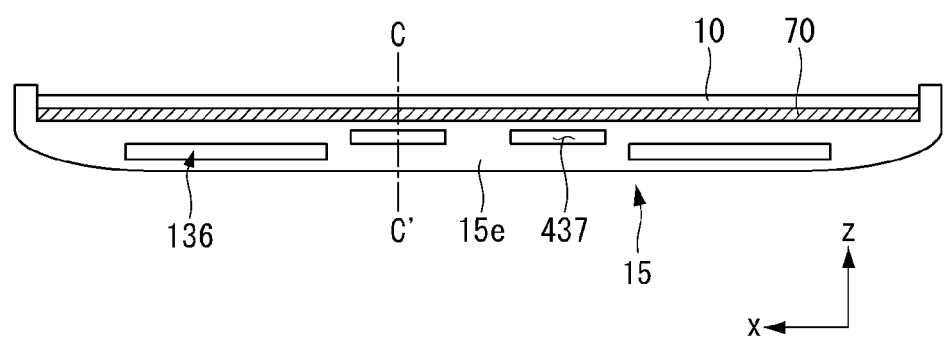
Figure 13:
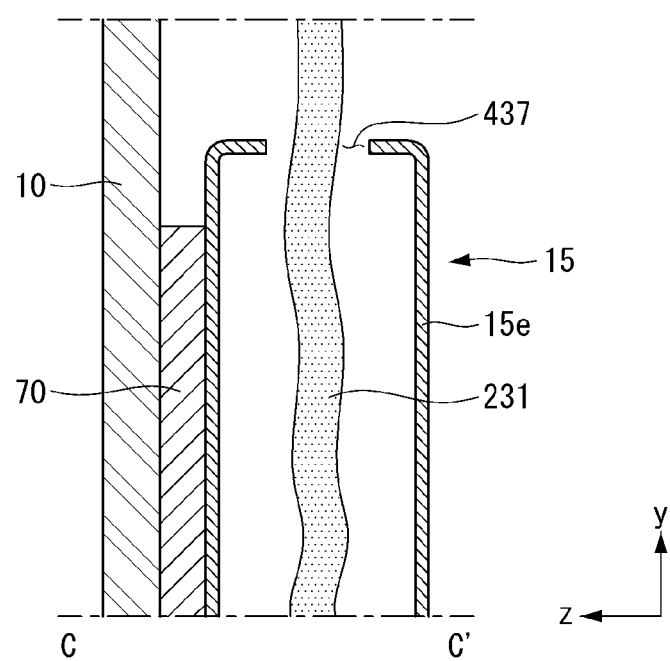

Referring to FIG. 13, a penetration portion 437 may be disposed at the central part of a segment 15e with respect to the first direction. The penetration portion 437 may pass through the central part of the segment 15e in the second direction. That is, the penetration portion 437 may be a hole disposed in the segment 15e. The penetration portion 437 may be a portion where the FFC cable 231 is disposed. A thickness of the segment 15e may be reduced compared to that of a segment where the FFC cable 231 is disposed in the depressed portion 425 because the penetration portion 437 is formed in the segment 15e.

The bead 136 may be disposed on the segment 15e other than the portion where the penetration portion 437 is disposed. The bead 136 may not be disposed in the portion where the penetration portion 437 is disposed because the thickness of the segment 15e in the third direction is thin in the portion where the penetration portion 437 is disposed.

Figure 14:
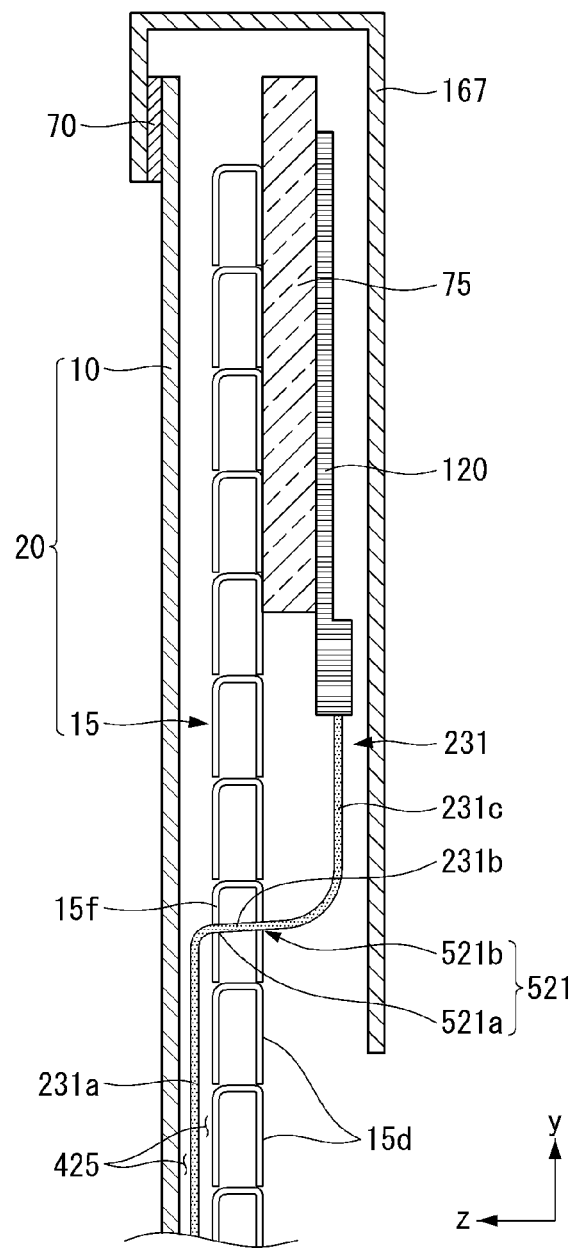

Referring to FIG. 14, a top case 167 may shield the source PCB 120 and the upper bar 75 in addition to the display panel 10 and the module cover 15. The upper bar 75 may have one side coupled to the rear surface of the module cover 15 and the other side coupled to the source PCB 120. The upper bar 75 may be fixed to the module cover 15 and may support the source PCB 120.

Figure 15:
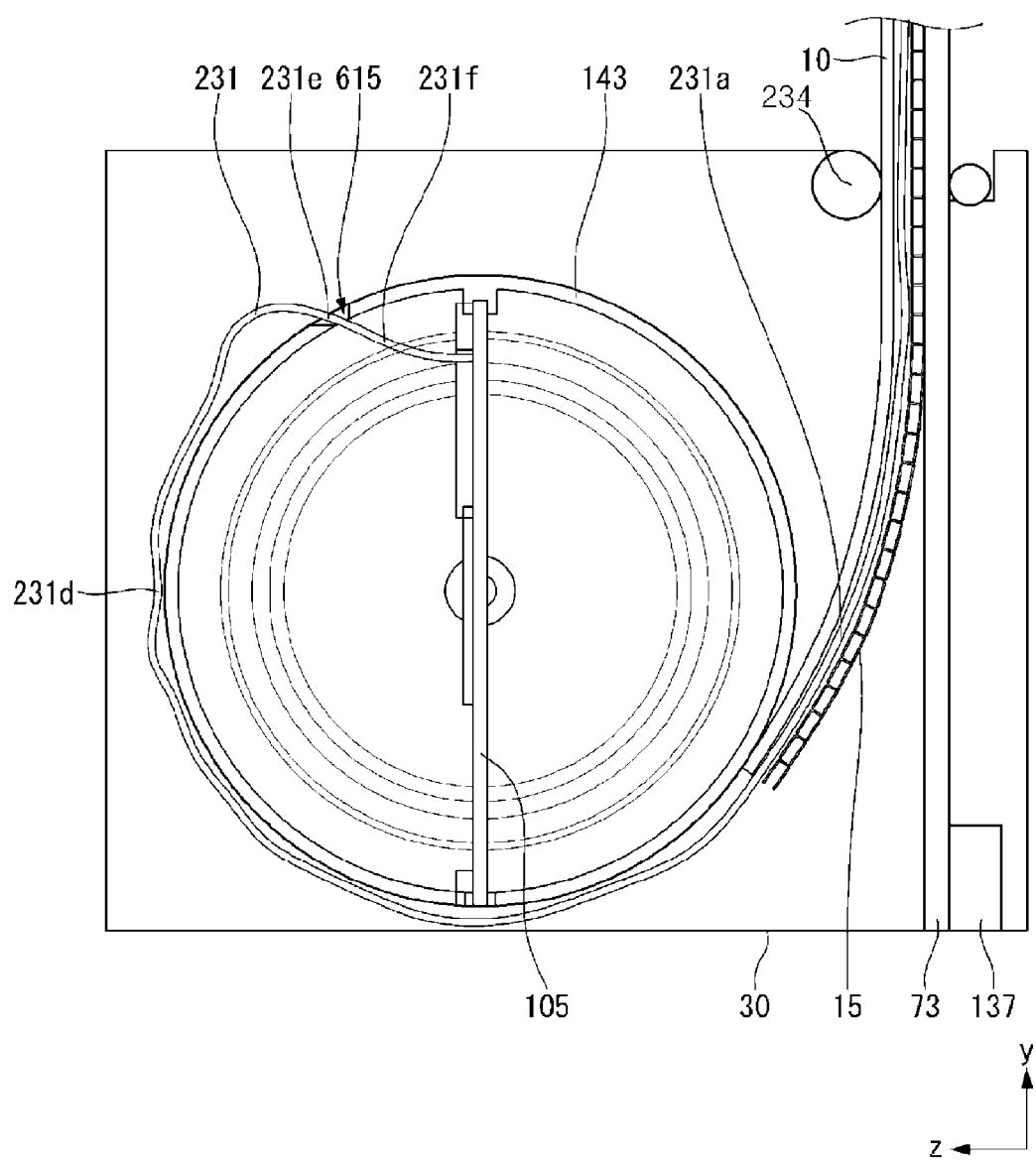

A lower end of the FFC cable 231 may be connected to a timing controller board 105 (see FIG. 15) in the panel roller 143 (see FIG. 15). The FFC cable 231, together with the flexible display 20, may be wound around or unwound from the panel roller 143.

A part of the FFC cable 231 may be disposed between the display panel 10 and the module cover 15. A portion of the FFC cable 231, positioned between the display panel 10 and the module cover 15, may be referred to as a first portion 231a. The first portion 231a may be disposed in the depressed portion 425 formed by the plurality of segments 15d. Alternatively, the first portion 231a may be accommodated in the depressed portion 425 formed by the plurality of segments 15d.

A part of the FFC cable 231 may pass through a segment 15f. A portion of the FFC cable 231, passing through the segment 15f, may be referred to as a second portion 231b. The segment 15f may include a first hole 521a formed on the front surface and a second hole 521b formed on the rear surface. The first hole 521a and the second hole 521b may be mutually connected to form a single hole 521. The hole 521 may pass through the segment 15f in the third direction.

The second portion 231b may pass through the hole 521. The hole 521 may also be referred to as a connecting hole 521.

An upper end of the FFC cable 231 may be electrically connected to the source PCB 120. A part of the FFC cable 231 may be disposed on the rear surface of the module cover 15. A portion of the FFC cable 231, disposed on the rear surface of the module cover 15, may be referred to as a third portion 201c. The third portion 231c may be electrically connected to the source PCB 120.

The third portion 231c may be shielded by the top case 167. Accordingly, the third portion 231c may not be exposed to the outside.

Referring to FIG. 15, the FFC cable 231 may be connected to the timing controller board 105 mounted on the panel roller 143. A through hole 615 may be disposed on the panel roller 143. The FFC cable 231 may be connected to the timing controller board 105 through the through hole 615.

The through hole 615 is disposed on one side of the panel roller 143, and may pass through an outer circumference of the panel roller 143. The FFC cable 231 may be connected to one side of the timing controller board 105 through the through hole 615.

Although the FFC cable 231 is disposed on the outer circumference of the panel roller 143, the FFC cable 231 may keep connecting with the timing controller board 105 through the through hole 615. Accordingly, the FFC cable 231 may not be twisted because it rotates along with the panel roller 143.

A part of the FFC cable 231 may be wound around the panel roller 143. A portion of the FFC cable 231, wound around the panel roller 143, may be referred to as a fourth portion 231d. The fourth portion 231d may contact an outer circumferential surface of the panel roller 143.

A part of the FFC cable 231 may pass through the through hole 615. A portion of the FFC cable 231, passing through the through hole 615, may be referred to as a fifth portion 231e.

A lower end of the FFC cable 231 may be electrically connected to the timing controller board 105. A part of the FFC cable 231 may be disposed in the panel roller 143. A portion of the FFC cable 231, disposed in the panel roller 143, may be referred to as a sixth portion 231f. The sixth portion 231f may be electrically connected to the timing controller board 105.

Figure 16:
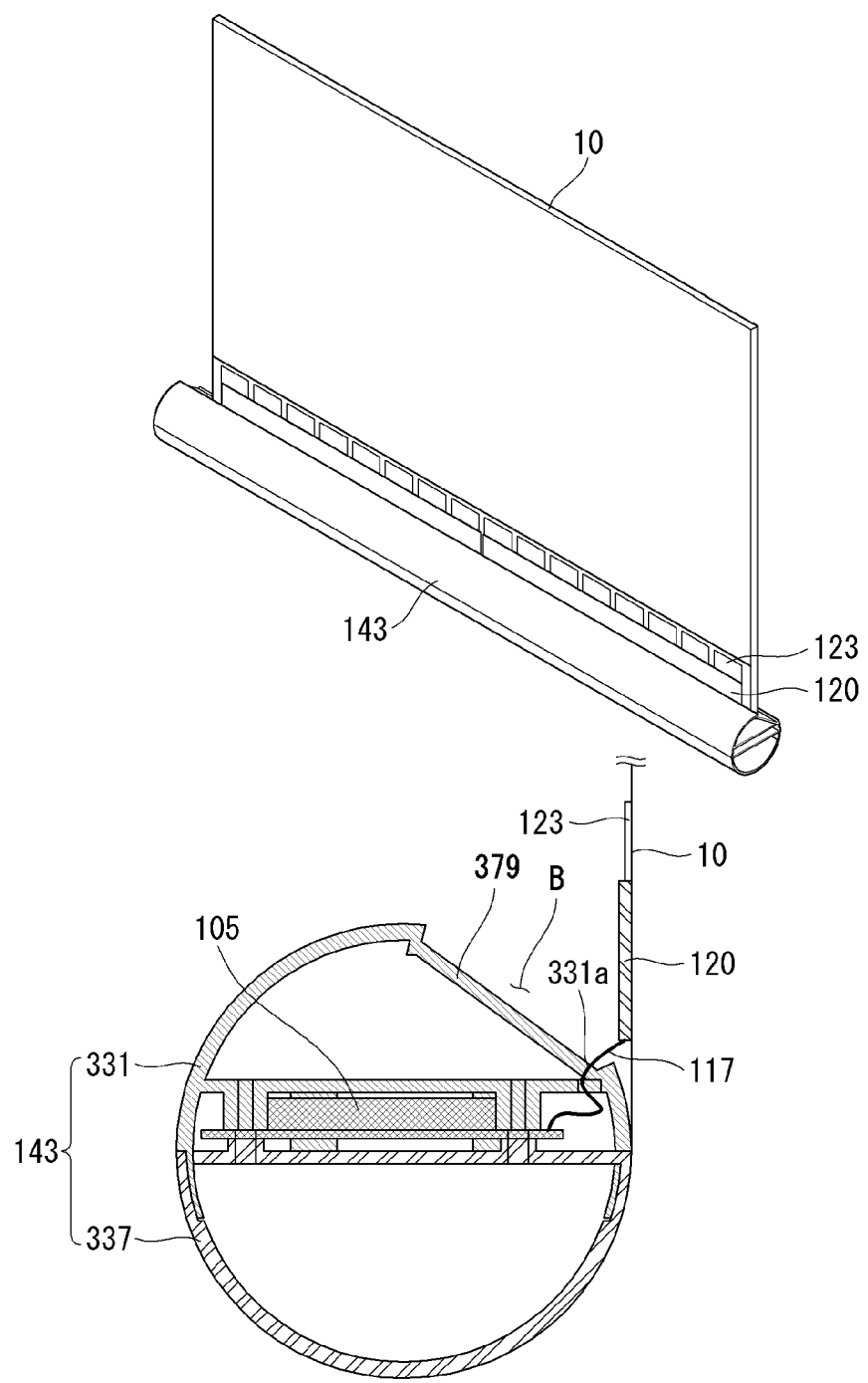

Referring to FIG. 16, a lower end of the display panel 10 may be connected to the roller 143. The display panel 10 may be wound around or unwound from the roller 143. The front surface of the display panel 10 may be coupled to a plurality of source printed circuit boards (PCBs) 120. The plurality of source PCBs 120 may be spaced from each other.

A source chip-on film (COF) 123 may connect the display panel 10 to the source PCBs 120. The source COF 123 may be disposed on the front surface of the display panel 10. The roller 143 may include a first part 331 and a second part 337. The first part 331 and the second part 337 may be fastened by a screw. The timing controller board 105 may be mounted in the roller 143.

The source PCBs 120 may be electrically connected to the timing controller board 105. The timing controller board 105 may transmit digital video data and timing control signals to the source PCBs 120.

Cables 117 may electrically connect the source PCBs 120 to the timing controller board 105. For example, the cable 117 may be a flexible flat cable (FFC). The cable 117 may pass through a hole 331a. The hole 331a may be formed in a seating portion 379 or the first part 331. The cable 117 may be disposed between the display panel 10 and the second part 337.

The seating portion 379 may be formed on an outer circumference of the first part 331. To form the seating portion 379, a portion of the outer circumference of the first part 331 may be stepped. The seating portion 379 may form a space B. When the flexible display 20 is wound around the roller 143, the source PCBs 120 may be accommodated in the seating portion 379. Because the source PCBs 120 are accommodated in the seating portion 379 as described above, the source PCBs 120 may not be bent, and durability of the source PCBs 120 may be improved.

The cables 117 may electrically connect the timing controller board 105 to the source PCBs 120.

Figure 17:
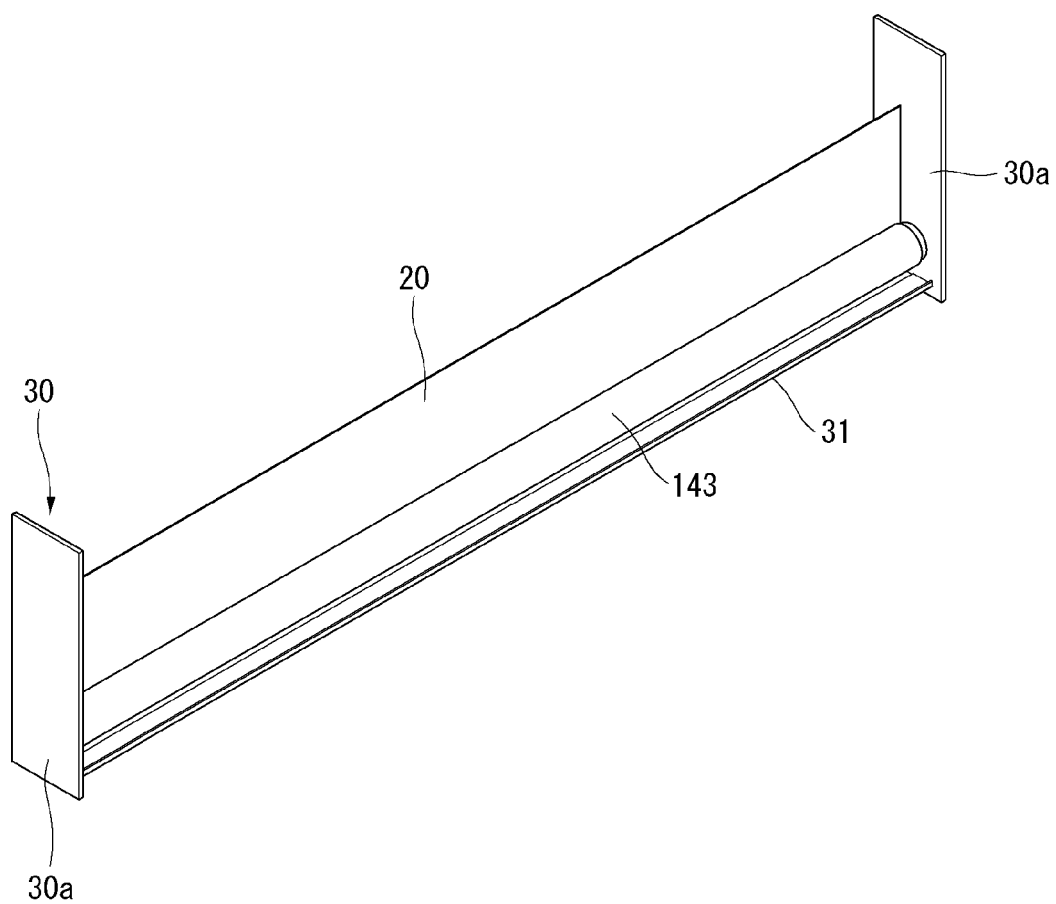

Referring to FIG. 17, the roller 143 around which the flexible display 20 is wound may be mounted on a first base 31. The first base 31 may be a base of the housing 30. The roller 143 may be extended along a longitudinal direction of the housing 30. The first base 31 may be connected to a side 30a of the housing 30.

Figure 18:
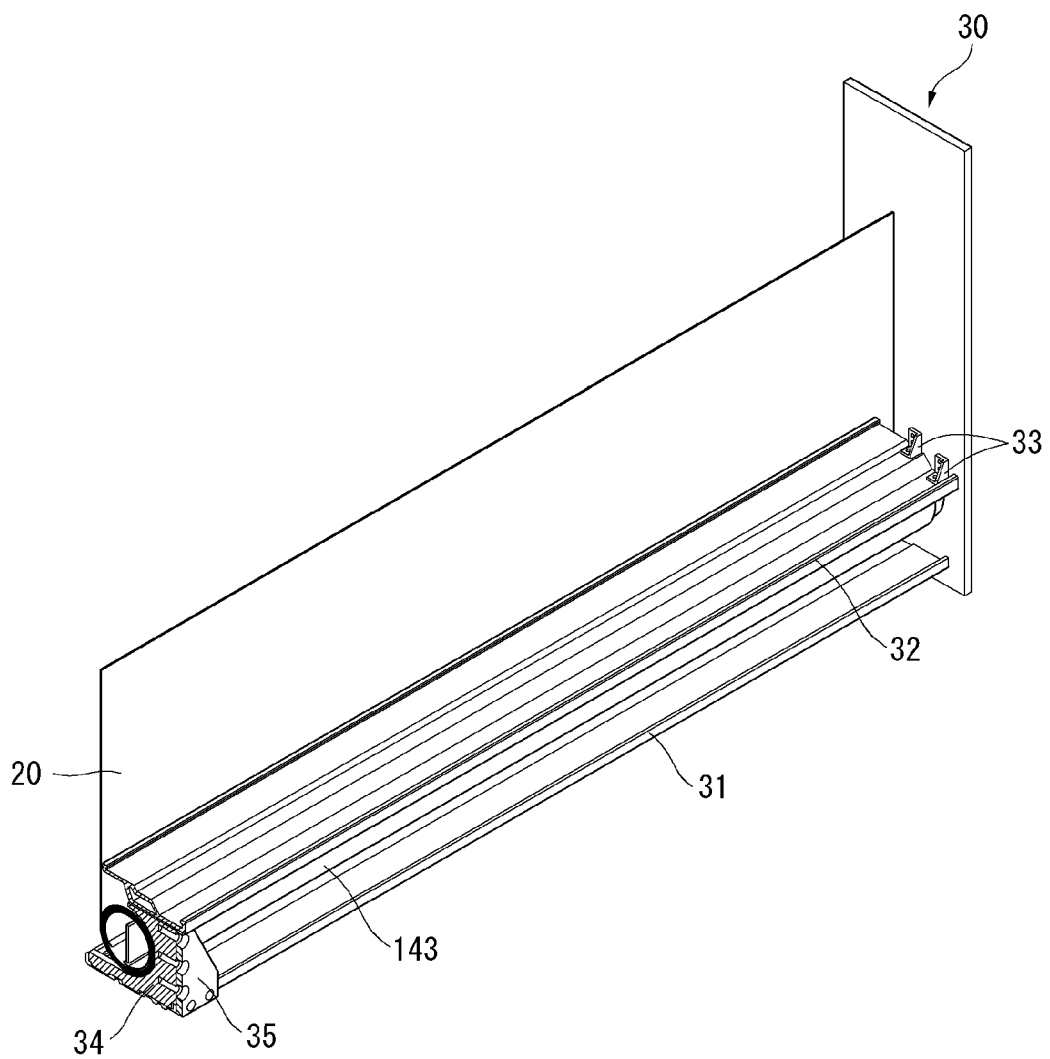
Figure 19:
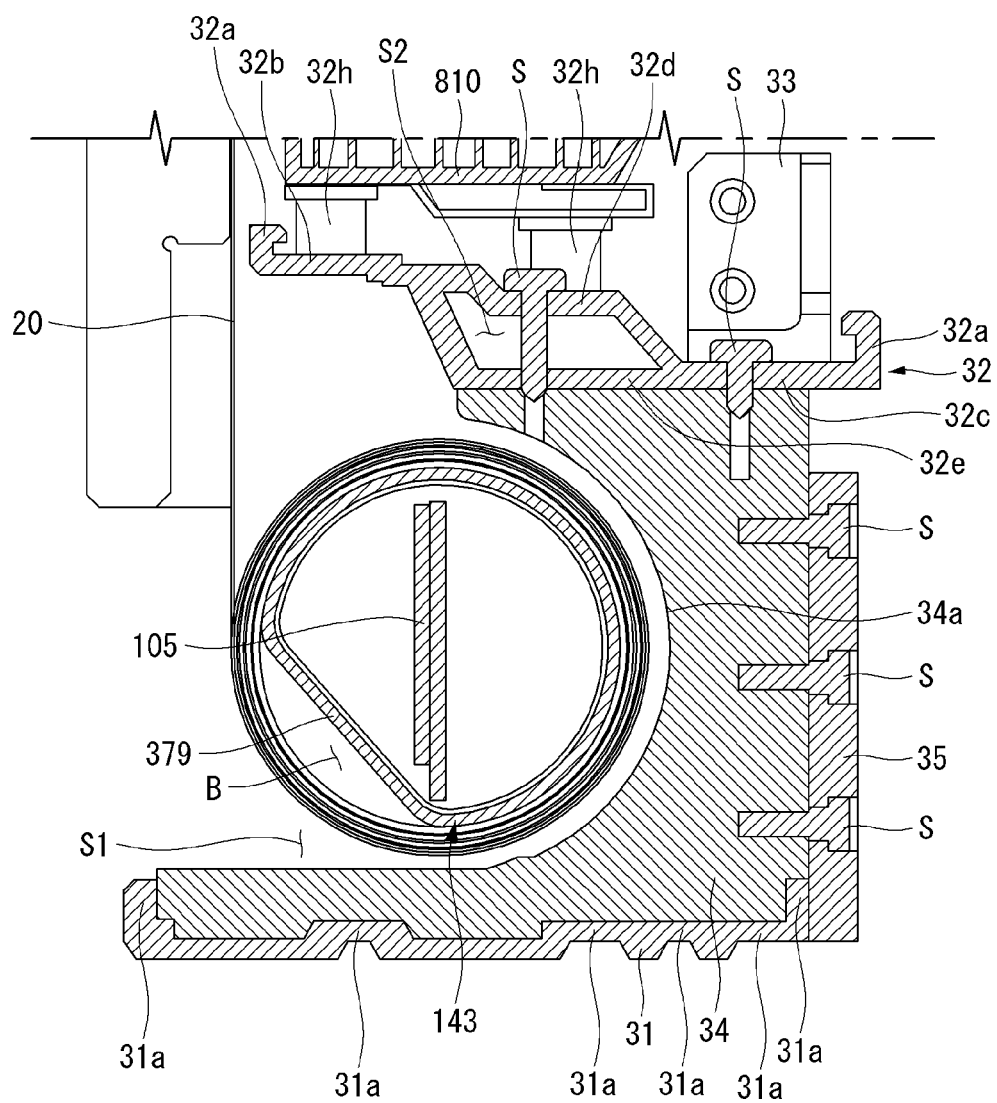

Referring to FIGS. 18 and 19, a beam 31a may be formed on the first base 31. The beam 31a may improve bending stiffness or torsional stiffness of the first base 31. A large number of components may be mounted on the first base 31, and a large load may be applied to the first base 31. However, because the stiffness of the first base 31 is improved as described above, the first base 31 may be prevented from hanging down due to the load. The beam 31a may be formed through a pressing process.

A second base 32 may be spaced from an upper side of the first base 31. A space S1 may be formed between the first base 31 and the second base 32. The roller 143 around which the flexible display 20 is wound may be accommodated in the space S1. The roller 143 may be disposed between the first base 31 and the second base 32.

The second base 32 may be connected to the side 30a of the housing 30. A bracket 33 may be fastened to an upper surface of the first base 31. The bracket 33 may be fastened to the side 30a of the housing 30.

A beam 32a may be formed on the second base 32. The beam 32a may improve bending stiffness or torsional stiffness of the second base 32. The beam 32a may be formed through a press process.

A third part 32d may be connected to a first part 32b and a second part 32c. A fourth part 32e may be connected to the first part 32b and the second part 32c. A space S2 may be formed between the third part 32d and the fourth part 32e. Accordingly, bending stiffness or torsional stiffness of the second base 32 may be improved. The third part 32d may be referred to as a reinforcing rib 32d or a rib 32d. The fourth part 32e may be referred to as a reinforcing rib 32e or a rib 32e.

A large number of components may be mounted on the second base 32, and a large load may be applied to the second base 32. However, because the stiffness of the second base 32 is improved as described above, the second base 32 may be prevented from hanging down due to the load.

A first reinforcing plate 34 may be disposed between the first base 31 and the second base 32. The first reinforcing plate 34 and the second base 32 may be fastened to each other by a screw. The first reinforcing plate 34 may support the second base 32. The first reinforcing plate 34 may prevent the second base 32 from hanging down. The first reinforcing plate 34 may be disposed in a central portion of the first base 31 or a central portion of the second base 32. The first reinforcing plate 34 may include a curved portion 34a. The curved portion 34a may be formed along the roller 143. The curved portion 34a may not contact the roller 143 or the flexible display 20 wound around the roller 143. The curved portion 34a may be spaced a predetermined distance from the roller 143 by so that it does not interfere with rotation of the roller 143.

A second reinforcing plate 35 may be fastened to the first base 31 and the first reinforcing plate 34. The second reinforcing plate 35 may support the first reinforcing plate 34. The second reinforcing plate 35 may be disposed at a rear of the first reinforcing plate 34. The second reinforcing plate 35 may be disposed at a rear of the first base 31. The second reinforcing plate 35 may be disposed in a direction perpendicular to the first base 31. The second reinforcing plate 35 may be fastened to the beam 31a of the first base 31. The second base 32 may face a front surface or a rear surface of the housing 30.

Figure 20:
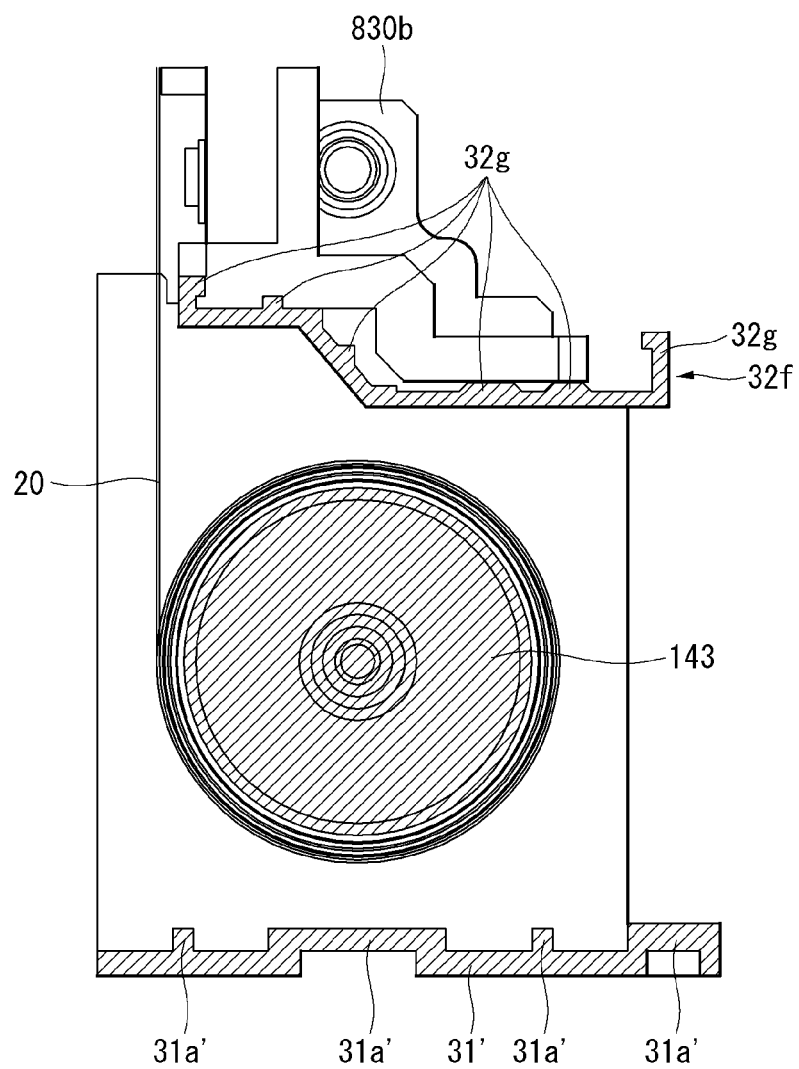

Referring to FIG. 20, a second base 32f may not form a space. When a load applied to the second base 32f is not large, the second base 32f may have sufficient stiffness due to a beam 32g included in the second base 32f. A first base 31' may include a beam 31a'.

Figure 21:
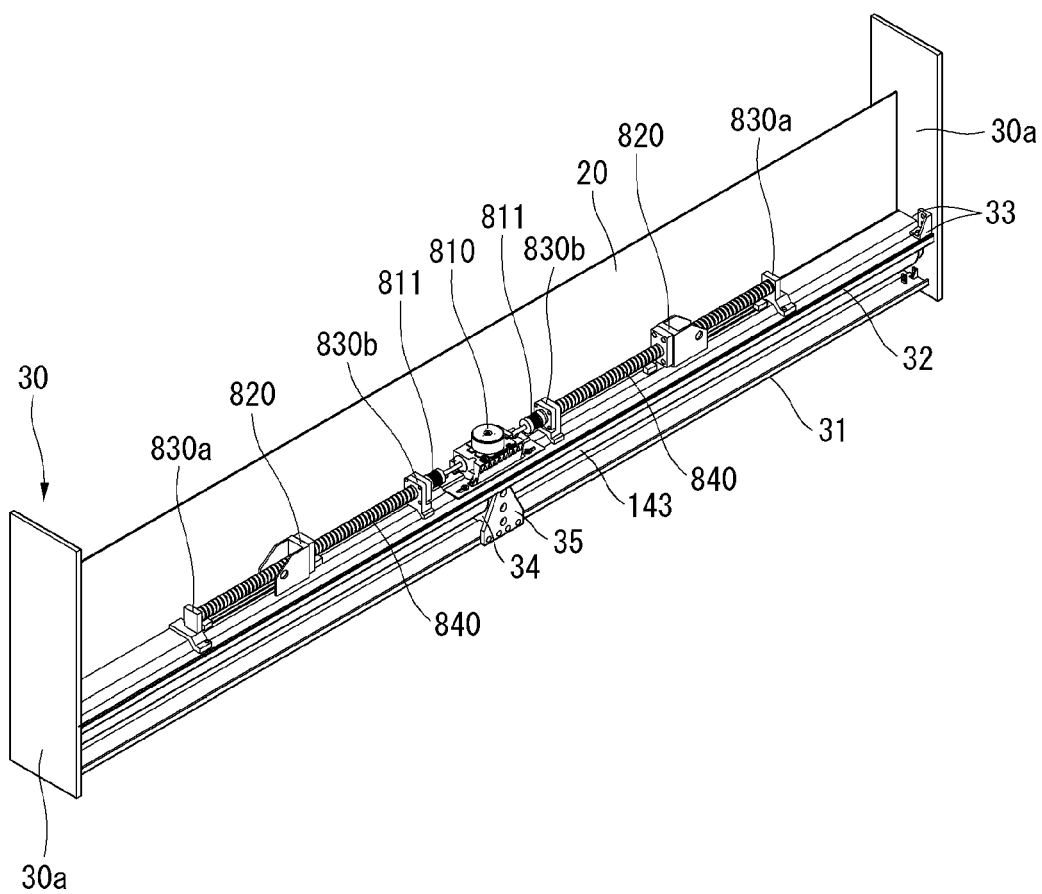
Figure 22:
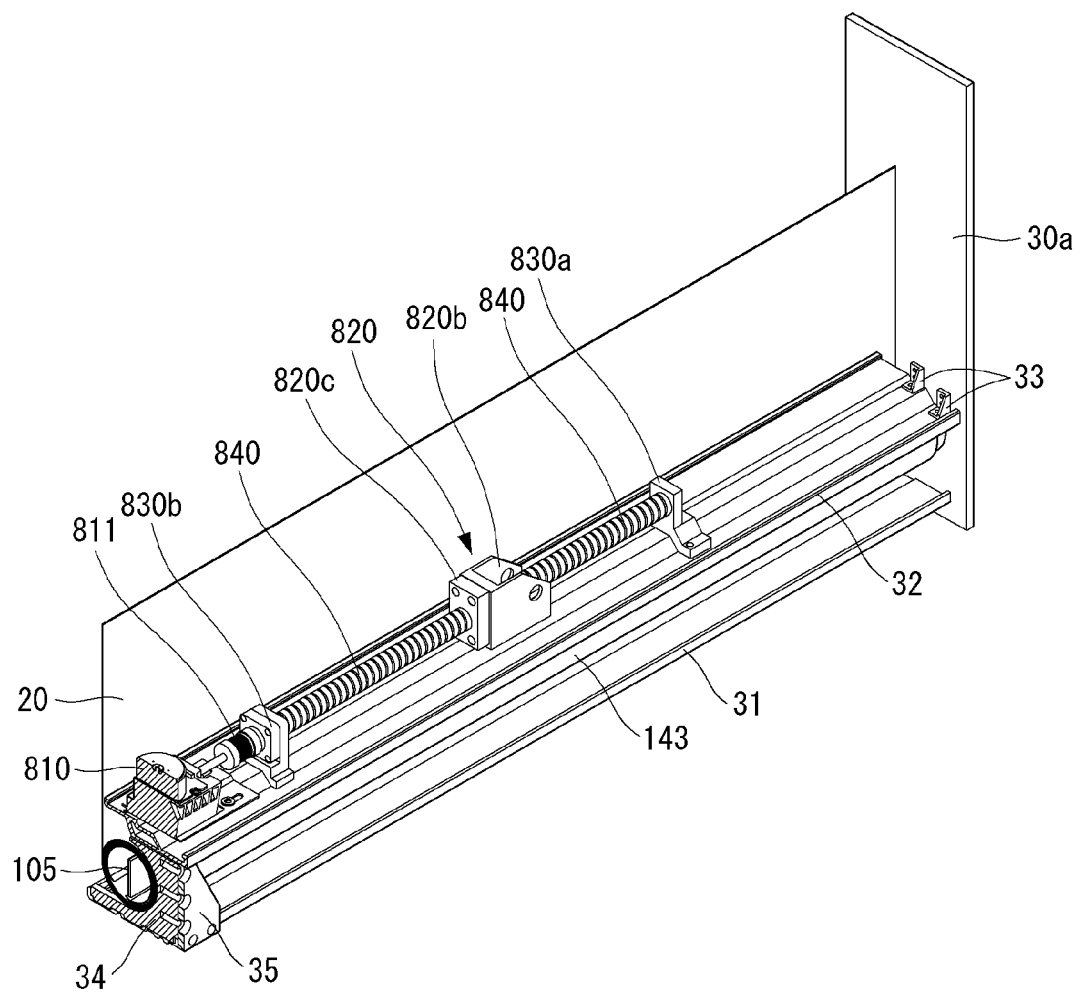

Referring to FIGS. 21 and 22, a motor assembly 810 may be mounted on the second base 32. A driving shaft of the motor assembly 810 may be formed on both sides. A right driving shaft and a left driving shaft of the motor assembly 810 may rotate in the same direction. Alternatively, the right driving shaft and the left driving shaft of the motor assembly 810 may rotate in opposite directions.

The motor assembly 810 may include a plurality of motors. The plurality of motors may be connected to one another in series. The motor assembly 810 may output high torque because the plurality of motors is connected to one another in series.

A lead screw 840 may be disposed on each of left and right sides of the motor assembly 810. The motor assembly 810 may be connected to the lead screw 840. A coupling 811 may connect the lead screw 840 to the driving shaft of the motor assembly 810.

The lead screw 840 may be threaded along its longitudinal direction. A direction of screw threads provided on the right lead screw 840 and a direction of screw threads provided on the left lead screw 840 may be opposite to each other. Alternatively, the direction of the screw threads of the right lead screw 840 and the direction of the screw threads of the left lead screw 840 may be the same. A pitch of the left lead screw 840 and a pitch of the right lead screw 840 may be the same.

Bearings 830a and 830b may be mounted on the second base 32. The bearings 830a and 830b may support both sides of the lead screw 840. The bearings 830a and 830b may include an inner bearing 830b near the motor assembly 810 and an outer bearing 830a away from the motor assembly 810. The lead screw 840 may be stably rotated by the bearings 830a and 830b.

A slide 820 may be engaged with the lead screw 840. The slide 820 may move forward and backward along the longitudinal direction of the lead screw 840 as a result of rotation of the lead screw 840. The slide 820 may move between the outer bearing 830a and the inner bearing 830b. The slide 820 may be disposed on the left lead screw 840 and the right lead screw 840, respectively. The left slide 820 may be engaged with the left lead screw 840, and the right slide 820 may be engaged with the right lead screw 840.

The left slide 820 and the right slide 820 may be disposed symmetrically with respect to the motor assembly 810. Due to driving of the motor assembly 810, the left slide 820 and the right slide 820 may move away from or closer to each other by the same distance.

Figure 23:
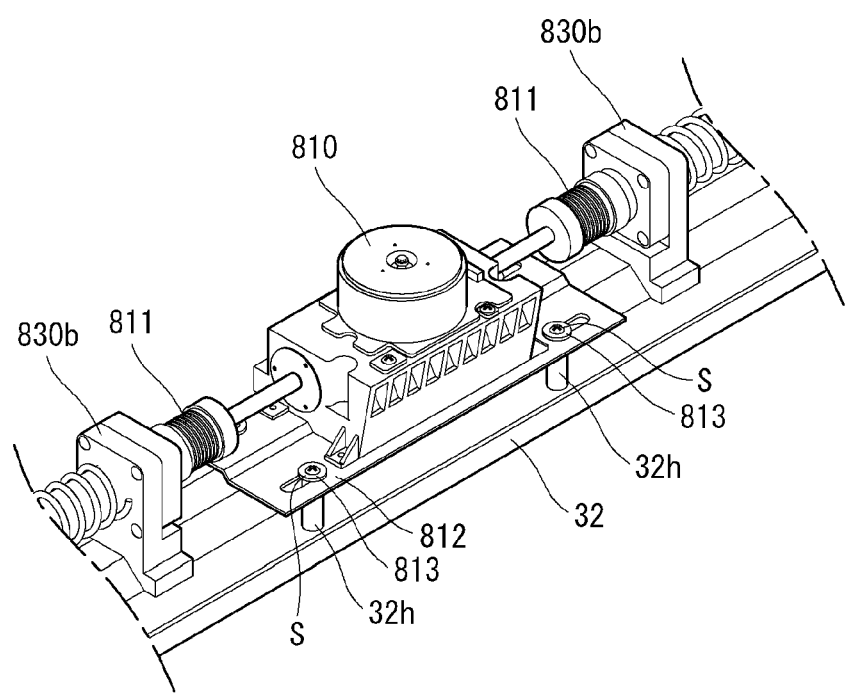

Referring to FIG. 23, the motor assembly 810 may include a plate 813. The plate 813 may be referred to as a mount plate 813 or a motor mount plate 813. A coupling portion 32*h* may be formed on an upper surface of the second base 32. The plate 813 may be fastened to the coupling portion 32*h* through a screw S. The motor assembly 810 may be spaced apart from the upper surface of the second base 32. A washer 813 may be disposed between an upper surface of the plate 813 and the screw S. The washer 813 may include a rubber material. The washer 813 may reduce a vibration generated in the motor assembly 810. The washer 813 may improve stability in driving of the display device 100.

Figure 24:
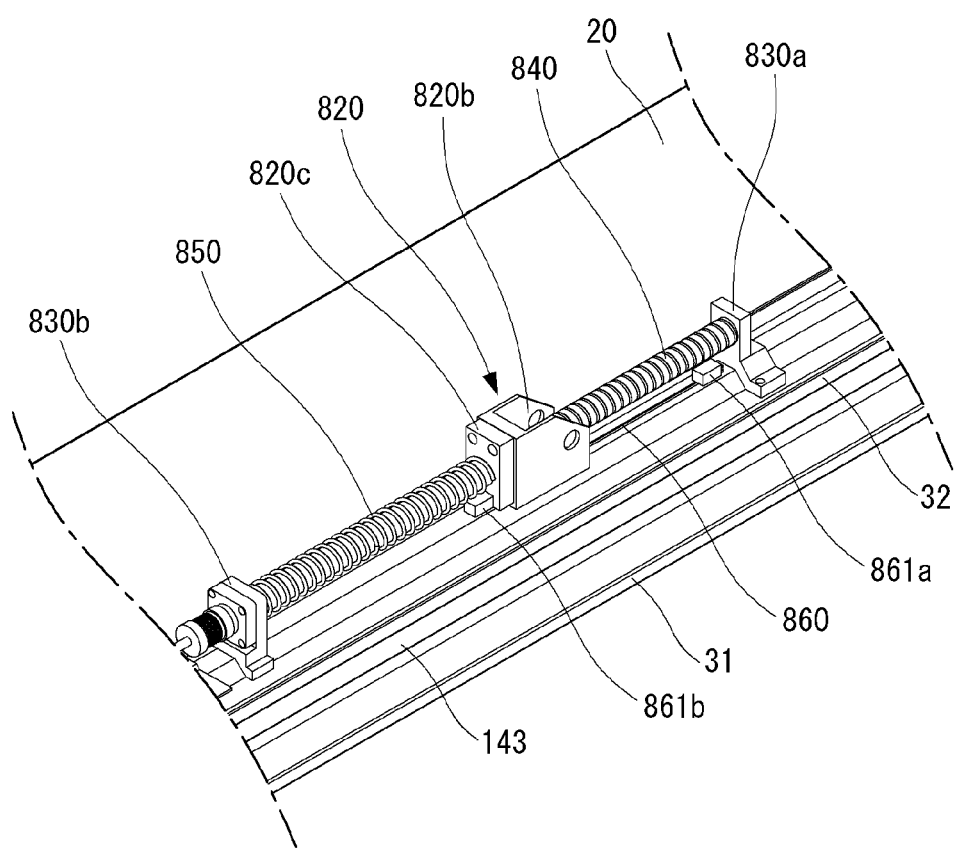

Referring to FIG. 24, a guide rail 860 may be mounted on the second base 32. The guide rail 860 may be disposed in parallel with the lead screw 840. The slide 820 may be engaged with the guide rail 860. A first stopper 861*b* may be disposed at one side of the guide rail 860, and a second stopper 861*a* may be disposed at the other side of the guide rail 860. A range in which the slide 820 may move may be limited between the first stopper 861*b* and the second stopper 861*a*.

A spring 850 may wrap the lead screw 840. The lead screw 840 may penetrate the spring 850. The spring 850 may be disposed between the inner bearing 830*b* and the slide 820. One side of the spring 850 may contact the inner bearing 830*b*, and the other side of the spring 850 may contact the slide 820. The spring 850 may provide elastic force for the slide 820.

When the slide 820 is caught by the first stopper 861*b*, the spring 850 may be compressed to a maximum. When the slide 820 is caught by the first stopper 861*b*, a length of the spring 850 may be a minimum value. When the slide 820 is caught by the first stopper 861*b*, a distance between the slide 820 and the inner bearing 830*b* may be a minimum value.

Figure 25:
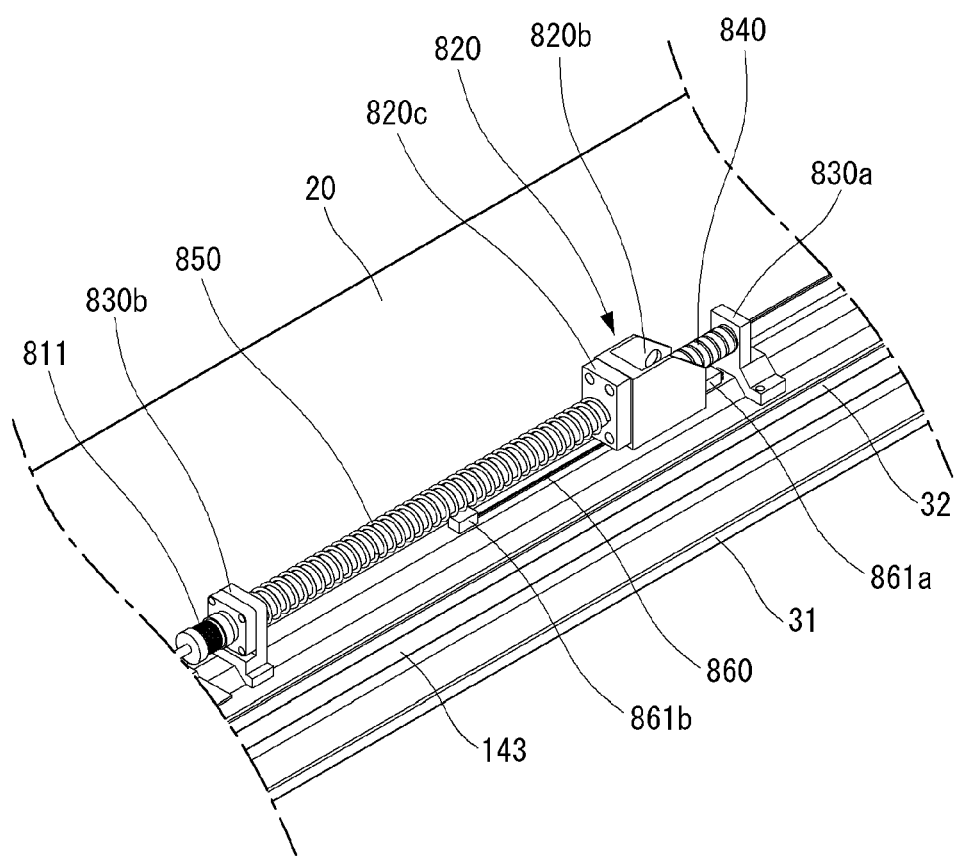

Referring to FIG. 25, when the slide 820 is caught by the second stopper 861*a*, the spring 850 may be extended to a maximum. When the slide 820 is caught by the second stopper 861*a*, a length of the spring 850 may be a maximum value. When the slide 820 is caught by the second stopper 861*a*, a distance between the slide 820 and the inner bearing 830*b* may be a maximum value.

Figure 26:
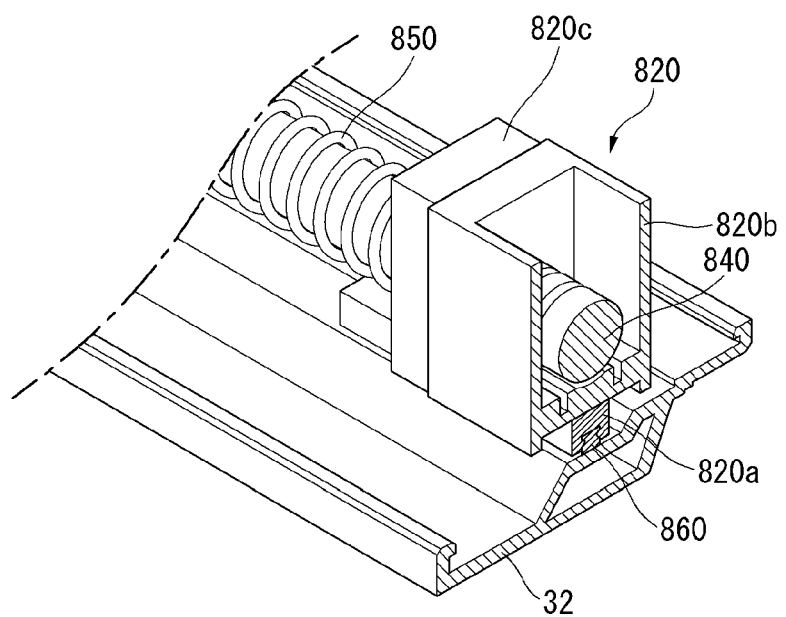

Referring to FIG. 26, a first part 820*a* of the slide 820 may be engaged with the guide rail 860. The first part 820*a* may move along the guide rail 860. The first part 820*a* may be constrained in a longitudinal direction of the guide rail 860. A second part 820*b* of the slide 820 may be disposed on an upper side of the first part 820*a*. The first part 820*a* and the second part 820*b* of the slide 820 may be fastened to each other through a screw. The second part 820*b* may be spaced from the guide rail 860. The lead screw 840 may penetrate the second part 820*b*. The second part 820*b* may include screw threads corresponding to the screw threads of the lead screw 840. Hence, even if the lead screw 840 rotates, the slide 820 may stably move forward and backward along the guide rail 860 without rotating.

A third part 820*c* of the slide 820 may be coupled to one side of the second part 820*b*. The third part 820*c* may be in contact with the spring 850. The spring 850 may provide elastic force for the third part 820*c*.

Figure 27:
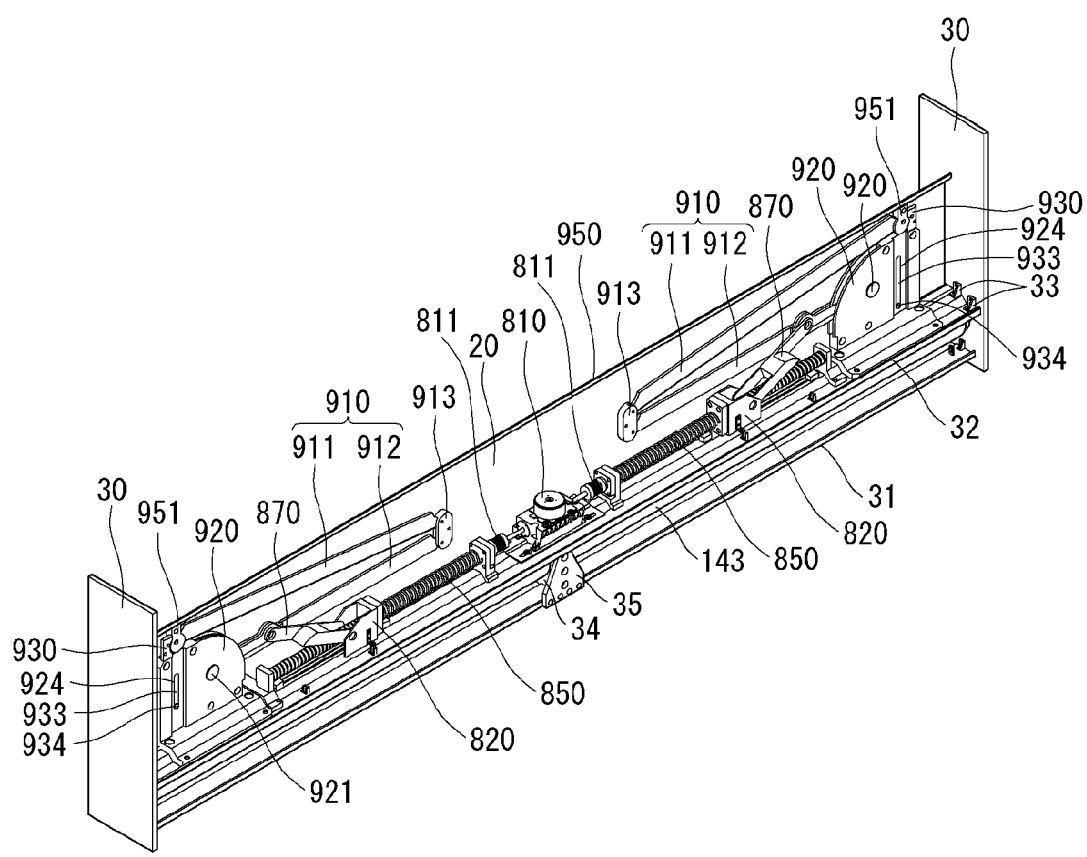
Figure 28:
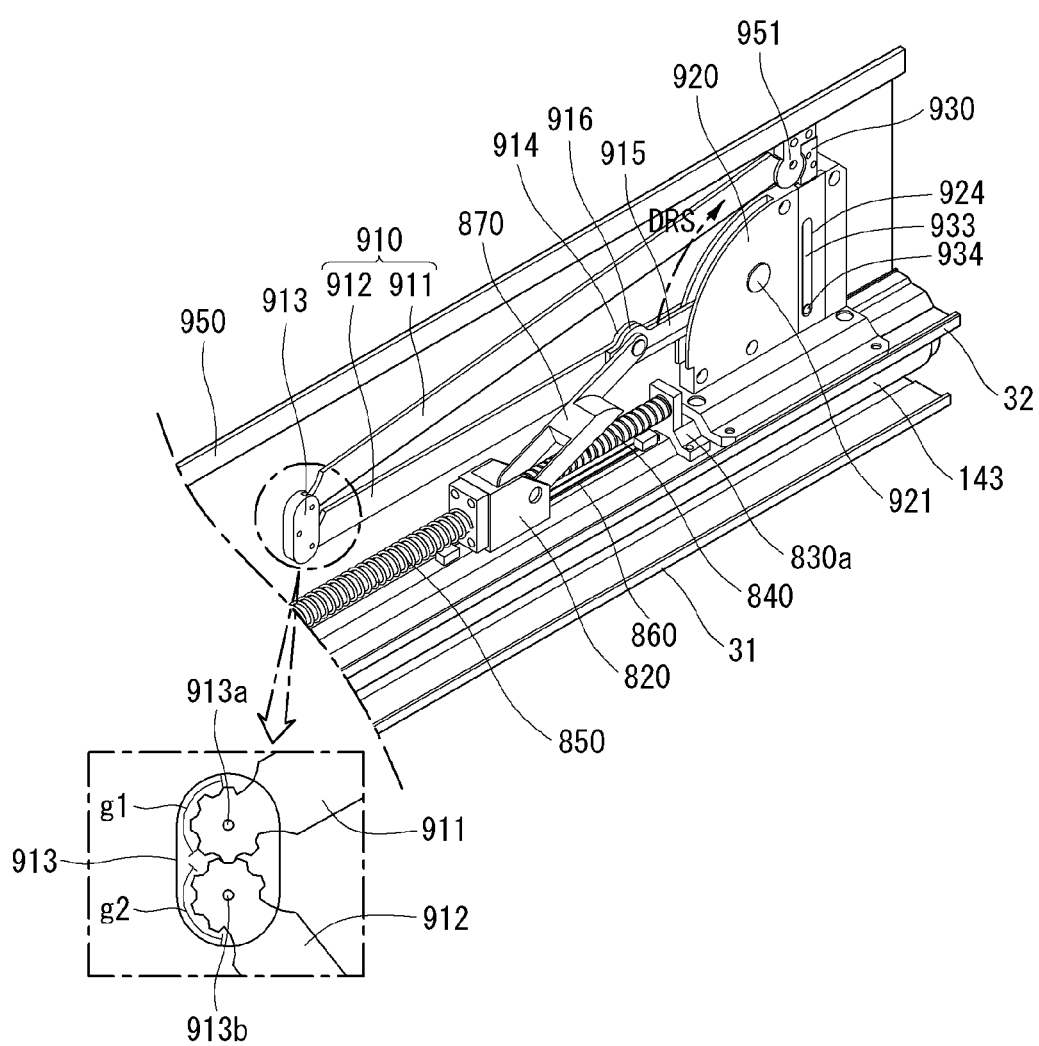

Referring to FIGS. 27 and 28, a link mount 920 may be mounted on the second base 32. One side of a second arm 912 may be pivotally connected to the link mount 920. The other side of the second arm 912 may be pivotally connected to a joint 913. The other side of the second arm 912 may be pivotally connected to a second shaft 913*b* of the joint 913. One side of a rod 870 may be pivotally connected to the slide 820. The other side of the rod 870 may be pivotally connected to the second arm 912 or a third arm 915. One side of the third arm 915 may be pivotally connected to the link mount 920. The other side of the third arm 915 may be pivotally connected to the other side of the rod 870. The link mount 920 may include a shaft 921. The second arm 912 or the third arm 915 may be pivotally connected to the shaft 921 of the link mount 920.

A link bracket 951 may be referred to as a link cap. The link bracket 951 may be coupled to a top case 950. The top case 950 may be referred to as a case top 950, an upper bar 950, a top 950, or a bar 950. The top case 950 may be disposed at an upper end of the flexible display 20. The flexible display 20 may be fixed to the top case 950.

One side of a first arm 911 may be pivotally connected to the joint 913. One side of the first arm 911 may be pivotally connected to a first shaft 913*a*. The other side of the first arm 911 may be pivotally connected to the link bracket 951 or the top case 950.

A gear g1 may be formed on one side of the first arm 911, and a gear g2 may be formed on the other side of the second arm 912. The gear g1 of the first arm 911 and the gear g2 of the second arm 912 may be engaged with each other.

When the slide 820 moves close to the outer bearing 830*a*, the second arm 912 or the third arm 915 may stand. In this instance, a direction in which the second arm 912 or the third arm 915 stands may be referred to as a standing direction DRS.

The second arm 912 may include a protrusion 914 protruding in the standing direction DRS. The protrusion 914 may be referred to as a connector 914. The third arm 915 may include a protrusion 916 protruding in the standing direction DRS. The protrusion 916 may be referred to as a connector 916. The protrusion 914 of the second arm 912 and the protrusion 916 of the third arm 915 may face or contact each other. The other side of the rod 870 may be fastened to the protrusion 914 of the second arm 912 or the protrusion 916 of the third arm 915.

A link 910 may include the first arm 911, the second arm 912, the third arm 915, and/or the joint 913.

Figure 29:
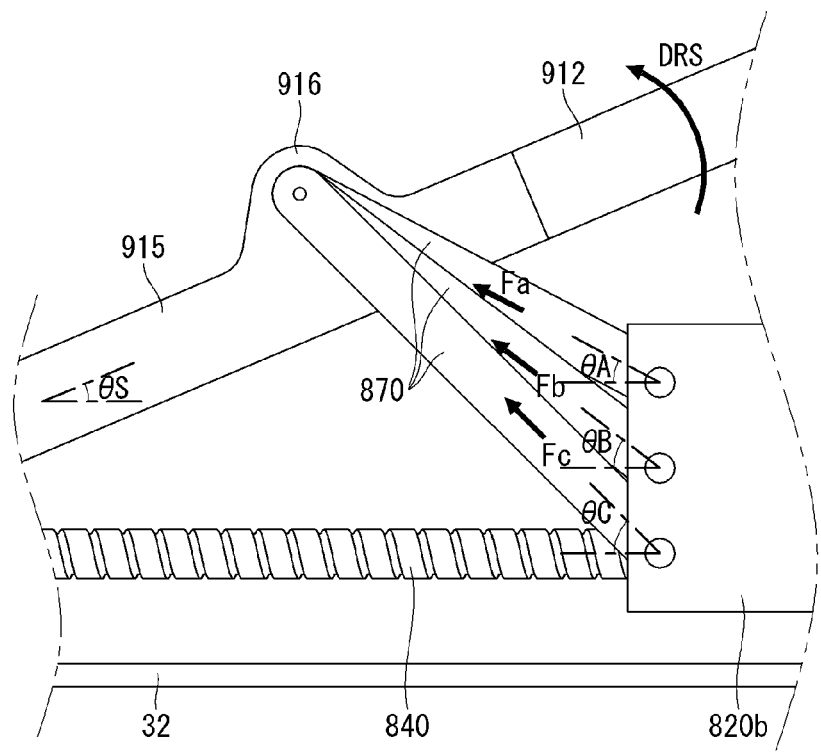
Figure 30:
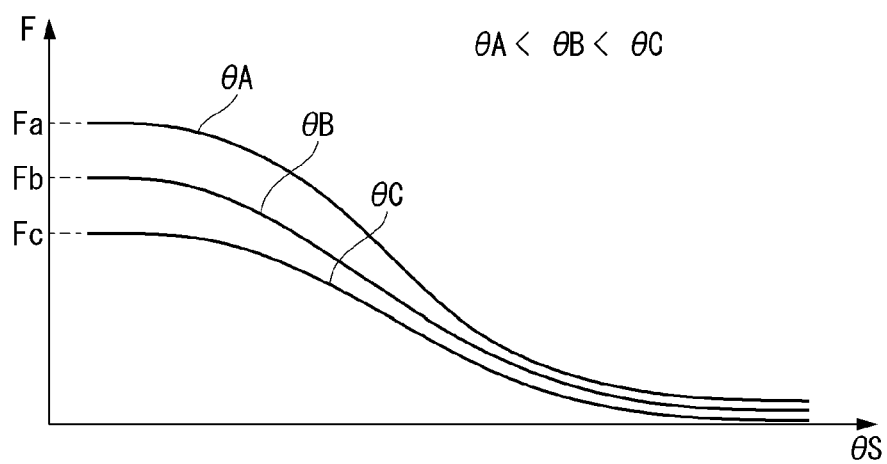

Referring to FIGS. 29 and 30, an angle formed by the second arm 912 or the third arm 915 and the second base 32 may be referred to as θS. When the rod 870 is connected to an upper side of the second part 820*b*, an angle formed by the rod 870 and the second base 32 may be referred to as θA, and a minimum force of the rod 870 for standing the second arm 912 or the third arm 915 may be referred to as Fa. When the rod 870 is connected to a middle side of the second part 820*b*, an angle formed by the rod 870 and the second base 32 may be referred to as θB, and a minimum force of the rod 870 for standing the second arm 912 or the third arm 915 may be referred to as Fb. When the rod 870 is connected to a lower side of the second part 820*b*, an angle formed by the rod 870 and the second base 32 may be referred to as θC, and a minimum force of the rod 870 for standing the second arm 912 or the third arm 915 may be referred to as Fc.

For the same θS, a relationship of θA<θB<θC may be established. Further, for the same θS, a relationship of Fc<Fb<Fa may be established. When the angles θS formed by the second arm 912 or the third arm 915 and the second base 32 are the same, a force required to raise the second arm 912 or the third arm 915 may decrease as the angle formed by the rod 870 and the second base 32 increases. When the rod 870 is connected to the lower side of the second part 820*b*, a load applied to the motor assembly 810 may decrease.

Figure 31:
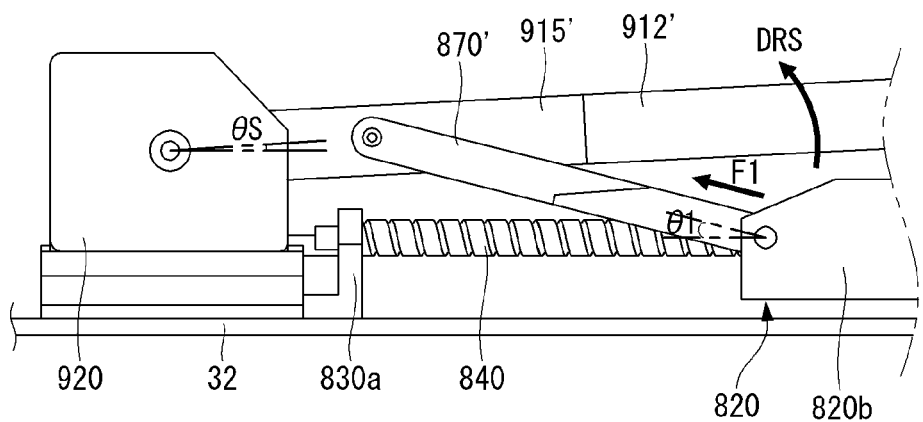

Referring to FIG. 31, a rod 870' may not be connected to a protrusion of a second arm 912' or a protrusion of a third arm 915'. When an angle formed by the second arm 912' or the third arm 915' and the second base 32 is θS, an angle formed by the rod 870' and the second base 32 may be referred to as θ1, and a minimum force of the rod 870' for standing the second arm 912' or the third arm 915' may be referred to as F1.

Figure 32:
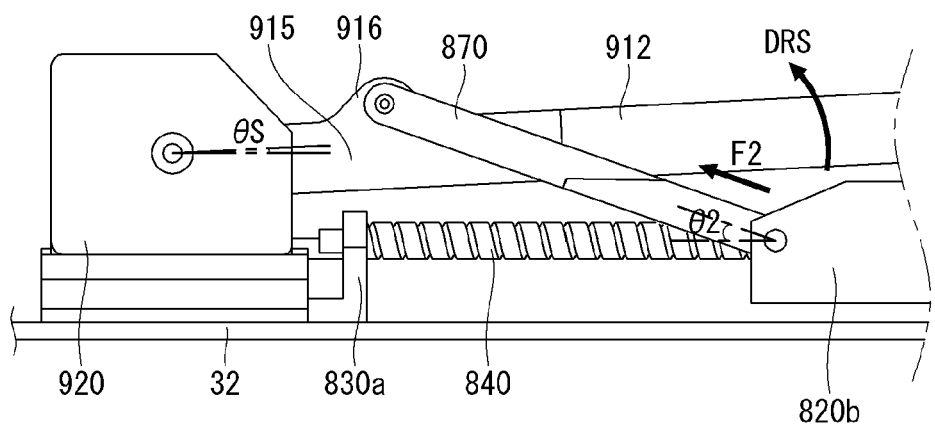

Referring to FIG. 32, the rod 870 may be connected to the protrusion 914 of the second arm 912 or the protrusion 916 of the third arm 915. When an angle formed by the second arm 912 or the third arm 915 and the second base 32 is θS, an angle formed by the rod 870 and the second base 32 may be referred to as θ2, and a minimum force of the rod 870 for standing the second arm 912 or the third arm 915 may be referred to as F2.

Figure 33:
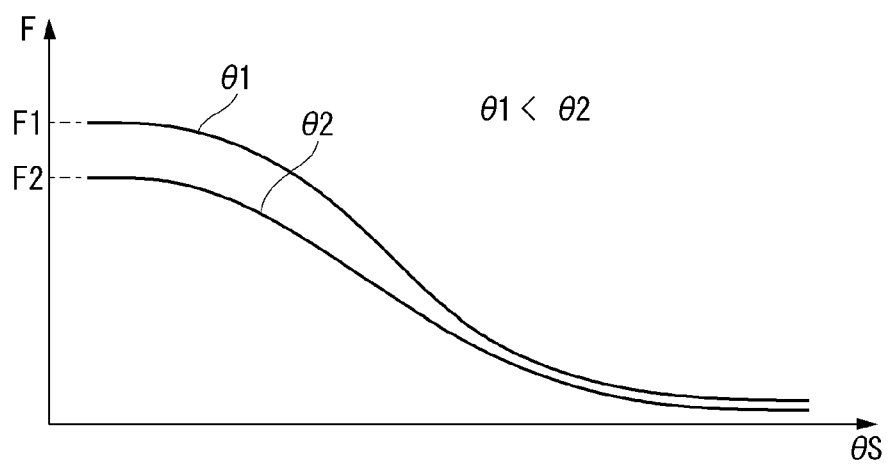

Referring to FIG. 33, when the angles θS are the same, the angle θ2 may be greater than the angle θ1. When the angles θS are the same, the force F1 may be greater than the force F2. When the angles θS formed by the second arms 912 and 912' and the second base 32 are the same, a force required to raise the second arms 912 and 912' may decrease as the angles formed by the rods 870 and 870' and the second base 32 increase. Because the rod 870 is connected to the protrusions 914 and 916, the rod 870 may raise the second arm 912 using the force smaller than the force required when the rod 870' is not connected to the protrusion. Further, because the rod 870 is connected to the protrusions 914 and 916, the rod 870 may reduce a load applied to the motor assembly 810.

Figure 34:
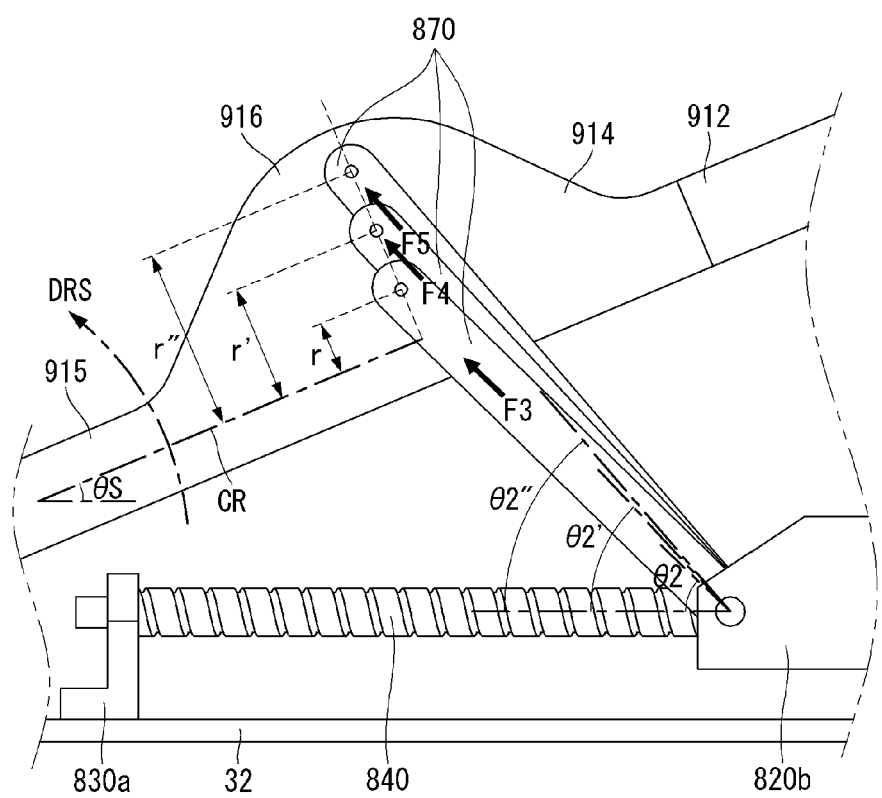

Referring to FIG. 34, the second arm 912 or the third arm 915 may have a central axis CR. When the rod 870 is fastened to the second arm 912 with being spaced from the center axis CR by a distance r, an angle formed by the rod 870 and the second base 32 may be referred to as θ2, and a minimum force of the rod 870 for standing the second arm 912 or the third arm 915 may be referred to as F3. When the rod 870 is fastened to the second arm 912 with being spaced from the center axis CR by a distance r', an angle formed by the rod 870 and the second base 32 may be referred to as θ2', and a minimum force of the rod 870 for standing the second arm 912 or the third arm 915 may be referred to as F4. When the rod 870 is fastened to the second arm 912 with being spaced from the center axis CR by a distance r", an angle formed by the rod 870 and the second base 32 may be referred to as θ2", and a minimum force of the rod 870 for standing the second arm 912 or the third arm 915 may be referred to as F5.

Figure 35:
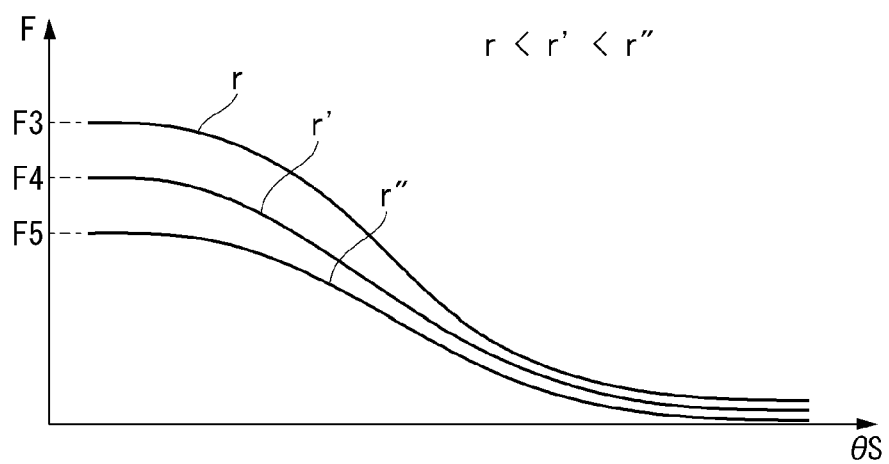

Referring to FIG. 35, when the angles θS are the same, the angel θ2" may be greater than the angel θ2', and the angel θ2' may be greater than the angel θ2. Further, when the angles θS are the same, the force F3 may be greater than the force F4, and the force F4 may be greater than the force F5. As a distance between the rod 870 and the center axis CR increases when the road 870 is fastened to the second arm 912, a force required to raise the second arm 912 may decrease. Further, when the distance between the rod 870 and the center axis CR increases, a load applied to the motor assembly 810 may decrease.

Figure 36:
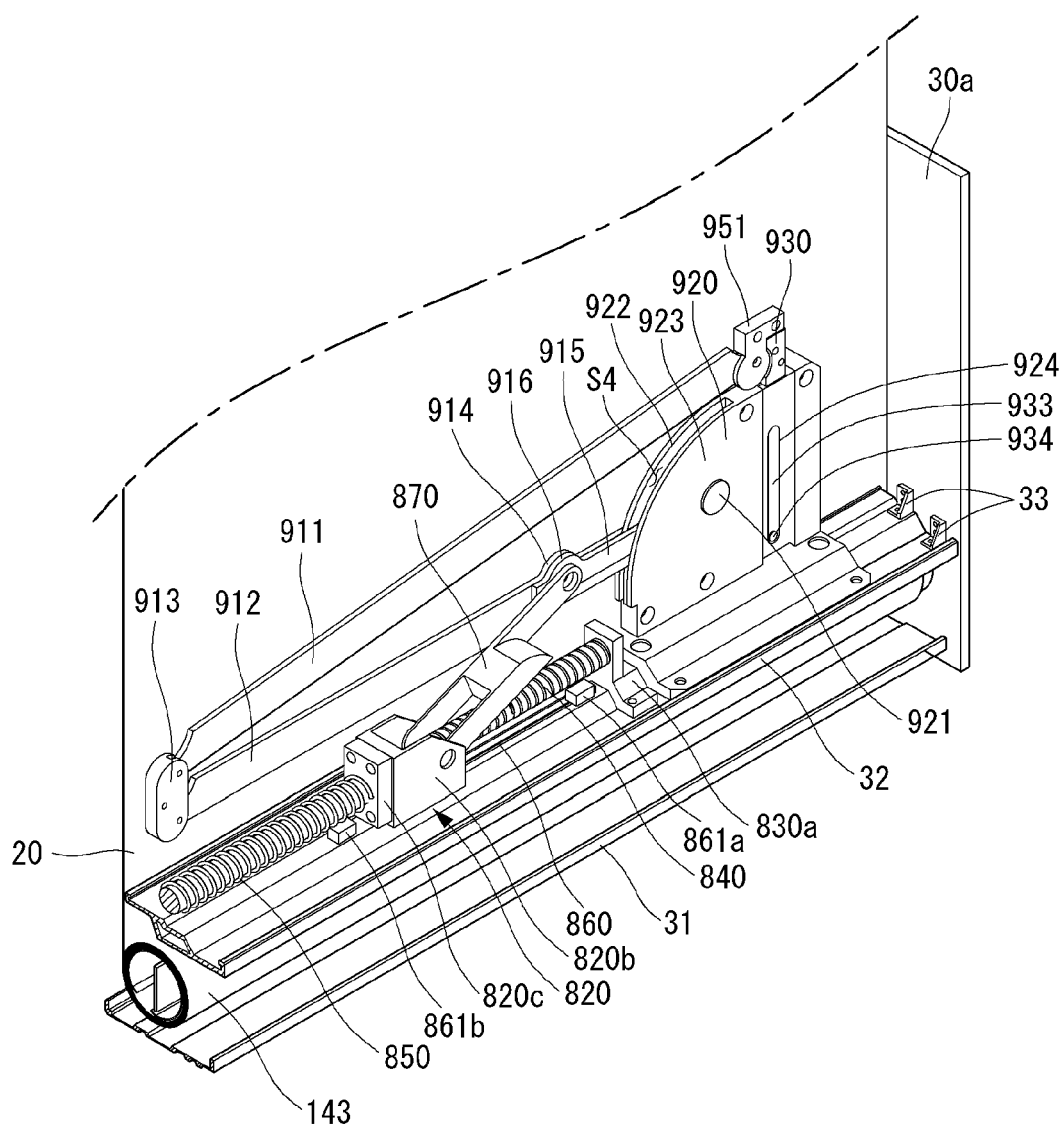

Referring to FIG. 36, the first arm 911 and the second arm 912 may be in contact with or close to the rear surface of the flexible display 20. When the first arm 911 and the second arm 912 are in contact with or close to the rear surface of the flexible display 20 as described above, the flexible display 20 may be stably wound around or unwound from the roller. The link mount 920 may include a first part 922 and a second part 923. The first part 922 and the second part 923 may face each other. A space S4 may be formed between the first part 922 and the second part 923. The first part 922 may face the flexible display 20. The flexible display 20 may be disposed closer to the first part 922 than the second part 923. The second arm 912 may be pivotally connected to a front surface of the first part 922. A portion of the third arm 915 may be accommodated in the space S4 and may be pivotally connected to the first part 922 or the second part 923.

Figure 37:
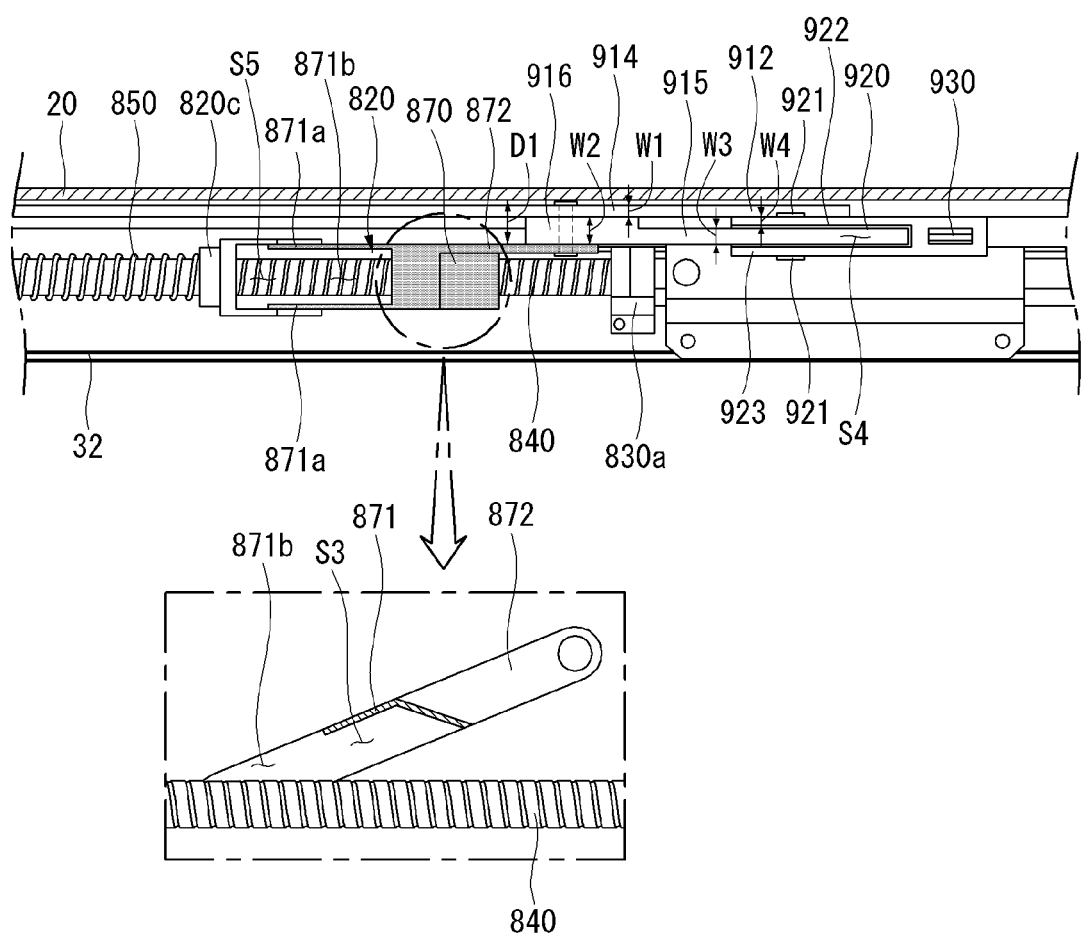

Referring to FIG. 37, the rod 870 may include a first part 871 and a second part 872. The first part 871 may include a connector 871*a* on one side. The second part 820*b* of the slide 820 may form a space S5 therein. The connector 871*a* may be accommodated in the space S5. The connector 871*a* may be pivotally connected to the second part 820*b* (see FIG. 36) of the slide 820. The other side of the first part 871 may be connected to one side of the second part 872. The other side of the second part 872 may be pivotally connected to the second arm 912 or the third arm 915. The first part 871 may form a space S3 therein. The first part 871 may include a hole 871*b*. The lead screw 840 may be accommodated in the hole 871*b* or the space S3.

A distance between the second part 872 and the flexible display 20 may be D1. The second arm 912 may have a thickness W1. A portion of the third arm 915, accommodated in the space S4, may have a thickness W3. The thickness W3 may be equal to a distance between the first part 922 and the second part 923. A portion of the third arm 915, not accommodated in the space S4, may have a thickness W2. The first part 922 may have a thickness W4. The thickness W2 may be greater than the thickness W3. The thickness W2 may be equal to a sum of the thickness W3 and the thickness W4. The distance D1 may equal a sum of the thickness W1 and the thickness W2.

The second arm 912 may be in contact with or close to the rear surface of the flexible display 20, and the third arm 915 may be disposed between the second arm 912 and the second part 872 of the rod 870. The second part 872 may stably transfer power for standing the second arm 912 due to the third arm 915. The second part 872 may move forward with respect to a rotating axis/shaft of the lead screw 840 and connect to the first part 871, in order to stably raise the second arm 912 or the third arm 915. Hence, a clearance between the second arm 912 and the second part 872 may be minimized.

Figure 38:
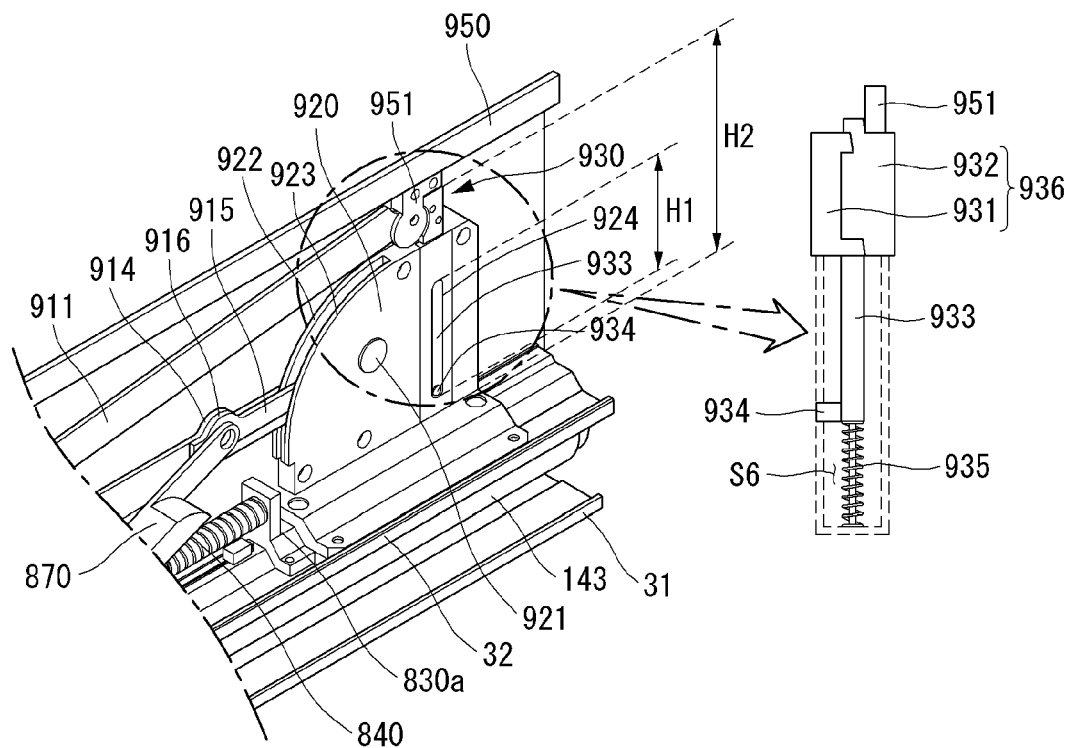

Referring to FIG. 38, a pusher 930 may be mounted on the link mount 920. The pusher 930 may be referred to as a lifter 930. A first part 931 and a second part 932 may be fastened to each other. The second part 932 may contact the link bracket 951 or may be separated from the link bracket 951. The second part 932 may include a material having high elasticity. The first part 931 may include a material having elasticity less than the elasticity of the second part 932. The first part 931 may include a material having higher rigidity than the second part 932. The first part 931 and the second part 932 may be collectively referred to as a head 936. The head 936 may be disposed on an upper side of the link mount 920.

A third part 933 may be connected to the first part 931. Alternatively, the third part 933 may extend downward from the first part 931. The third part 933 may be referred to as a tail. A fourth part 934 may protrude from the third part 933. The link mount 920 may form a space S6, and the third part 933 may be accommodated in the space S6. The space S6 may be opened upward. The space S6 accommodating the third part 933 may be adjacent to the space S4 (see FIG. 37) accommodating the third arm 915. The second part 932 of the link mount 920 may include a hole 924. The hole 924 may be a hole extended in a vertical direction. A length of the hole 924 may be denoted by H1. The fourth part 934 may be disposed in the hole 924. A spring 935 may be accommodated in the space S6. The spring 935 may be disposed below the third part 933. The spring 935 may provide elastic force to the third part 933 in the vertical direction.

A head 936 may have a diameter greater than that of the space S6. When the head 936 is caught at an upper end of the space S6, a height of the head 936 measured from the second base 32 may be a minimum value. The minimum height of the head 936 may be denoted by H2. When the head 936 has the minimum height, the fourth part 934 may be caught at a lower end of the space S6. When the head 936 has the minimum height, the spring 935 may be compressed to a maximum. When the head 936 has the minimum height, elastic force provided by the spring 935 may be a maximum value. When the head 936 has the minimum height, the top case 950 may have a minimum height.

While the pusher 930 is in contact with the link bracket 951, it may provide elastic force to the link bracket 951. As a result, a load applied to the motor assembly 810 to raise the link 910 may be reduced.

Figure 39:
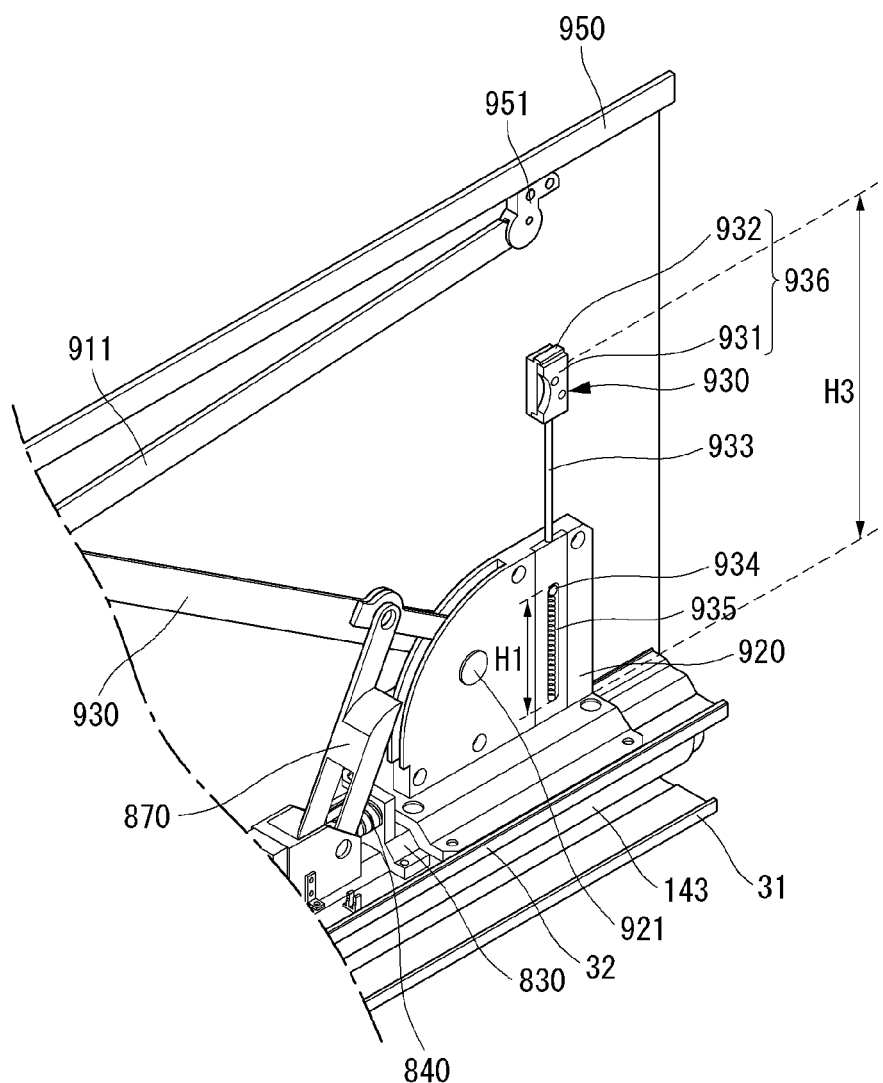

Referring to FIG. 39, when the link 910 fully stands, the pusher 930 may be separated from the link bracket 951. When the pusher 930 is separated from the link bracket 951, a height of the head 936 measured from the second base 32 may be a maximum value. The maximum height of the head 936 may be denoted by H3. When the head 936 has the maximum height, the fourth part 934 may be caught at an upper end of the hole 924. When the head 936 has the maximum height, the spring 935 may be extended to a maximum. When the head 936 has the maximum height, the elastic force provided by the spring 935 may be a minimum value. The maximum height H3 of the head 936 may be substantially equal to a sum of the minimum height H2 of the head 936 and the length H1 of the hole 924.

Figure 40:
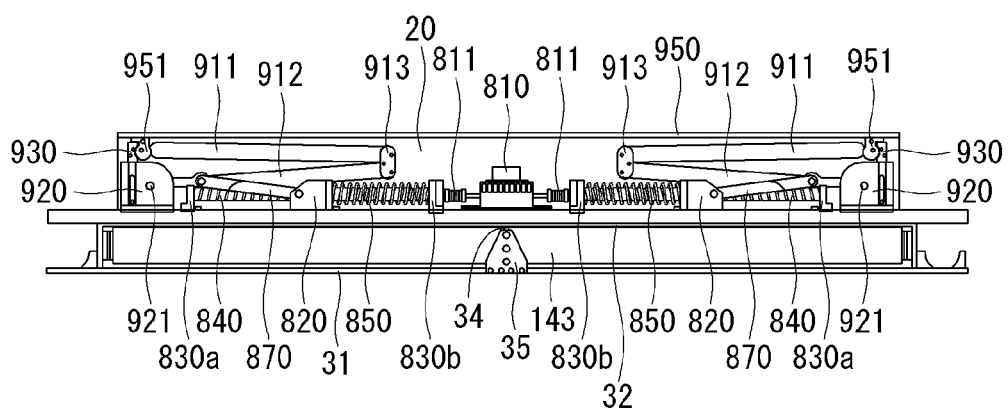

Referring to FIG. 40, the flexible display 20 may be in a state of being fully wound around the roller 143. The display device 100 may be symmetrical to the left and right with respect to the motor assembly 810. A height of the top case 950 may be a minimum value. The slide 820 may be at a position closest to the inner bearing 830b. The slide 820 may be in a state of being caught by the first stopper 861b. The spring 850 may be in a fully compressed state. The pusher 930 may be in contact with the link bracket 951. A height of the pusher 930 may be a minimum value.

Figure 41:
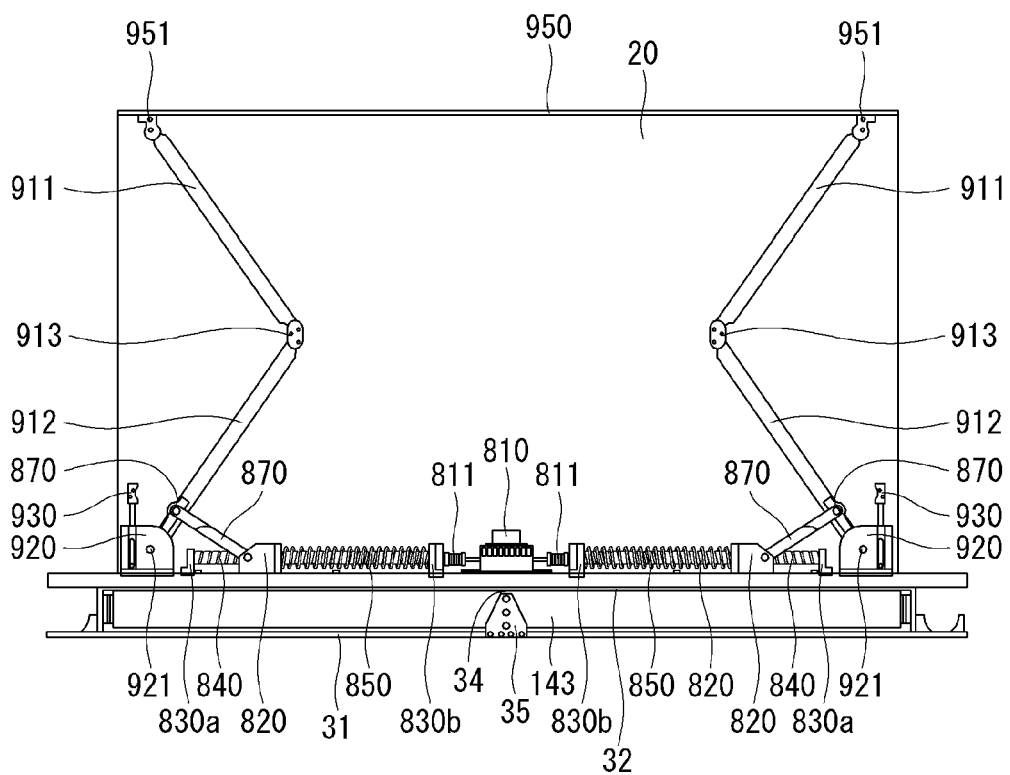

Referring to FIG. 41, the flexible display 20 may be in a state in which about half of the flexible display 20 is wound around the roller 143. The display device 100 may be symmetrical to the left and right with respect to the motor assembly 810. The flexible display 20 may be in a state in which about half of the flexible display 20 is unwound from the roller 143. The slide 820 may be disposed between the first stopper 861b and the second stopper 861a. The pusher 930 may be separated from the link bracket 951. A height of the pusher 930 may be a maximum value.

Figure 42:
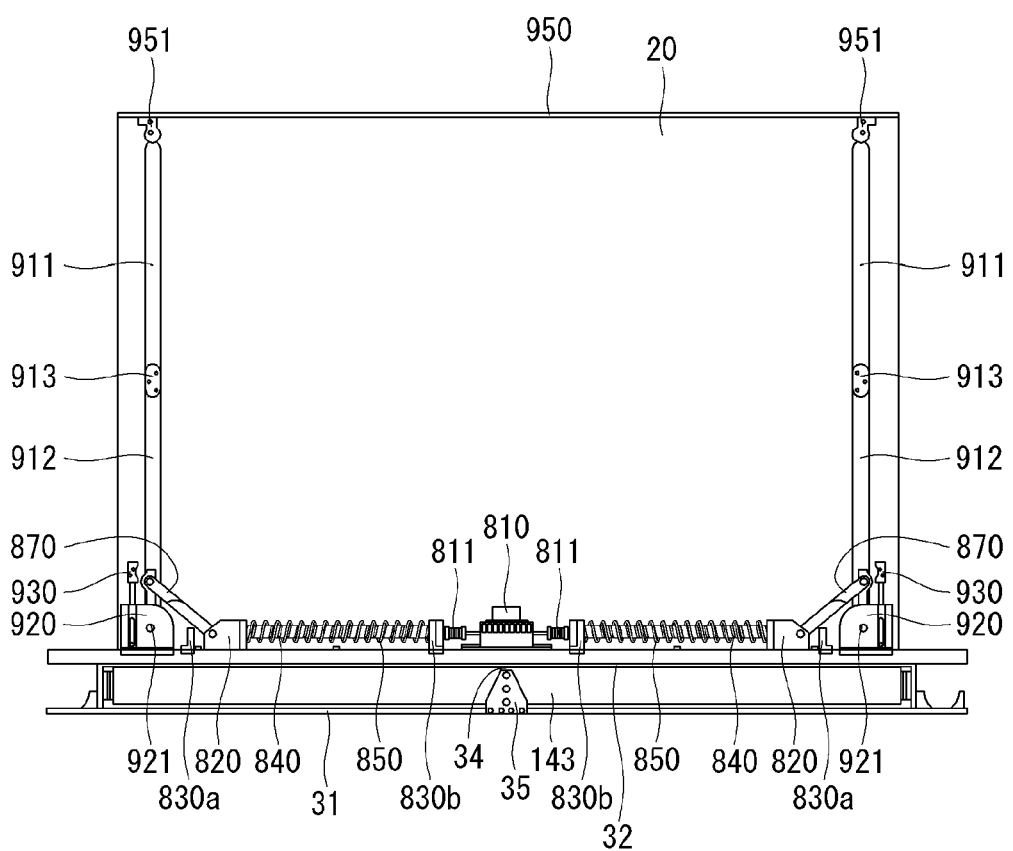
Figure 43:
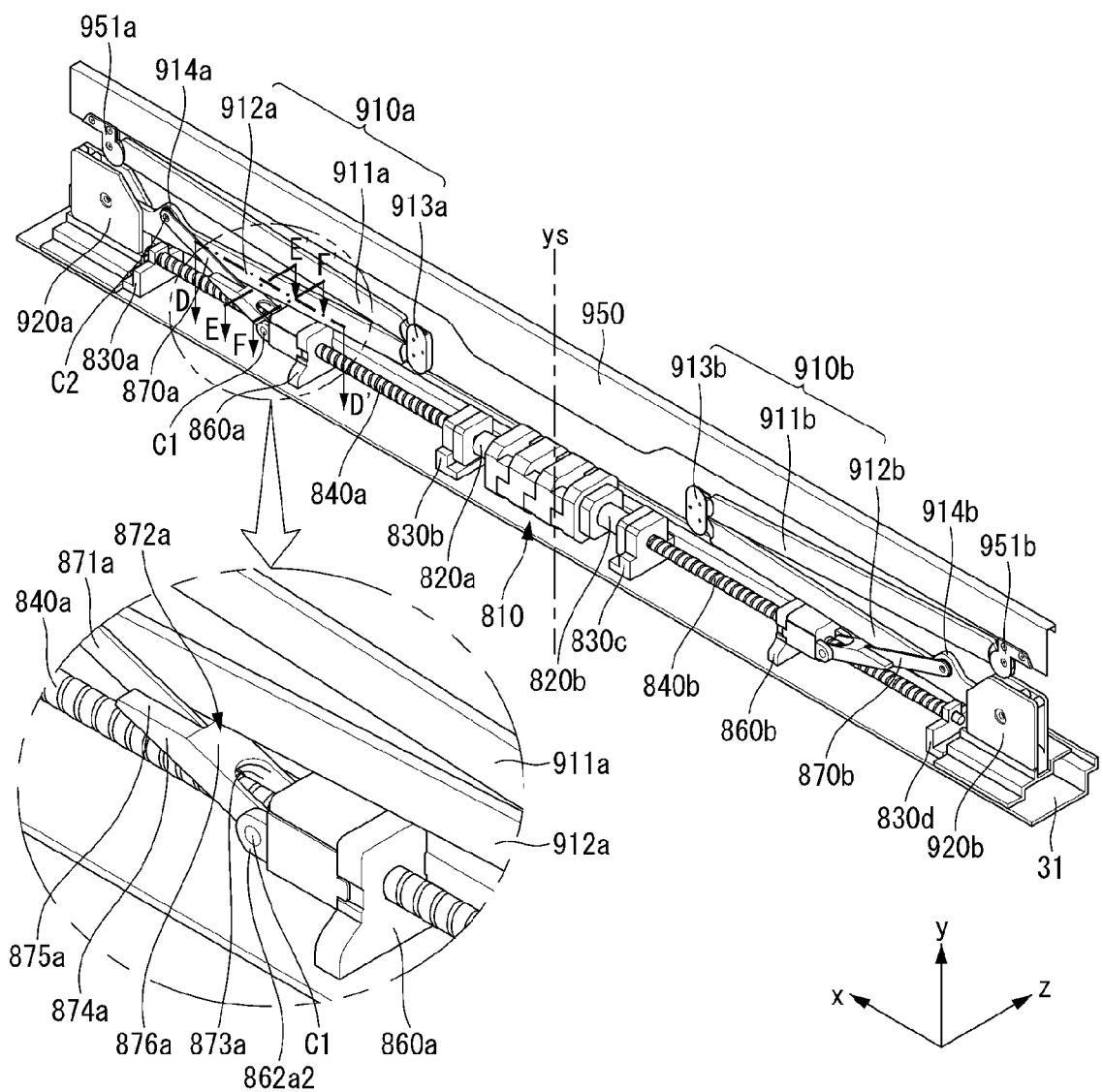
Figure 44:
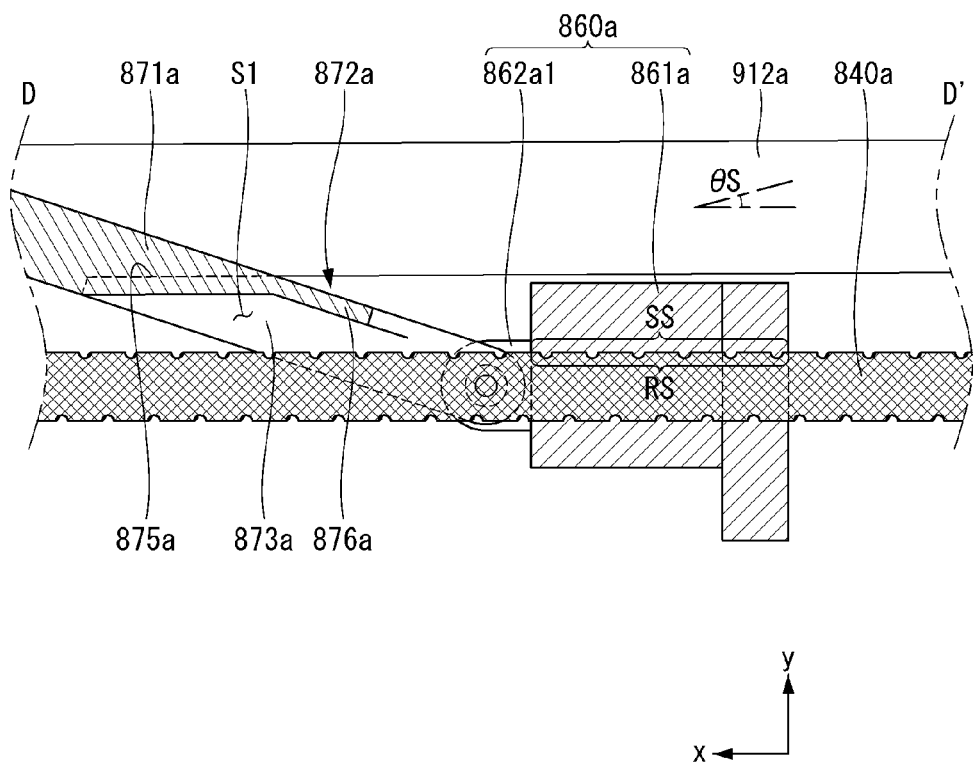
Figure 45:
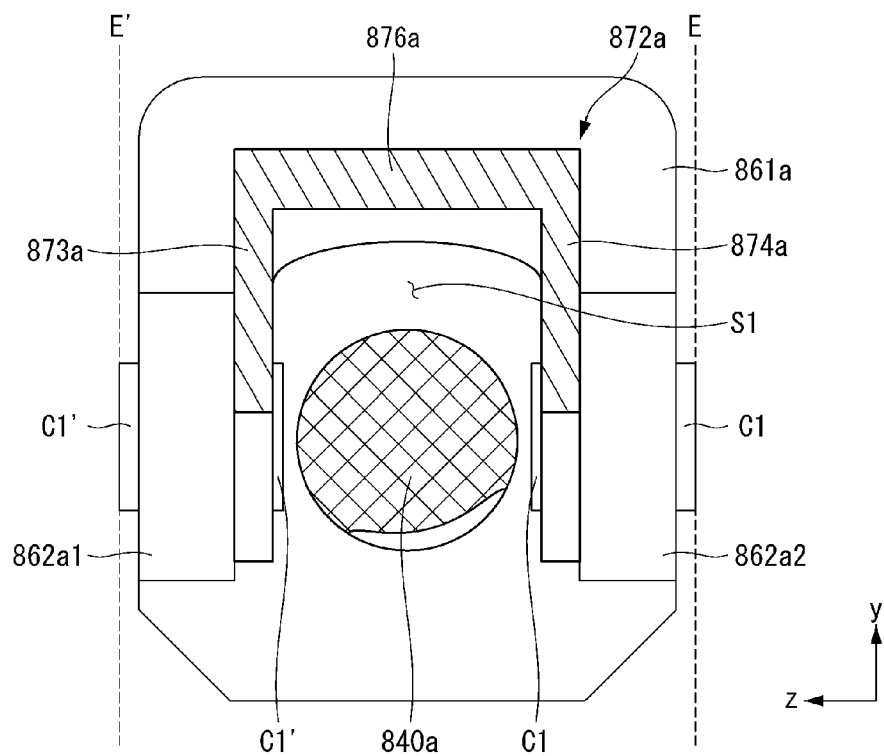
Figure 46:
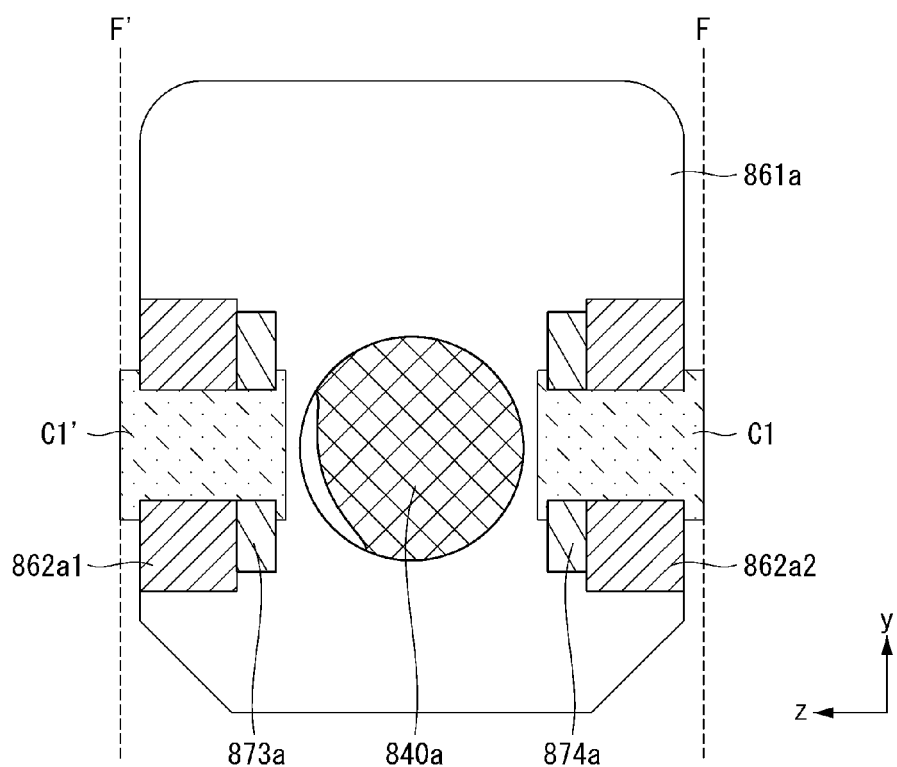

Referring to FIG. 42, the flexible display 20 may be in a state of being fully unwound from the roller 143. The display device 100 may be symmetrical to the left and right with respect to the motor assembly 810. A height of the top case 950 may be a maximum value. The slide 820 may be at a position closest to the outer bearing 830a. The slide 820 may be in a state of being caught by the second stopper 861a. The spring 850 may be in a fully extended state. The pusher 930 may be separated from the link bracket 951. A height of the pusher 930 may be a maximum value.

Referring to FIGS. 43 to 46, link mounts 920a and 920b may be installed on the base 31. The link mounts 920a and 920b may include a right link mount 920a spaced apart from the first right bearing 830a to the right side, and a left link mount 920b spaced apart from the second left bearing 830d to the left side.

Links 910a and 910b may be connected to the link mounts 920a and 920b. The links 910a and 910b may include a right link 910a connected to the right link mount 920a, and a left link 910b connected to the left link mount 920b.

The right link 910a may also be referred to as a first link. The left link 910b may also be referred to as a second link. The right link mount 920a may also be referred to as a first link mount 920a. The left link mount 920b may also be referred to as a second link mount 920b.

The links 910a and 910b may include first arms 911a and 911b, second arms 912a and 912b, and arm joints 913a and 913b, respectively. One side of each of the second arms 912a and 912b may be rotatably connected to each of the link mounts 920a and 920b. The other side of each of the second arms 912a and 912b may be rotatably connected to each of the arm joints 913a and 913b. One side of each of the first arms 911a and 911b may be rotatably connected to each of the arm joints 913a and 913b. The other side of each of the first arms 911a and 911b may be rotatably connected to each of link brackets 951a and 951b.

The link brackets 951a and 951b may include a right link bracket 951a connected to the first arm 911a of the right link 910a, and a left link bracket 951b connected to the first arm 911b of the left link 910b. The link brackets 951a and 951b may be connected to an upper bar 950.

The upper bar 950 may connect the right ink bracket 951a and the left link bracket 951b.

Rods 870a and 870b may connect sliders 860a and 860b and the links 910a and 910b, respectively. One side of each of the rods 870a and 870b may be rotatably connected to each of the sliders 860a and 860b. The other side of each of the rods 870a and 870b may be rotatably connected to each of the second arms 912a and 912b. The rods 870a and 870b may include a right rod 870a that connects the right slider 860a and the second arm 912a of the right link 910a, and a left rod 870b that connects the left slider 860b and the second arm 912b of the left link 910b. The right rod 870a may also be referred to as a first rod 870a. The left rod 870b may also be referred to as a second rod 870b.

More specifically, a structure formed by the right lead screw 840a, the right slider 860a, the right rod 870a, and the right link 910a is described. The right slider 860a may include a body 861a and a rod mount 862a. A screw thread SS may be formed in an inner circumferential surface of the body 861a. The screw thread formed in the body 861a may be engaged with the screw thread RS of the right lead screw 840a. The right lead screw 840a may penetrate the body 861a.

The rod mount 862a may be formed on a right side of the body 861a. The rod mount 862a may be rotatably connected to one side of the right rod 870a. The rod mount 862a may include a first rod mount 862a1 and a second rod mount 862a2. The first rod mount 862a1 may be disposed at a front of the right lead screw 840a. The second rod mount 862a2 may be disposed at a rear of the right lead screw 840a. The first rod mount 862a1 and the second rod mount 862a2 may be spaced apart from each other. The second rod mount 862a2 may be spaced apart from the first rod mount 862a1 to the −z-axis direction. The right lead screw 840*a* may be disposed between the first rod mount 862*a*1 and the second rod mount 862*a*2.

The rod mount 862*a* may be rotatably connected to one side of the rod 870*a* through a connecting member C1. The connecting member C1 may penetrate the rod mount 862*a* and the right rod 870*a*.

The right rod 870*a* may be rotatably connected to the second arm 912*a* through a connecting member C2. The connecting member C2 may penetrate the second arm 912*a* and the right rod 870*a*.

The right rod 870*a* may include a transfer portion 871*a* connected to the second arm 912*a* of the right link 910*a* and a cover 872*a* connected to the rod mount 862*a* of the right slider 860*a*. The transfer portion 871*a* may transfer a force, generated when the right slider 860*a* advances or retreats along the right lead screw 840*a*, to the right link 910*a*.

The cover 872*a* may include a first plate 873*a* disposed at the front of the right lead screw 840*a*. The first plate 873*a* may be disposed in a direction vertical to the base 31. Alternatively, the first plate 873*a* may face the right lead screw 840*a*.

The cover 872*a* may include a second plate 874*a* disposed at the rear of the right lead screw 840*a*. The second plate 874*a* may be disposed in a direction vertical to the base 31. Alternatively, the second plate 874*a* may face the right lead screw 840*a*. Alternatively, the second plate 874*a* may be spaced apart from the first plate 873*a*. The right lead screw 840*a* may be located between the first plate 873*a* and the second plate 874*a*.

The cover 872*a* may include a third plate 875*a* that connects the first plate 873*a* and the second plate 874*a*. The third plate 875*a* may be connected to the transfer portion. The third plate 875*a* may be disposed over the right lead screw 840*a*.

The cover 872*a* may include a fourth plate 876*a* that connects the first plate 873*a* and the second plate 874*a*. The fourth plate 876*a* may be connected to the third plate 875*a*. The fourth plate 876*a* may be disposed over the right lead screw 840*a*.

One side of the first plate 873*a* may be connected to the first rod mount 862*a*1. The first plate 873*a* and the first rod mount 862*a*1 may be connected through a connecting member C1'. The other side of the first plate 873*a* may be connected to the third plate 875*a*.

One side of the second plate 874*a* may be connected to the second rod mount 862*a*2. The second plate 874*a* and the second rod mount 862*a*2 may be connected through the connecting member C1. The other side of the second plate 874*a* may be connected to the third plate 875*a*.

When the right slider 860*a* moves close to the motor assembly 810, the right lead screw 840*a* and the right rod 870*a* may come into contact with each other. When the right lead screw 840*a* and the right rod 870*a* come into contact with each other, interference may be generated therebetween, and, thus, a movement of the right slider 860*a* may be limited.

The cover 872*a* may provide a space S1 therein. The first plate 873*a*, the second plate 874*a*, the third plate 875*a*, and the fourth plate 876*a* may form the space S1. When the right slider 860*a* moves close to the motor assembly 810, the right lead screw 840*a* may be accommodated or escaped into the space S1 provided by the cover 872*a*. The right slider 860*a* may move close to the motor assembly 810 due to the space S1 provided by the cover 872*a*, compared to a case where the cover 872*a* is not present. That is, a movable range of the right slider 860*a* may be increased because the cover 872*a* provides the space S1 therein. Further, there is an advantage in that a size of the housing 30 (see FIG. 2) may be reduced because the right lead screw 840*a* is accommodated in the cover 872*a*.

Additionally, the cover 872*a* may limit a minimum value of an angle "θS" formed by the second arm 912*a* and the base 31. When the angle "θS" is sufficiently small, the third plate 875*a* of the cover 872*a* may contact the second arm 912*a* and support the second arm 912*a*. Since the third plate 875*a* supports the second arm 912*a*, the minimum value of the angle "θS" may be limited and the sagging of the second arm 912*a* may be prevented. That is, the cover 872*a* may serve as a stopper to prevent the second arm 912*a* from hanging down. Further, since the third plate 875*a* limits a minimum value of the angle "θS", an initial load for standing the second arm 912*a* may be reduced.

The lead screws 840*a* and 840*b* may be driven by a single motor assembly 810. Since the lead screws 840*a* and 840*b* are driven by the single motor assembly 810, the second arms 912*a* and 912*b* may stand up symmetrically. When the lead screws 840*a* and 840*b* are driven by the single motor assembly 810, however, a load applied to the motor assembly 810 to raise the second arms 912*a* and 912*b* may be excessively increased. In this case, the third plate 875*a* may limit the minimum value of the angle "θS", thereby reducing a load applied to the motor assembly 810 in order to raise the second arms 912*a* and 912*b*.

A structure formed by the left lead screw 840*b*, the left slider 860*b*, the left rod 870*b*, and the left link 910*b* may be symmetrical to the structure formed by the right lead screw 840*a*, the right slider 860*a*, the right rod 870*a*, and the right link 910*a*. In this case, the symmetry axis may be the symmetry axis "ys" of the motor assembly 810.

Figure 47:
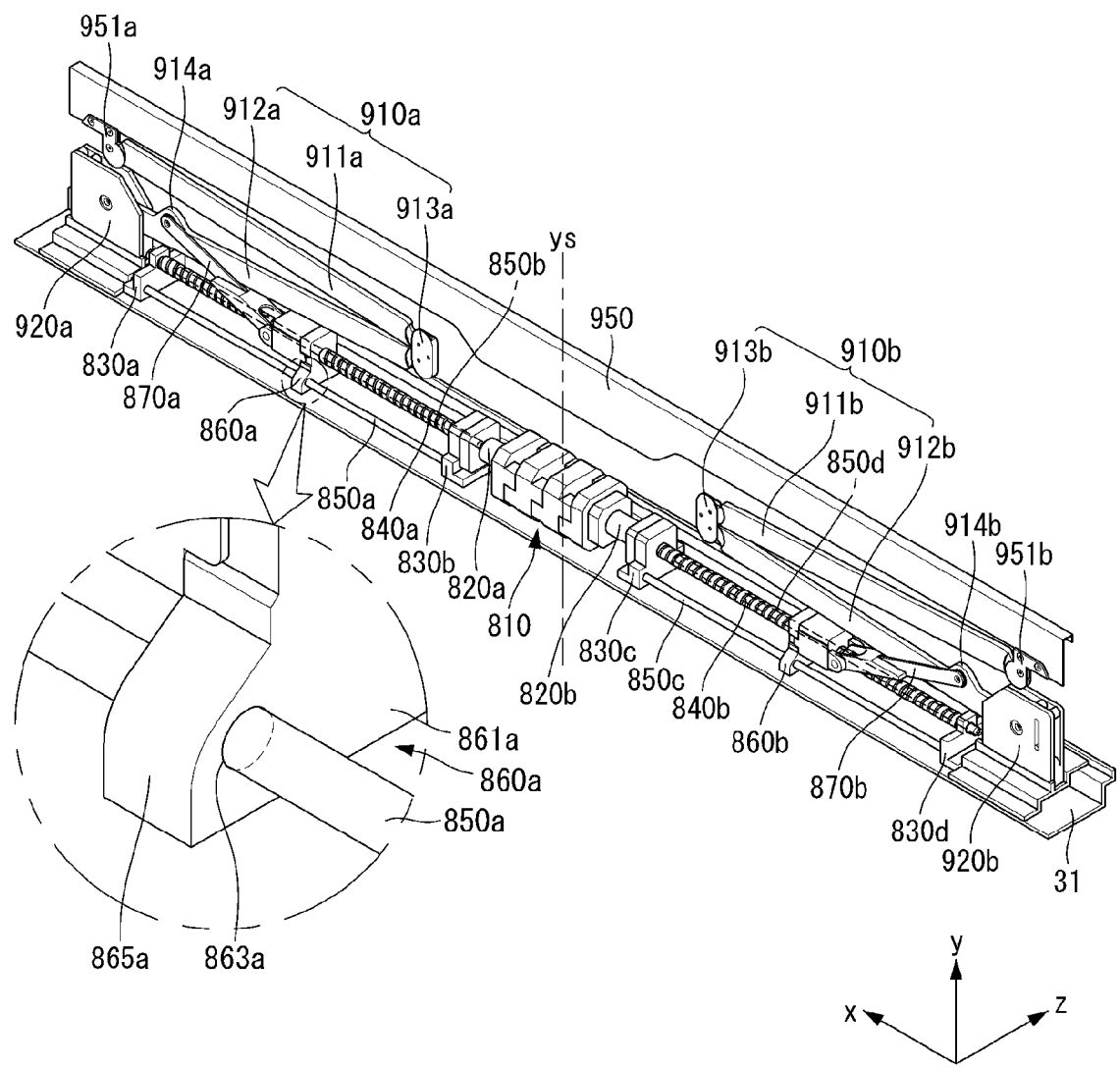

Referring to FIG. 47, a guide 850*a*, 850*b*, 850*c*, and 850*d* may be connected to a bearing 830*a*, 830*b*, 830*c*, and 830*d*. The guide 850*a*, 850*b*, 850*c*, and 850*d* may include right guides 850*a* and 850*b* disposed on a right side of the motor assembly 810, and left guides 850*c* and 850*d* disposed on a left side of the motor assembly 810.

The right guide 850*a* and 850*b* may have one side connected to the first right bearing 830*a* and the other side connected to the second right bearing 830*b*. The right guide 850*a* and 850*b* may be disposed in parallel to the right lead screw 840*a*. Alternatively, the right guide 850*a* and 850*b* may be spaced apart from the right lead screw 840*a*.

The right guide 850*a* and 850*b* may include a first right guide 850*a* and a second right guide 850*b*. The first right guide 850*a* and the second right guide 850*b* may be spaced apart from each other. The right lead screw 840*a* may be located between the first right guide 850*a* and the second right guide 850*b*.

The right slider 860*a* may include a protruding portion. Alternatively, the display device may include a protruding portion formed in the right slider 860*a*. The protruding portion may be formed in a body of the slider. The protruding portion may include a front protruding portion (not illustrated) that protrudes from the body 861*a* of the right slider 860*a* to the +z-axis direction, and a rear protruding portion 865*a* that protrudes from the body of the slider to the −z-axis direction.

The first right guide 850*a* may penetrate the rear protruding portion 865*a*. Alternatively, a first hole 863*a* may be formed in the rear protruding portion, and the first right guide 850*a* may pass through the first hole 863*a*. The first hole 863*a* may be formed in the x-axis direction. The first hole 863*a* may also be referred to as a hole 863*a*.

The second right guide (not illustrated) may penetrate the front protruding portion (not illustrated). Alternatively, a second hole (not illustrated) may be formed in the front protruding portion, and the second right guide may penetrate the second hole. The second hole may be formed in the x-axis direction.

The right guides 850a and 850b may guide the right slider 860a so that the right slider 860a moves more stably when advancing or retreating along the right lead screw 840a. Since the right guides 850a and 850b stably guide the right slider 860a, the right slider 860a may advance or retreat along the right lead screw 840a without rotating with respect to the right lead screw 840a.

A structure formed by the left guides 850c and 850d, the left bearings 830a, 830b, 830c, and 830d, the left slider 860b, and the left lead screw 840b may be symmetrical to the structure formed by the right guides 850a and 850b, the right bearings 830a, 830b, 830c, and 830d, the right slider 860a, and the right lead screw 840a. In this case, the symmetry axis may be the symmetry axis "ys" of the motor assembly 810.

Figure 48:
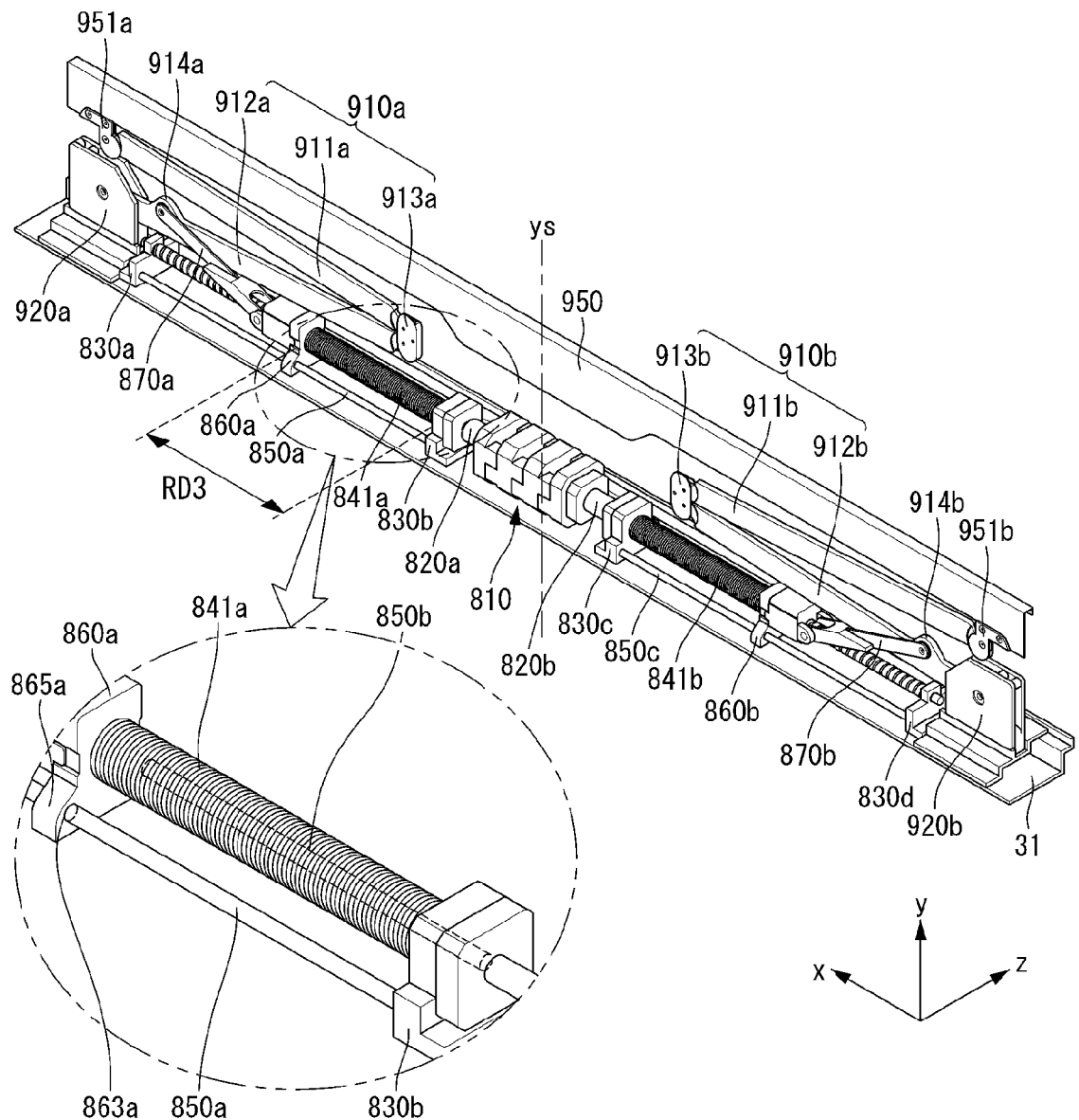

Referring to FIG. 48, first springs 841a and 841b may be inserted into the lead screws 840a and 840b. Alternatively, the lead screws 840a and 840b may penetrate the first springs 841a and 841b. The first springs 841a and 841b may include a first right spring 841a disposed on the right side of the motor assembly 810 and a first left spring 841b disposed on the left side of the motor assembly 810.

The first right spring 841a may be disposed between the right slider 860a and the second right bearing 830b. One end of the first right spring 841a may be brought into contact with or separated from the right slider 860a. The other end of the first right spring 841a may be brought into contact with or separated from the second right bearing 830b.

When the second arm 912a has fully lain down with respect to the base 31, a distance between the right slider 860a and the second right bearing 830b may be a distance RD3. The first right spring 841a may have a longer length than the distance RD3 in a state in which the first right spring 841a is not compressed or extended. Accordingly, when the second arm 912a has fully lain down with respect to the base 31, the first right spring 841a may be compressed between the right slider 860a and the second right bearing 830b. Further, the first right spring 841a may provide a restoring force to the right slider 860a in the +x-axis direction.

When the state of the second arm 912a changes from the state of fully lying down with respect to the base 31 to a standing state, a restoring force provided by the first right spring 841a may assist the second arm 912a to stand up. A load of the motor assembly 810 may be reduced because the first right spring 841a assists the second arm 912a to stand up.

The lead screws 840a and 840b may be driven by a single motor assembly 810. Since the lead screws 840a and 840b are driven by the single motor assembly 810, the second arms 912a and 912b may stand up symmetrically. When the lead screws 840a and 840b are driven by the single motor assembly 810, however, a load applied to the motor assembly 810 to raise the second arms 912a and 912b may be excessively increased. In this case, since the first right spring 841a assists the second arm 912a to stand up, a load of the motor assembly 810 may be reduced, and a load applied to the motor assembly 810 to raise the second arms 912a may be reduced.

Alternatively, when the state of the second arm 912a changes from the state of standing up with respect to the base 31 to the state of fully lying down, a restoring force provided by the first right spring 841a may reduce an impact generated when the second arm 912a lies down with respect to the base 31. That is, when the second arm 912a lies down with respect to the base 31, the first right spring 841a may serve as a damper. A load of the motor assembly 810 may be reduced because the first right spring 841a plays the role of a damper.

A structure formed by the first left spring 841b, the left bearings 830a, 830b, 830c, and 830d, the left slider 860b, the left lead screw 840b, and the second arm 912a may be symmetrical to the structure formed by the first right spring 841a, the right bearings 830a, 830b, 830c, and 830d, the right slider 860a, the right lead screw 840a, and the second arm 912a. In this case, the symmetry axis may be the symmetry axis "ys" of the motor assembly 810.

Figure 49:
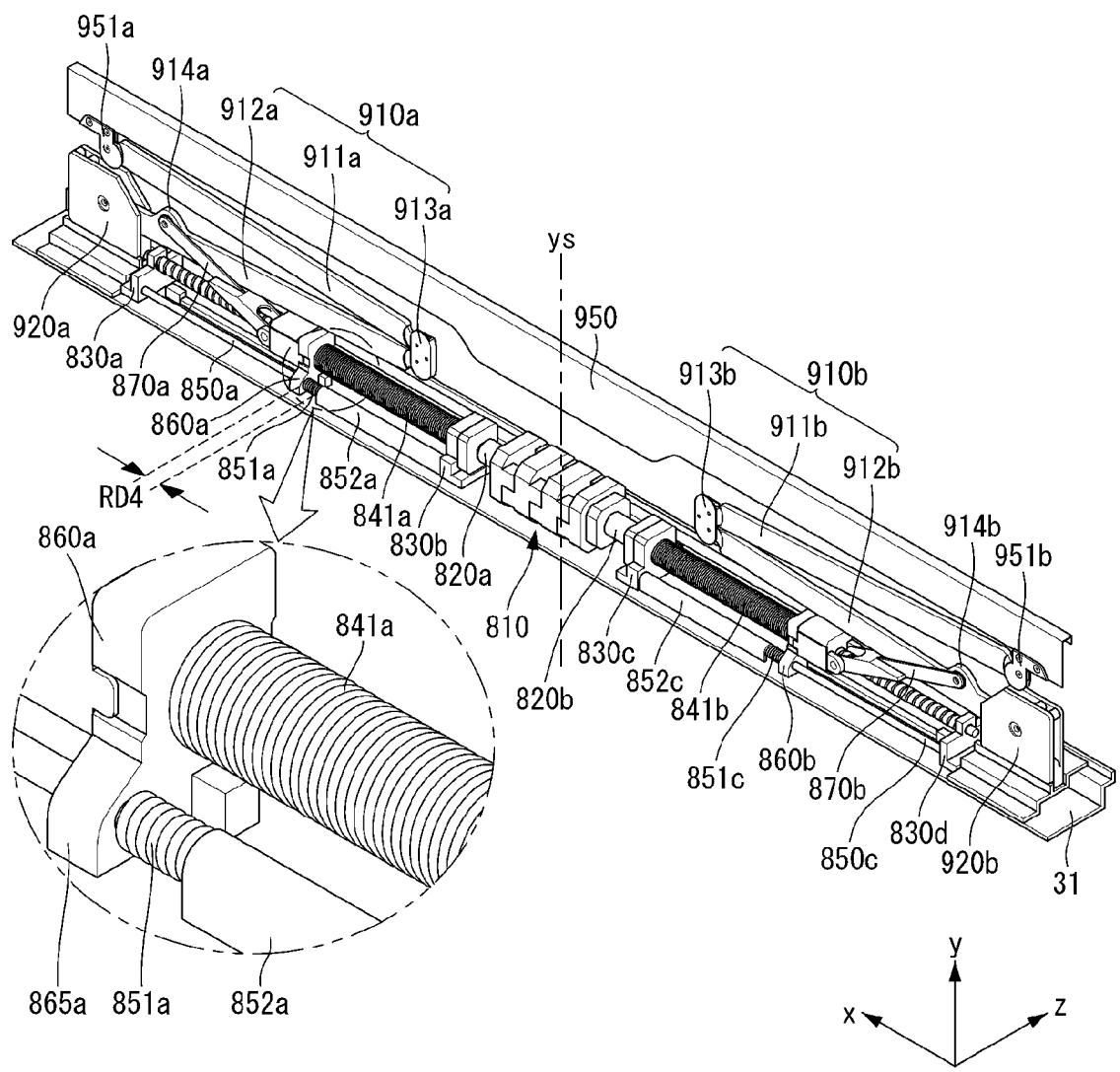

Referring to FIG. 49, second springs 851a and 851b may be inserted into the guides 850a, 850b, 850c, and 850d. Alternatively, the guides 850a, 850b, 850c, and 850d may penetrate the second springs 851a and 851b. The second springs 851a and 851b may include a second right spring 851a disposed on the right side of the motor assembly 810, and a second left spring 851b disposed on the left side of the motor assembly 810.

A plurality of second right springs 851a may be formed. The second right spring 851a may include springs 940a and 940b inserted into the first right guide 850a, and springs 940a and 940b inserted into the second right guide 850b. Alternatively, the second right spring 851a may include springs 940a and 940b through which the first right guide 850a penetrates, and springs 940a and 940b through which the second right guide 850b penetrates.

The guides 850a, 850b, 850c, and 850d may include locking protrusions 852a and 852b. The locking protrusions 852a and 852b may include a right locking protrusion 852a disposed on the right side of the motor assembly 810, and a left locking protrusion 852b disposed on the left side of the motor assembly 810.

The right locking protrusion 852a may be disposed between the right slider 860a and the second right bearing 830b. Additionally, the second right spring 851a may be disposed between the right slider 860a and the second right bearing 830b. One end of the second right spring 851a may be brought into contact with or separated from the right slider 860a. The other end of the second right spring 851a may be brought into contact with or separated from the right locking protrusion 852a.

When the second arm 912a fully lies down with respect to the base 31, a distance between the right slider 860a and the right locking protrusion 852a may be a distance RD4. The second right spring 851a may have a length greater than the distance RD4 in a state in which it is not compressed or extended. Accordingly, when the second arm 912a fully lies down with respect to the base 31, the second right spring 851a may be compressed between the right slider 860a and the right locking protrusion 852a. Further, the second right spring 851a may provide a restoring force to the right slider 860a in the +x-axis direction.

When the state of the second arm 912a changes from the state of fully lying down with respect to the base 31 to a standing state, a restoring force provided by the second right spring 851a may assist the second arm 912a to stand up. A load of the motor assembly 810 may be reduced because the second right spring 851a assists the second arm 912a to stand up.

The lead screws 840a and 840b may be driven by a single motor assembly 810. Since the lead screws 840a and 840b are driven by the single motor assembly 810, the second arms 912a and 912b may stand up symmetrically. When the lead screws 840a and 840b are driven by the single motor assembly 810, however, a load applied to the motor assembly 810 to raise the second arms 912a and 912b may be excessively increased. In this case, since the second right spring 851a assists the second arm 912a to stand up, a load of the motor assembly 810 may be reduced and a load applied to the motor assembly 810 to raise the second arms 912a may be reduced.

Alternatively, when the state of the second arm 912a changes from the state of fully standing up with respect to the base 31 to a state of fully lying down, a restoring force provided by the second right spring 851a may reduce an impact generated when the second arm 912a lies down with respect to the base 31. That is, when the second arm 912a lies down with respect to the base 31, the second right spring 851a may serve as a damper. A load of the motor assembly 810 may be reduced because the second right spring 851a plays the role of a damper.

A structure formed by the second left spring 851b, the left locking protrusion 852b, the left slider 860b, the left guides 850c and 850d, and the second arm 912a may be symmetrical to the structure formed by the second right spring 851a, the right locking protrusion 852a, the right slider 860a, the right guides 850a and 850b, and the second arm 912a. In this case, the symmetry axis may be the symmetry axis "ys" of the motor assembly 810.

Figure 50:
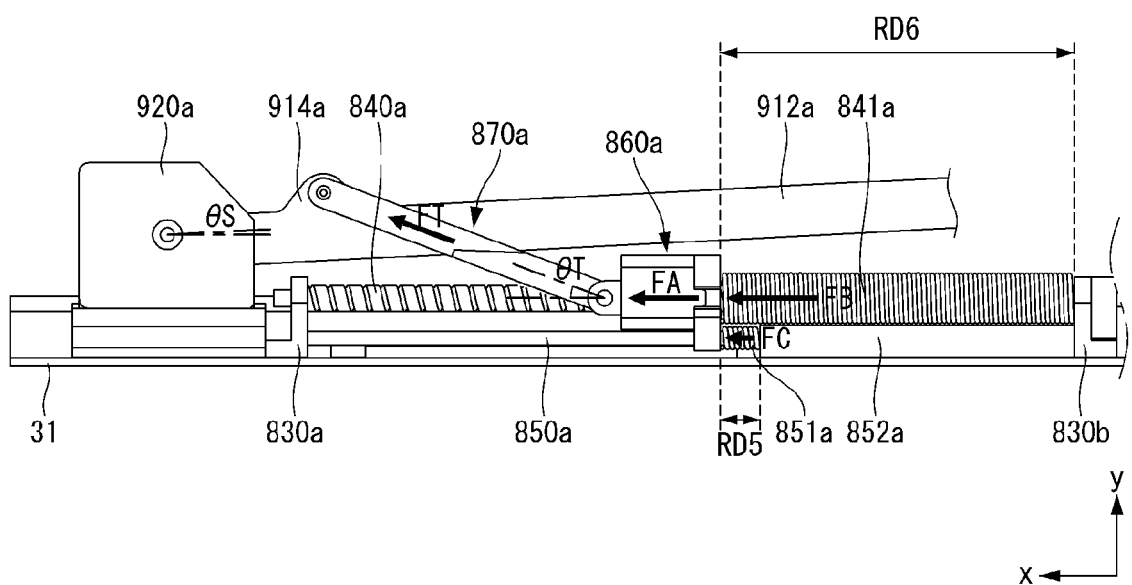
Figure 51:
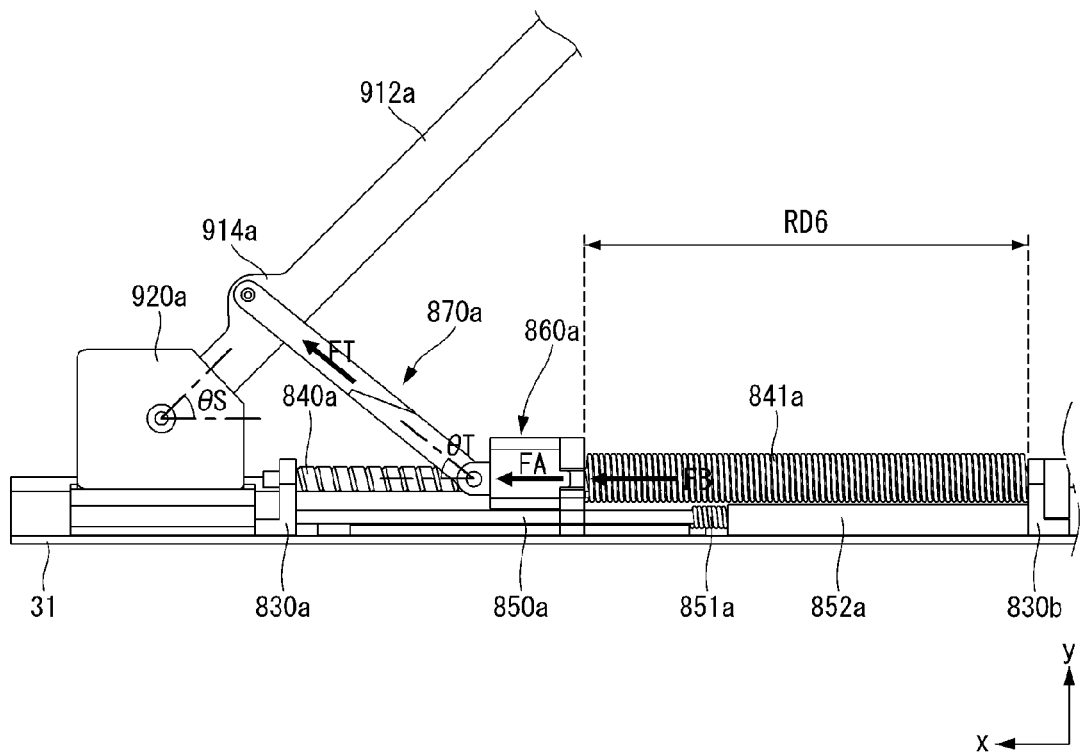
Figure 52:
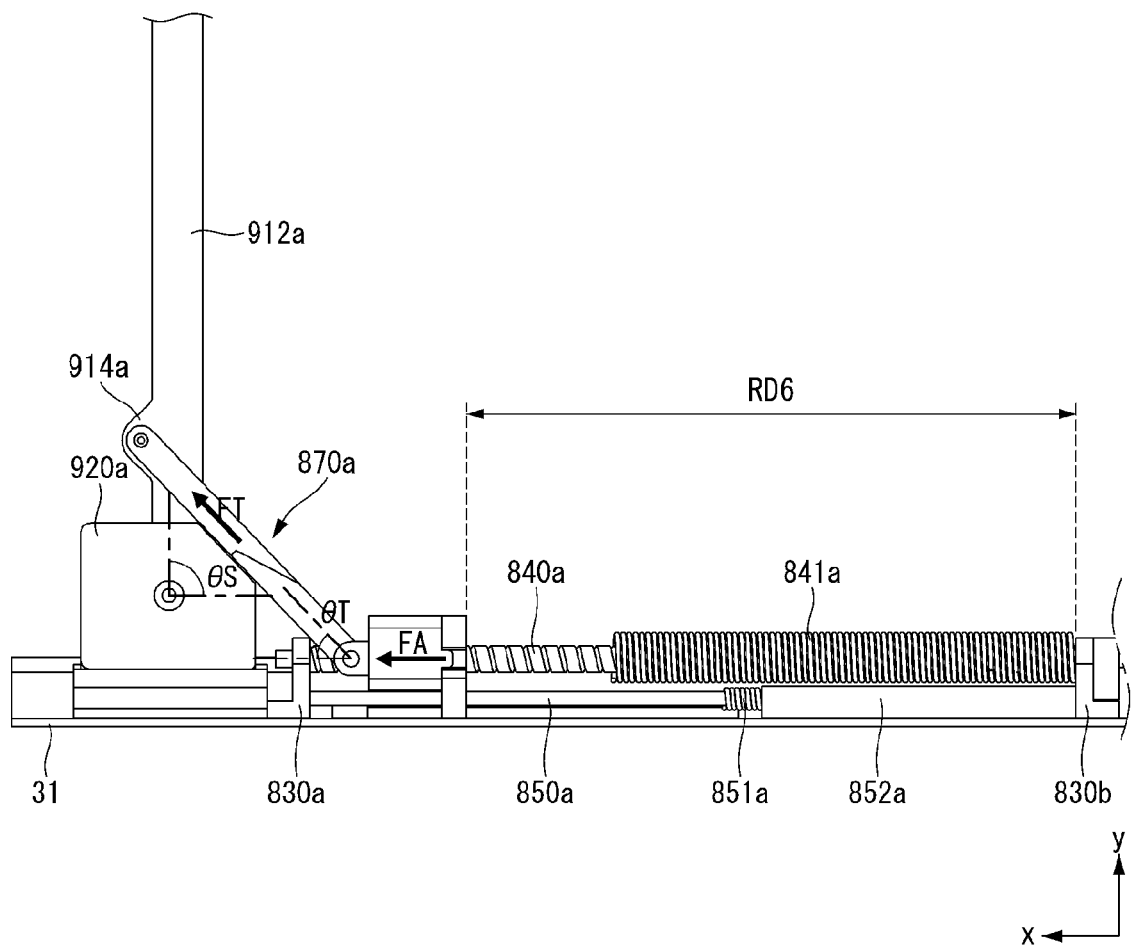

Referring to FIGS. 50 to 52, the second arm 912a may stand up using restoring forces provided by the first right spring 841a and the second right spring 851a.

An angle formed by the second arm 912a and the base 31 may be called "θS". An angle formed by the right rod 870a and the base 31 may be called "θT". A force by which the motor assembly 810 moves the right slider 860a to the +x-axis direction may be called FA. A force, applied from the first right spring 841a to the right slider 860a, may be called FB. A force, applied from the second right spring 851a to the right slider 860a, may be called FC. A force, transferred from the right rod 870a to the second arm 912a, may be called FT.

When the second arm 912a fully lies down with respect to the base 31, the angle "θS" and the angle "θT" may have a minimum value. When the state of the second arm 912a changes from the state in which it fully lies down with respect to the base 31 to a standing state, the angle "θS" and the angle "θT" may gradually increase.

When the second arm 912a fully lies down with respect to the base 31, the first right spring 841a may be compressed. The compressed first right spring 841a may provide the restoring force FB to the right slider 860a. The restoring force FB may act in the +x direction. When the second arm 912a fully lies down with respect to the base 31, compression displacement of the first right spring 841a may be at a maximum level, and the restoring force FB may have a maximum value. When the state of the second arm 912a changes from the state of fully lying down with respect to the base 31 to a standing state, compression displacement of the first right spring 841a may be gradually decreased, and magnitude of the restoring force FB may be gradually decreased.

When the second arm 912a fully lies down with respect to the base 31, the second right spring 851a may be compressed. The compressed second right spring 851a may provide the restoring force FC to the right slider 860a. The restoring force FC may act in the +x direction. When the second arm 912a fully lies down with respect to the base 31, compression displacement of the second right spring 851a may be at a maximum level, and the restoring force FC may have a maximum value. When the state of the second arm 912a changes from the state of fully lying down with respect to the base 31 to a standing state, compression displacement of the second right spring 851a may be gradually decreased, and magnitude of the restoring force FC may be gradually decreased.

The force FT, transferred from the right rod 870a to the second arm 912a, may be a resultant force of the force FA by which the motor assembly 810 moves the right slider 860a to the +x-axis direction, the restoring force FB of the first right spring 841a and the restoring force FC of the second right spring 851a.

When the second arm 912a starts to stand up in the state in which the second arm 912a fully lies down with respect to the base 31, a load of the motor assembly 810 may be at a maximum level. In this case, the restoring force FB provided by the first right spring 841a may be at a maximum level. Further, the restoring force FC provided by the second springs 851a and 851b may be at a maximum level.

When the state of the second arm 912a changes from the state in which it fully lies down with respect to the base 31 to the standing state, the restoring forces provided by the first right spring 841a and the second right spring 851a may assist the second arm 912a to stand up. A load of the motor assembly 810 may be reduced because the first right spring 841a and the second right spring 851a assist the second arm 912a to stand up.

The first right spring 841a and the second right spring 851a may provide restoring forces (i.e., the resultant force of the restoring force FB and the restoring force FC) to the right slider 860a at the same time. The restoring forces (i.e., the resultant force of the restoring force FB and the restoring force FC) may be provided to the right slider 860a until a distance RD5 between the right slider 860a and the right locking protrusion 852a equals the length of the second right spring 851a.

When the distance RD5 between the right slider 860a and the right locking protrusion 852a equals the length of the second right spring 851a, compression displacement of the second right spring 851a may become 0. When the compression displacement of the second right spring 851a becomes 0, the restoring force FC, provided from the second right spring 851a to the right slider 860a, may become 0.

When the distance RD5 between the right slider 860a and the right locking protrusion 852a becomes greater than the length of the second right spring 851a, only the first right spring 841a may provide the restoring force FB to the right slider 860a. The restoring force FB may be provided to the right slider 860a until a distance RD6 between the right slider 860a and the second right bearing 830b equals the length of the first right spring 841a.

When the distance RD6 between the right slider 860a and the second right bearing 830b equals the length of the first right spring 841a, compression displacement of the first right spring 841a may become 0. When the compression displacement of the first right spring 841a becomes 0, the restoring force FB, provided from the first right spring 841a to the right slider 860a, may become 0.

When the distance RD6 between the right slider 860a and the second right bearing 830b becomes greater than the length of the first right spring 841a, the motor assembly 810 may raise the second arm 912a without using a restoring force provided by the first right spring 841a or the second right spring 851a.

A structure formed by the first left spring 841b, the second left spring 851b, the left locking protrusion 852b, the left slider 860b, the left guides 850c and 850d, the left lead screw 840b, the left rod 870b, and the second arm 912a may be symmetrical to the structure formed by the first right spring 841a, the second right spring 851a, the right locking protrusion 852a, the right slider 860a, the right guides 850a and 850b, the right lead screw 840a, the right rod 870a, and the second arm 912a. In this case, the symmetry axis may be the symmetry axis "ys" of the motor assembly 810.

Figure 53:
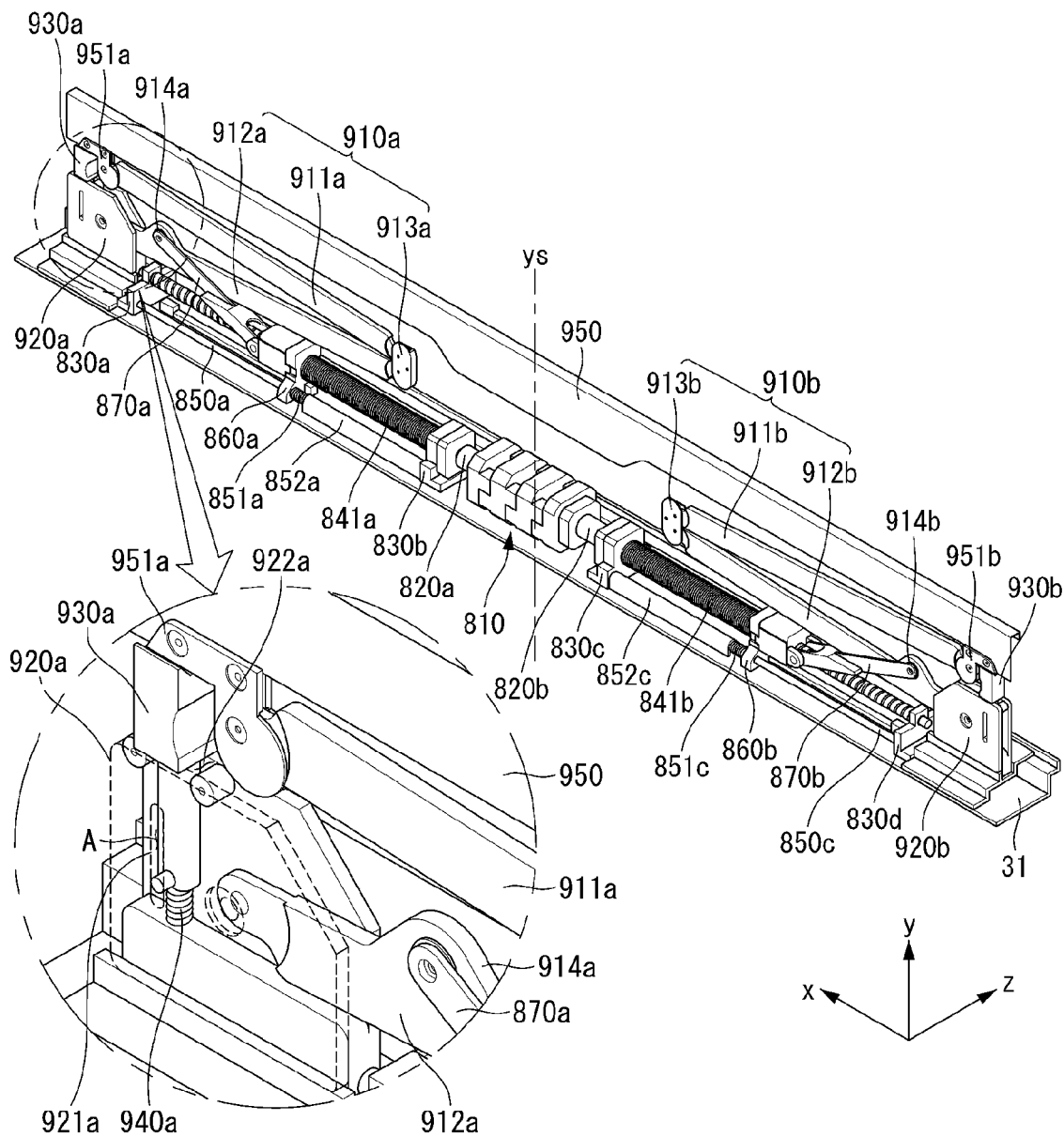

Referring to FIG. 53, pushers 930a and 930b may be connected to the link mounts 920a and 920b. The pushers 930a and 930b may include a right pusher 930a disposed on the right side of the motor assembly 810, and a left pusher 930b disposed on the left side of the motor assembly 810.

The link mounts 920a and 920b may form an accommodation space A. The accommodation space A may accommodate springs 940a and 940b and the pushers 930a and 930b. The springs 940a and 940b may include the right spring 940a disposed on the right side of the motor assembly 810, and the left spring 940b disposed on the left side of the motor assembly 810. The accommodation space A may also be referred to as an internal space A.

The link mount 920a and 920b may include a first hole 922a (e.g., a first hole corresponding the link mount 920b not illustrated) that connects the accommodation space A and an external space. The first hole 922a may be formed on an upper surface of the link mounts 920a and 920b. The first hole 922a may also be referred to as a hole 922a.

The pushers 930a and 930b may be disposed in a direction vertical to the base 31. Alternatively, the pushers 930a and 930b may be disposed in parallel to the y axis. The springs 940a and 940b may be disposed in a direction vertical to the base 31. Alternatively, the springs 940a and 940b may be disposed in a direction parallel to the y axis.

The pushers 930a and 930b may include first parts 931a and 931b and second parts 932a and 932b, respectively. The second parts 932a and 932b may be connected to lower sides of the first parts 931a and 931b. Lower ends of the second parts 932a and 932b may be connected to the springs 940a and 940b. All or some of the second parts 932a and 932b may be accommodated in the accommodation space A formed by the link mounts 920a and 920b. Each of the second parts 932a and 932b may have a diameter the same as or smaller than that of the first hole 922a. The second parts 932a and 932b may pass through the first hole 922a.

The first parts 931a and 931b may be disposed outside the link mounts 920a and 920b. Alternatively, the first parts 931a and 931b may be disposed outside the accommodation space A of the link mounts 920a and 920b. Each of the first parts 931a and 931b may have a greater diameter than the first hole 922a.

The first parts 931a and 931b may contact the link brackets 951a and 951b or may be spaced apart from the link brackets 951a and 951b. For example, when the second arms 912a and 912b fully lie down with respect to the base 31, the first parts 931a and 931b may contact the link brackets 951a and 951b. Alternatively, when the second arms 912a and 912b fully stands up with respect to the base 31, the first parts 931a and 931b may be spaced apart from the link brackets 951a and 951b.

When the first parts 931a and 931b come into contact with the link brackets 951a and 951b, forces from the link brackets 951a and 951b may be applied to the pushers 930a and 930b. The forces applied to the pushers 930a and 930b may act downward. Alternatively, the forces applied to the pushers 930a and 930b may act in the −y-axis direction. Alternatively, the link brackets 951a and 951b may pressurize the pushers 930a and 930b. The direction, in which the link brackets 951a and 951b pressurize the pushers 930a and 930b, may be a downward direction. Alternatively, the direction, in which the link brackets 951a and 951b pressurize the pushers 930a and 930b, may be the −y-axis direction.

When the forces are applied to the first parts 931a and 931b, the springs 940a and 940b may be compressed. The compressed springs 940a and 940b may provide restoring forces to the pushers 930a and 930b. The restoring forces may act in a direction opposite the direction in which the forces are applied to the first parts 931a and 931b. Alternatively, the restoring force may act in the +y-axis direction.

The link mount 920a and 920b may include a second hole 921a (a second hole corresponding to the link mount 920b not illustrated). The second hole 921a may connect the accommodation space A and an external space. All or some of the springs 940a and 940b may be exposed to the outside through the second hole 921a. All or some of the pushers 930a and 930b may be exposed to the outside through the second hole 921a. For maintenance and repairs of the display device, a service provider may check an operating state of the pushers 930a and 930b through the second hole 921a. The second hole 921a may provide a service provider with maintenance or repair convenience.

Figure 54:
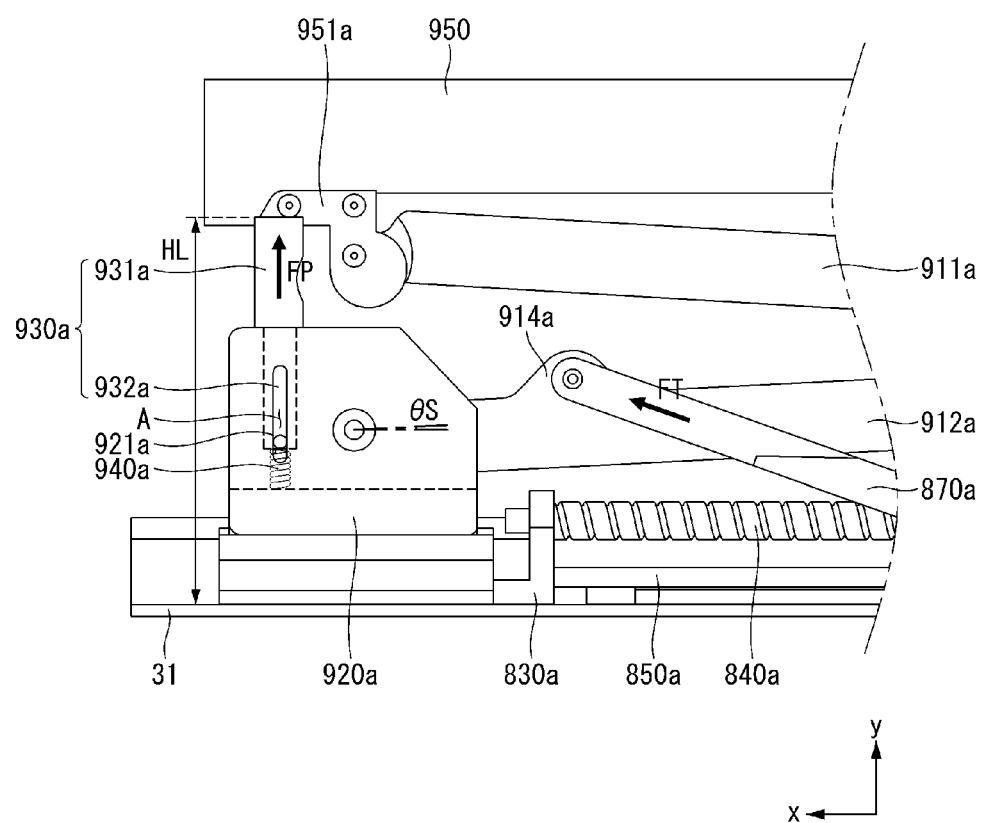
Figure 55:
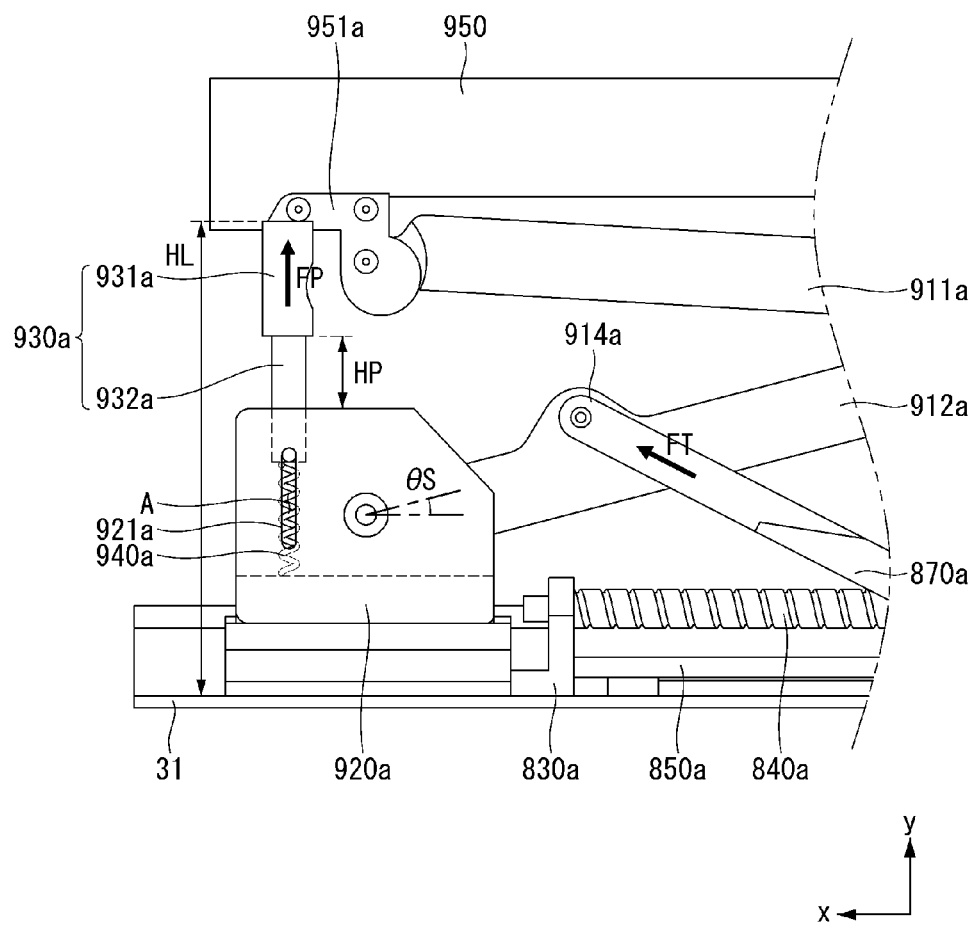
Figure 56:
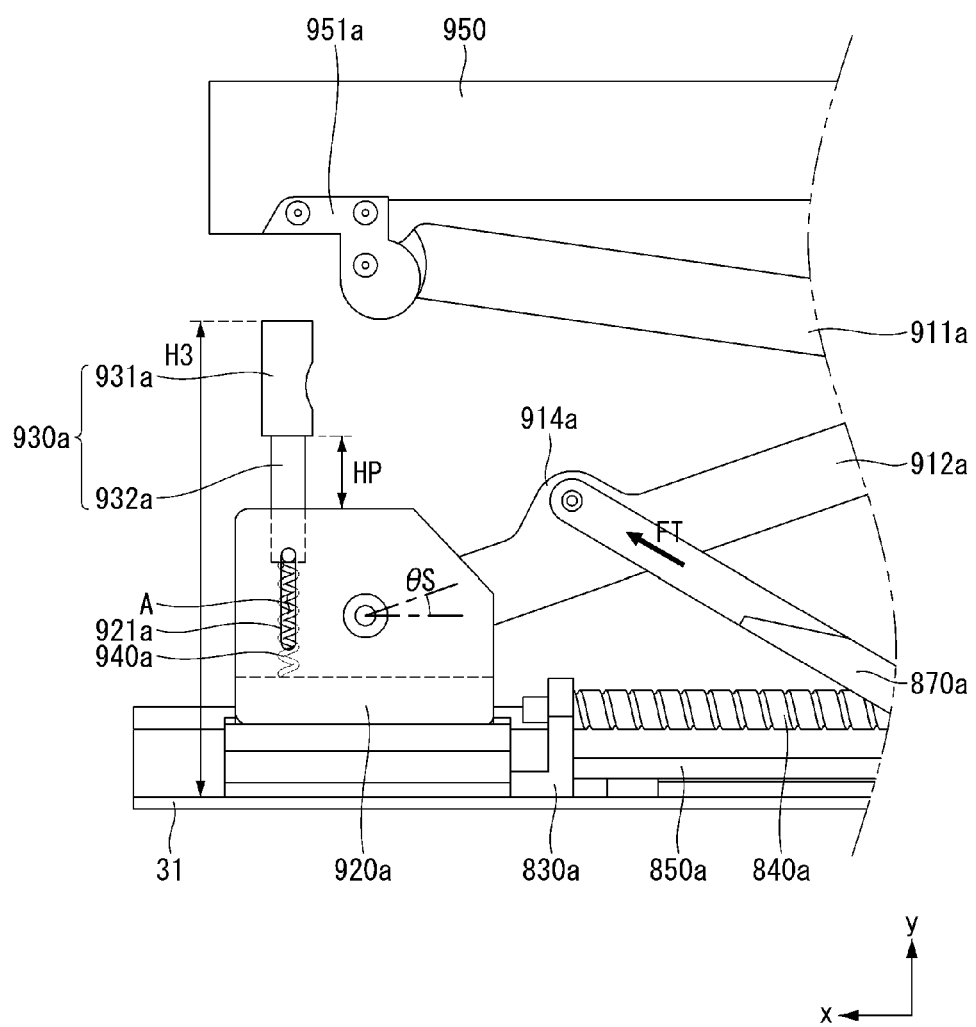

Referring to FIGS. 54 to 56, the right link 910a may stand up using the restoring force provided by the right pusher 930a. The right link 910a is described below, for example.

An angle formed by the second arm 912a and the base 31 may be called "θS." A force, transferred from the right rod 870a to the second arm 912a, may be called FT. A force, transferred from the right pusher 930a to the right link bracket 951a, may be called FP.

Referring to FIG. 54, when the second arm 912a fully lies down with respect to the base 31, the angle "θS" may have a minimum value. The right spring 940a connected to the right pusher 930a may be compressed as much as possible, and magnitude of the restoring force FP may have a maximum value. The compressed right spring 940a may provide the restoring force FP to the right pusher 930a. The right pusher 930a may transfer the restoring force FP to the right link bracket 951a. The restoring force FP may act in the +y-axis direction.

When the second arm 912a fully lies down with respect to the base 31, a distance HL from the base 31 to an upper end of the right pusher 930a may have a minimum value. The first part 931a of the right pusher 930a may protrude out of the right link mount 920a. The second part 932a of the right pusher 930a may be fully accommodated in the accommodation space 923a of the right link mount 920a.

Referring to FIG. 55, when the state of the second arm 912a changes from the state of fully lying down with respect to the base 31 to a standing state, the angle "θS" may gradually increase. Compression displacement of the right spring 940a may gradually decrease, and the magnitude of the restoring force FP may gradually decrease.

As the angle "θS" gradually increases, at least part of the second part 932a of the right pusher 930a may protrude out of the right link mount 920a. A length in which the second part 932a of the right pusher 930a protrudes out of the right link mount 920a may be referred to as HP. The distance HL from the base 31 to the upper end of the right pusher 930a may be increased by the length HP compared to the distance HL when the second arm 912a fully lies down with respect to the base 31.

Referring to FIG. 56, when the second arm 912a stands up with respect to the base 31, the right pusher 930a and the right link bracket 951a may be separated from each other. In this case, compression displacement of the right spring 940a may become 0. When the compression displacement of the right spring 940a becomes 0, the restoring force FP, provided from the right pusher 930a to the right link bracket 951a, may become 0.

Additionally, the length HP, at which the second part 932a of the right pusher 930a protrudes out of the right link mount 920a, may have a maximum value. Further, the distance HL from the base 31 to the upper end of the right pusher 930a may have a maximum value.

That is, while the right pusher 930a is in contact with the right link bracket 951a, the right pusher 930a may apply the restoring force to the right link bracket 951a. Accordingly, the restoring force may assist the second arm 912a to stand up and may reduce a load of the motor assembly 810.

The lead screws 840a and 840b may be driven by a single motor assembly 810. Since the lead screws 840a and 840b are driven by the single motor assembly 810, the second arms 912a and 912b may stand up symmetrically. When the lead screws 840a and 840b are driven by the single motor assembly 810, however, a load applied to the motor assembly 810 to raise the second arms 912a and 912b may be excessively increased. In this case, since the right pusher 930a applies the restoring force to the right link bracket 951a, the restoring force may assist the second arm 912a to stand up and may reduce a load of the motor assembly 810.

Alternatively, when the state of the second arm 912a changes from the state of standing with respect to the base 31 to the state of fully lying down, the restoring force, provided from the right pusher 930a to the right link bracket 951a, may reduce an impact generated when the link 910a lies down with respect to the base 31. That is, the restoring force, provided from the right pusher 930a to the right link bracket 951a, may serve as a damper when the link 910a lies down with respect to the base 31. A load of the motor assembly 810 may be reduced because the right pusher 930a plays the role of a damper.

A structure formed by the left pusher 9301o, the left spring 940b, the left link bracket 951b, the left link mount 920b, and the left rod 870b may be symmetrical to the structure formed by the right pusher 930a, the right spring 940a, the right link bracket 951a, the right link mount 910a, and the right rod 870a. In this case, the symmetry axis may be the symmetry axis "ys" of the motor assembly 810.

Figure 57:
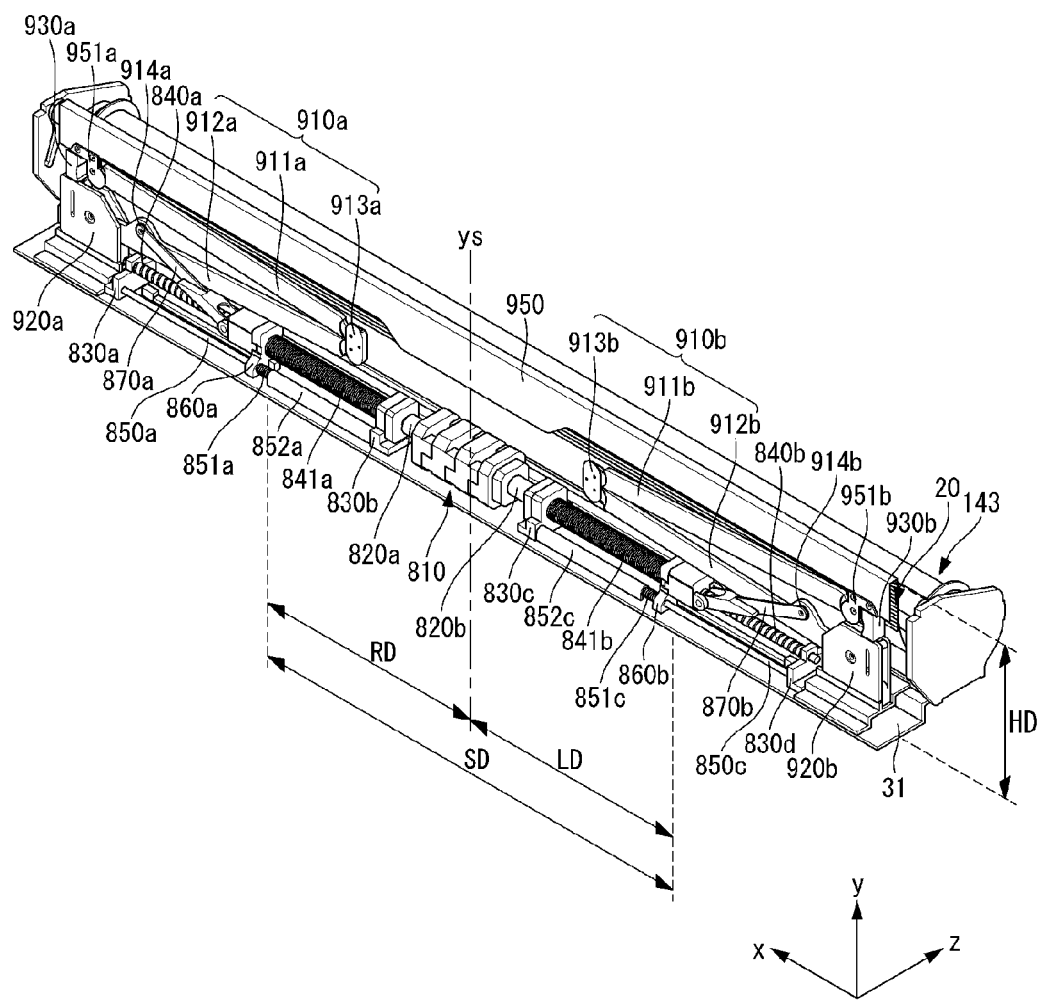
Figure 58:
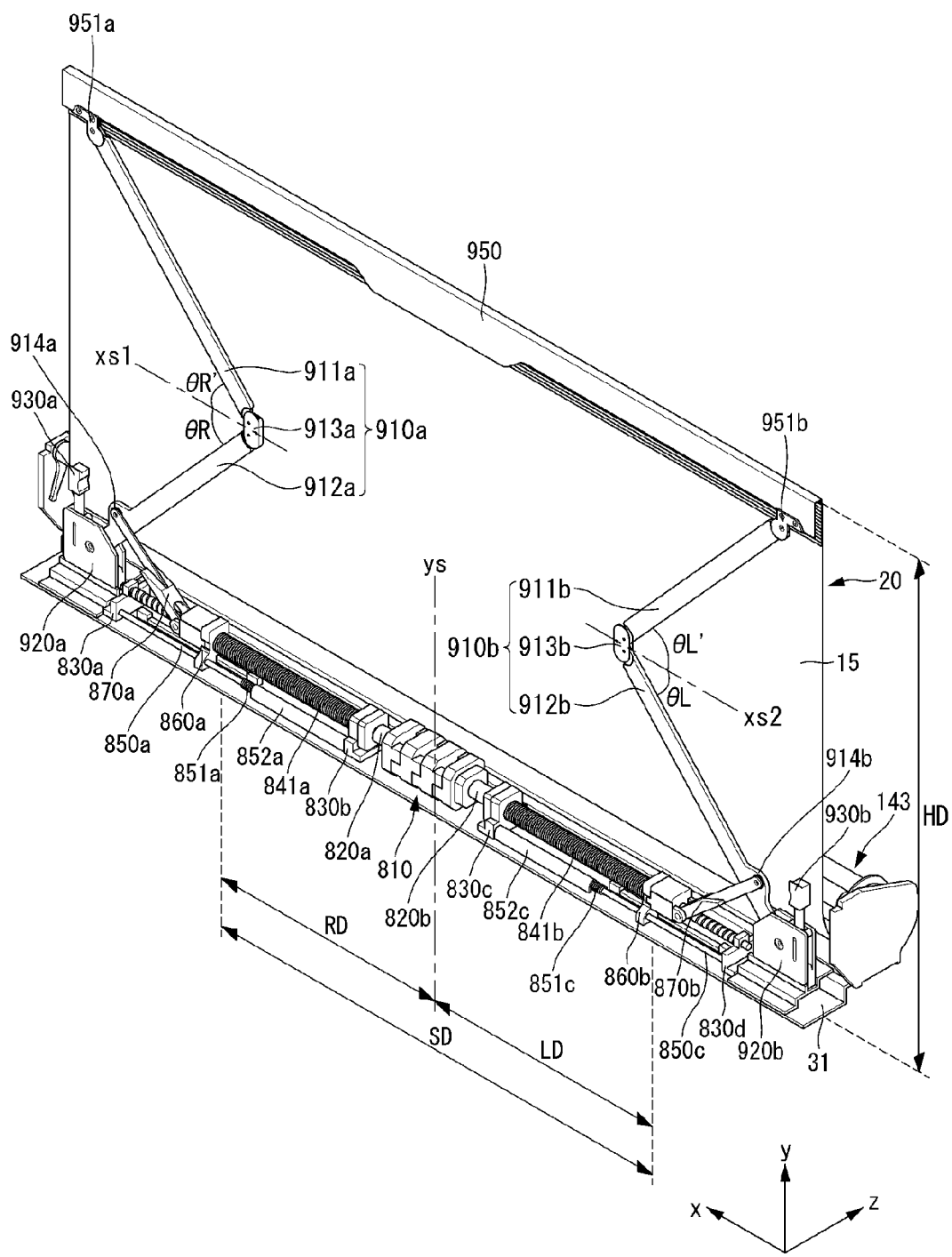
Figure 59:
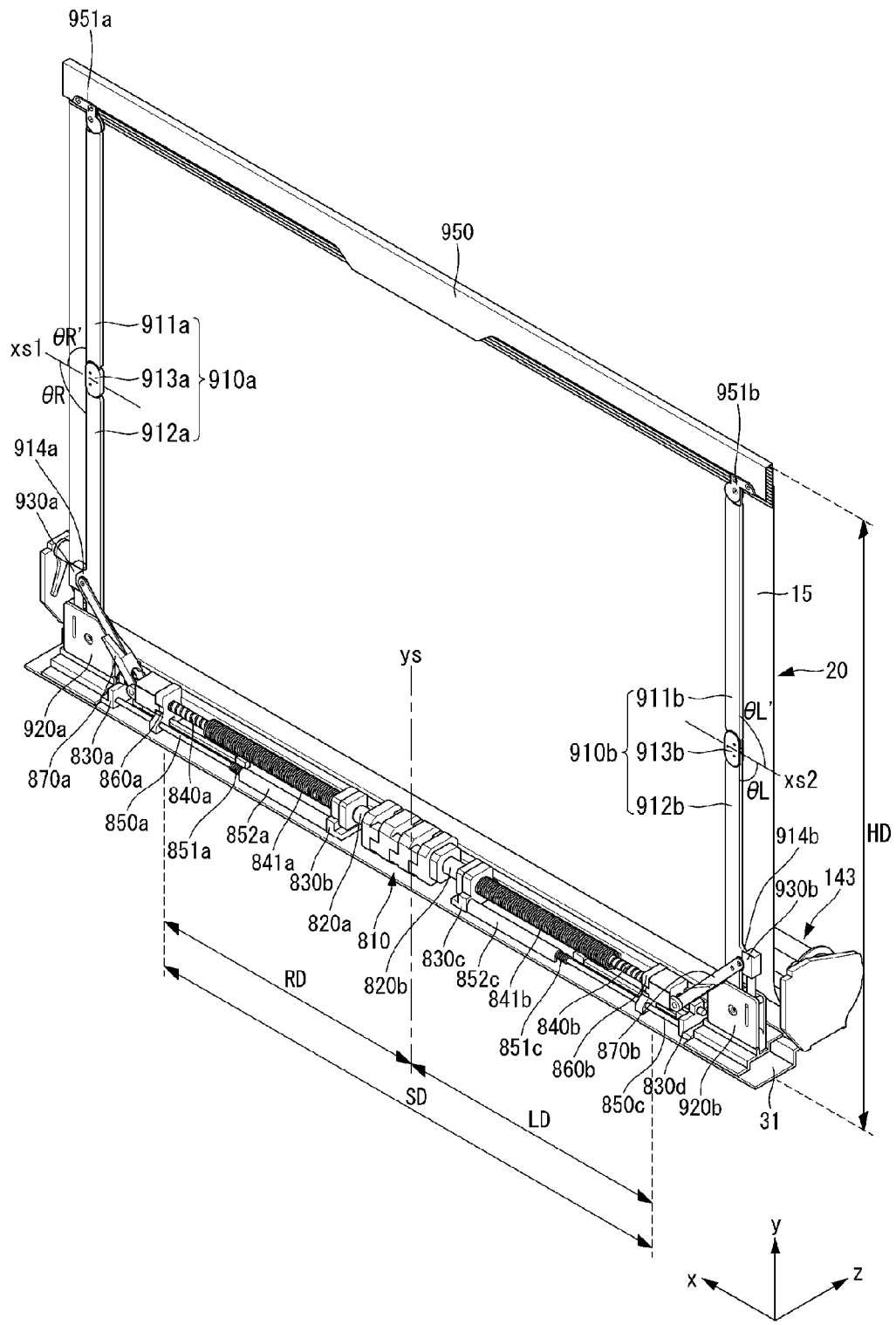

Referring to FIGS. 57 to 59, the panel roller 143 may be installed on the base 31. The panel roller 143 may be disposed at the front of the lead screws 840a and 840b. Alternatively, the panel roller 143 may be disposed in parallel to the longitudinal direction of the lead screws 840a and 840b. Alternatively, the panel roller 143 may be spaced from the lead screws 840a and 840b.

The flexible display 20 may include the display panel 10 and the module cover 15. A lower side of the flexible display 20 may be connected to the panel roller 143, and an upper side of the flexible display 20 may be connected to the upper bar 75. The flexible display 20 may be wound around or unwound from the panel roller 143.

A distance from the symmetry axis "ys" of the motor assembly 810 to the right slider 860a may be called a distance RD. A distance from the symmetry axis "ys" of the motor assembly 810 to the left slider 860b may be called a distance LD. A distance between the right slider 860a and the left slider 860b may be called a distance SD. The distance SD may be a sum of the distance RD and the distance LD. A distance from the base 31 to the upper end of the flexible display 20 may be called a distance HD.

Referring to FIG. 57, when the second arms 912a and 912b fully lie down with respect to the base 31, the distance SD between the right slider 860a and the left slider 860b may have a minimum value. The distance RD from the symmetry axis "ys" of the motor assembly 810 to the right slider 860a and the distance LD from the symmetry axis "ys" of the motor assembly 810 to the left slider 860b may be the same.

When the second arms 912a and 912b fully lie down with respect to the base 31, the distance HD from the base 31 to the upper end of the flexible display 20 may have a minimum value.

When the second arms 912a and 912b fully lie down with respect to the base 31, the first springs 841a and 841b may contact the sliders 860a and 860b. Further, the second springs 851a and 851b may contact the sliders 860a and 860b. Furthermore, the pushers 930a and 930b may contact the link brackets 951a and 951b.

When the second arms 912a and 912b fully lie down with respect to the base 31, an amount of compression of the first springs 841a and 841b may have a maximum value, and magnitude of restoring forces, provided from the first springs 841a and 841b to the sliders 860a and 860b, may have a maximum value.

When the second arms 912a and 912b fully lie down with respect to the base 31, an amount of compression of the second springs 851a and 851b may have a maximum value, and magnitude of restoring forces, provided from the second springs 851a and 851b to the sliders 860a and 860b, may have a maximum value.

When the second arms 912a and 912b fully lie down with respect to the base 31, an amount of compression of the springs 940a and 940b may have a maximum value, and magnitude of restoring forces, provided from the springs 940a and 940b to the pushers 930a and 930b, may have a maximum value.

When the second arms 912a and 912b start to stand up with respect to the base 31, the second arms 912a and 912b may stand up using the restoring forces provided by the first springs 841a and 841b, the second springs 851a and 851b, and the springs 940a and 940b. Accordingly, a load applied to the motor assembly 810 may be reduced.

Referring to FIG. 58, as the second arms 912a and 912b stand up with respect to the base 31, the distance SD between the right slider 860a and the left slider 860b may gradually increase. Although the distance SD increases, the distance LD and the distance RD may be the same. That is, the right slider 860a and the left slider 860b may be disposed symmetrically with respect to the symmetry axis "ys" of the motor assembly 810. Further, a degree to which the second arms 912a and 912b of the right link 910a stand up with respect to the base 31, and a degree to which the second arms 912a and 912b of the left link 910b stand up with respect to the base 31 may be the same.

As the second arms 912a and 912b stand up with respect to the base 31, the distance HD from the base 31 to the upper end of the flexible display 20 may gradually increase. The flexible display 20 may be unwound from the panel roller 143. Alternatively, the flexible display 20 may be unfolded from the panel roller 143.

When the second arms 912a and 912b sufficiently stand up with respect to the base 31, the first springs 841a and 841b may be separated from the sliders 860a and 860b. Additionally, when the second arms 912a and 912b sufficiently stand up with respect to the base 31, the second springs 851a and 851b may be separated from the sliders 860a and 860b. Further, when the second arms 912a and 912b sufficiently stand up with respect to the base 31, the pushers 930a and 930b may be separated from the link brackets 951a and 951b.

The separation of the first springs 841a and 841b from the sliders 860a and 860b, the separation of the second springs 851a and 851b from the sliders 860a and 860b, and the separation of the pushers 930a and 930b from the link brackets 951a and 951b may be independently performed. That is, the sequence of the separation of the first springs 841a and 841b from the sliders 860a and 860b, the separation of the second springs 851a and 851b from the sliders 860a and 860b, and the separation of the pushers 930a and 930b from the link brackets 951a and 951b may vary.

An angle formed by an axis "xs1" parallel to the base 31 and the second arm 912a may be referred to as "θR." Additionally, an angle formed by the axis "xs1" parallel to the base 31 and the first arm 911a may be referred to as "θR". The axis "xs1" and the x axis may be in parallel with each other.

When the second arm 912a fully lies down with respect to the base 31, or while the second arm 912a stands up with respect to the base 31, or when the second arm 912a finishes standing up with respect to the base 31, the angle θR and the angle θR' may remain identical.

An angle formed by an axis "xs2" parallel to the base 31 and the second arm 912b may be referred to as "θL". Additionally, an angle formed by the axis "xs2" parallel to the base 31 and the first arm 911b may be referred to as "θL". The axis "xs2" and the x axis may be in parallel with each other.

When the second arm 912b fully llies down with respect to the base 31, or while the second arm 912b stands up with respect to the base 31, or when the second arm 912b finishes standing up with respect to the base 31, the angle θL and the angle θL' may remain identical.

The axis "xs1" and the axis "xs2" may be the same axis.

Referring to FIG. 59, when the second arms 912a and 912b fully stand up with respect to the base 31, the distance SD between the right slider 860a and the left slider 860b may have a maximum value. Although the distance SD is a maximum value, the distance LD and the distance RD may be the same.

When the second arms 912a and 912b fully stand up with respect to the base 31, the distance HD from the base 31 to the upper end of the flexible display 20 may have a maximum value.

Figure 60:
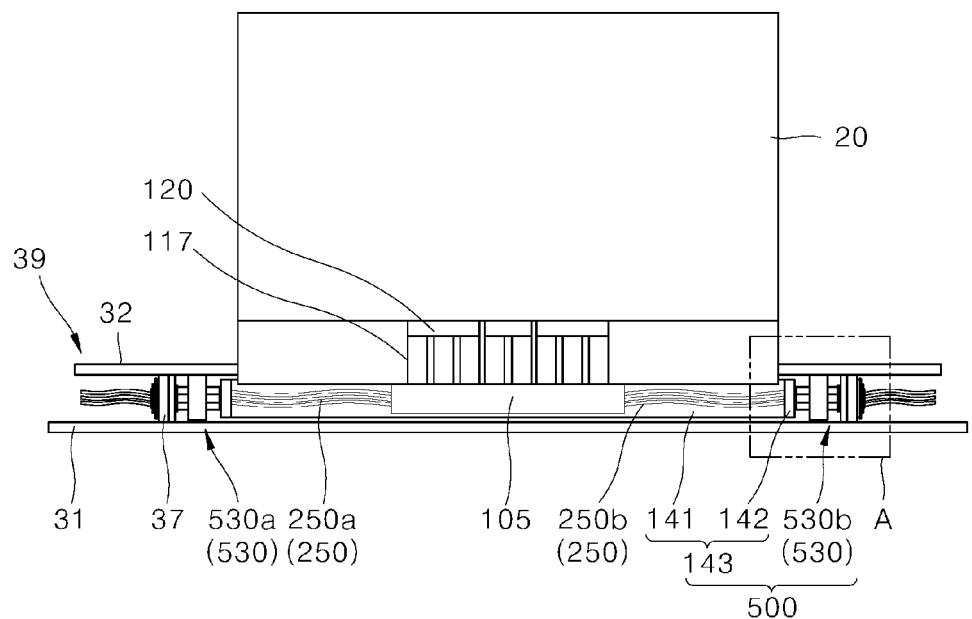
FIG. 60 is a view showing some components of an example display device.

FIG. 60 is a view showing only some components of a display device.

Referring to FIG. 60, the display device according to one embodiment may include a flexible display 20, a support frame 39, at least one source PCB 120, a timing controller board 105, cables 117 connecting the source PCB 120 and the timing controller board 105, and a roller 500.

The housing 30 (see FIG. 1) may accommodate the support frame 39 and the roller 500. For example, a main board, a power supplier and the like may be installed in the housing 30. The support frame 39 may include a first base 31, a second base 32, and a side support plate 37 disposed between the first base 31 and the second base 32 and configured to separate the first base 31 from the second base 32. The support frame 39 may rotatably support the roller 500.

The roller 500 may include a panel roller 143 and a pair of elastic assemblies 530 disposed on both sides of the panel roller 143 outside the panel roller 143. The pair of elastic assemblies 530 may be respectively coupled to both ends of the panel roller 143 and provide elastic force to the panel roller 143 in a direction in which the flexible display 20 is wound. The elastic assemblies 530 are described hereunder with reference to FIGS. 61 to 65.

The roller 500 may be rotatably supported by the support frame 39. For example, the elastic assemblies 530 coupled to the panel roller 143 may be rotatably supported by the side support plate 37 of the support frame 39.

The flexible display 20 may be wound around an outer circumferential surface of a panel roller 520 or unwound from the panel roller 143. The panel roller 143, for example, may include a cylinder-shaped roller cover 141, and cover fixation parts 142 coupled to both ends of the roller cover 141. Both of the ends of the roller cover 141 may be fixed to the cover fixation parts 142. In a state in which the cover fixation parts 142 are partially inserted into both of the ends of the roller cover 141, the roller cover 141 may be fixed to the cover fixation parts 142.

In case the timing controller board 105 is disposed outside the panel roller 143, i.e., in the housing 30, lengths of the cables 117 extending from the source PCB 120 may increase, and the cables 117 may be twisted or cut as a result of rotation of the panel roller 143. In one embodiment, the timing controller board 105 may be installed in the panel roller 143, i.e., the roller cover 141. Accordingly, as the timing controller board 105 rotates along with the panel roller 143, the cables 117 connecting the timing controller board 105 and the source PCB 120 may be prevented from being twisted or cut. Additionally, since the timing controller board 105 may be installed in the panel roller 143, a space of the housing 30 may be saved. The timing controller board 105 and a main board outside the roller cover 143 may be connected by a smaller number and size of cables 250 than the cables 117. Thus, when the timing controller board 105 is installed in the roller cover 143, the cables 250 may be easily drawn outward through the panel roller 143.

The timing controller board 105 may be connected to the main board, the power supplier and the like in the housing 30 through the cables 250. For example, the cables 250 may include a first cable 250a connecting the timing controller board 105 and the main board, and a second cable 250b connecting the timing controller board 105 and the power supplier. In this case, a plurality of first cables 250a and a plurality of second cables 250b may be provided.

The first cable 250a may connect the timing controller board 105 and the main board through a through hole of a first elastic assembly 530a coupled to one end of the panel roller 143. The second cable 250b may connected the timing controller board 105 with the power supplier through a through hole of a second elastic assembly 530b coupled to the other end of the panel roller 250. Elastic assemblies 530a and 530b disposed at both ends of the panel roller 143 may have a through hole, thereby enabling cables 250a and 250b extending from a timing controller board 105 in the panel roller 143 to connect to the outside through both ends of the panel roller 143.

Figure 67:
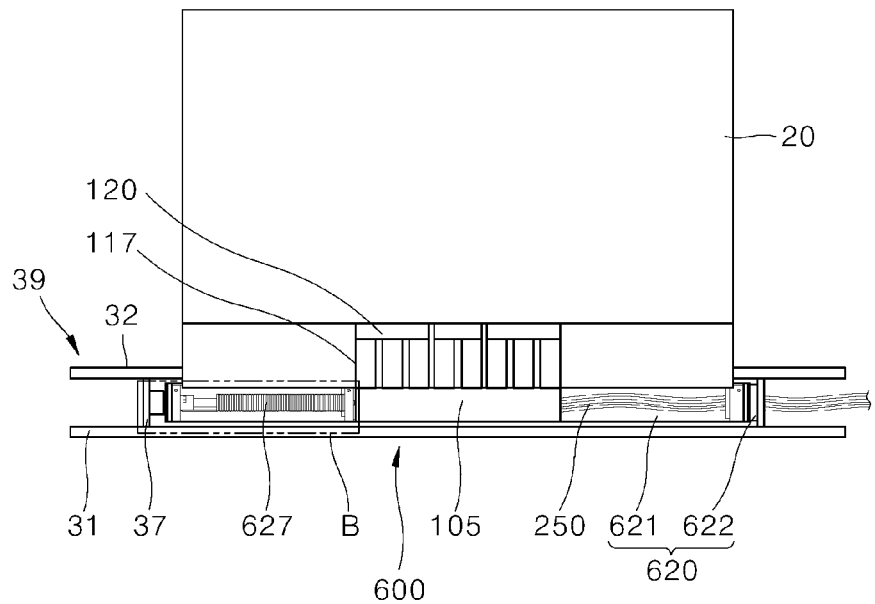
FIGS. 67 and 68 are views showing some components of a comparative example display device.
Figure 68:
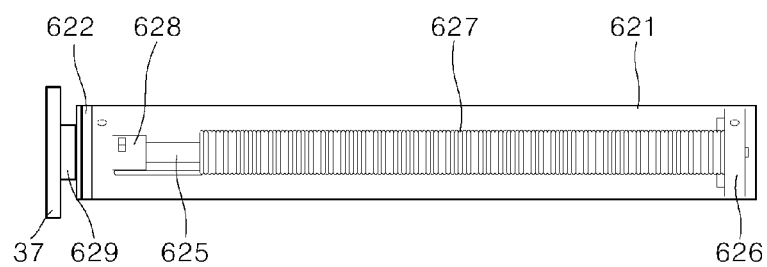

When the flexible display 20 is unwound from the panel roller 620 and is ready to display an image in case a spring 627 provides elastic force only to one end (a left end in the drawings) of the panel roller 620, as in comparative examples of FIGS. 67 and 68, tension in left and right areas of the display panel 10 (see FIG. 3) may not be balanced. That is, the tension in the left area of the display panel 10 may be greater than the tension in the right area of the display panel 10. When the tension in both of the area is greatly unbalanced, the right area of the display panel 10 having a lower tension may look uneven. On the contrary, in one embodiment, the elastic assemblies 530 may be disposed at both ends of the panel roller 143 and apply the same magnitude of elastic forces to both ends of the panel roller 143. Accordingly, when the flexible display 20 is unwound from the panel roller 620 and is ready to display an image, the tension in the left and right areas of the display panel 10 may be balanced. That is, the tension in the left area of the display panel 10 may be equal to the tension in the right area of the flexible display panel 10.

In case the spring 627 provides elastic force only to one end (the left end in the drawings) of the panel roller 620, as in comparative examples of FIGS. 67 and 68, a height of an upper end in the left and right areas of the display panel 10 may differ in the state in which the flexible display 20 is fully unwound from the panel roller 620. That is, the upper end of the display panel 10 may tilt and the left end of the display panel 10 may be lower than the right end of the display panel 10. On the contrary, in one embodiment, the elastic assemblies 530 may be disposed at both of the ends of the panel roller 143 and apply the same magnitude of elastic forces to both of the ends of the panel roller 143. Accordingly, when the flexible display 20 is unwound from the panel roller 620 and is ready to display an image, the height of the upper end in the left area of the display panel 10 may be equal to the height of the upper end in the right area of the display panel 10. That is, the upper end of the display panel 10 may not tilt but may be balanced.

Figure 61:
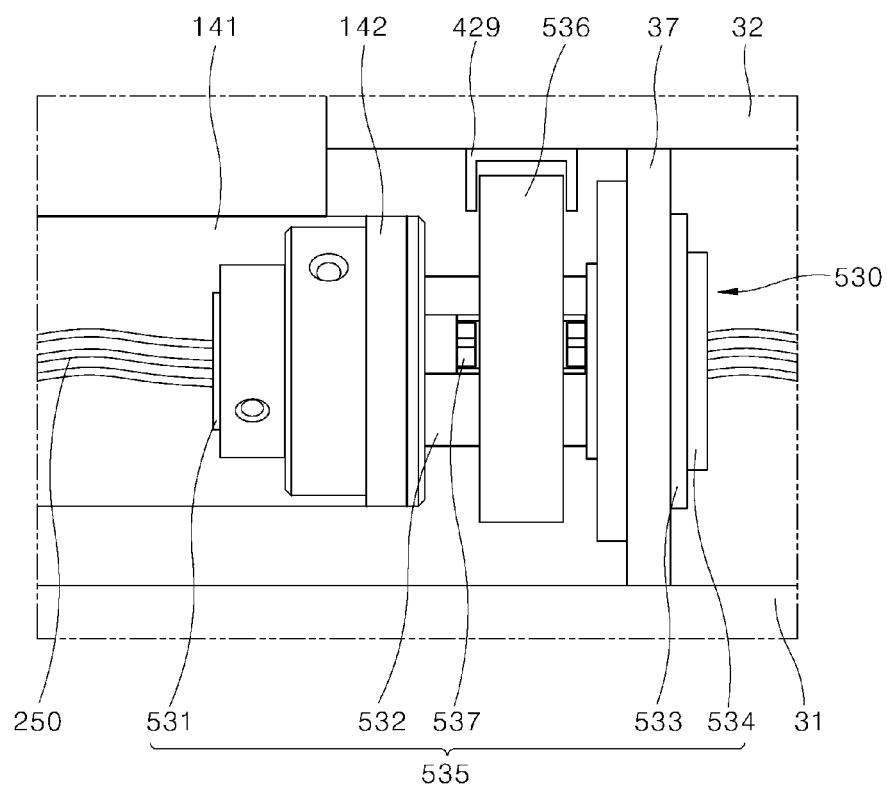
FIG. 61 is a view showing an elastic assembly of an example display device, and an enlarged view of area "A" in FIG. 61.
Figure 62:
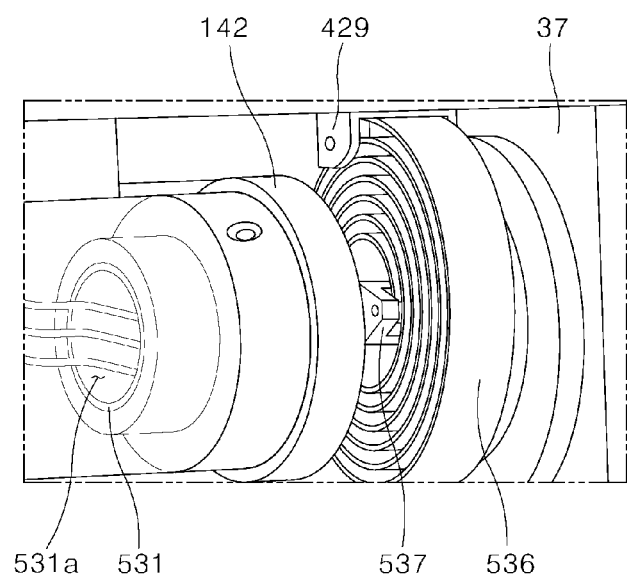
FIG. 62 is a perspective view showing an elastic assembly of an example display device.
Figure 63:
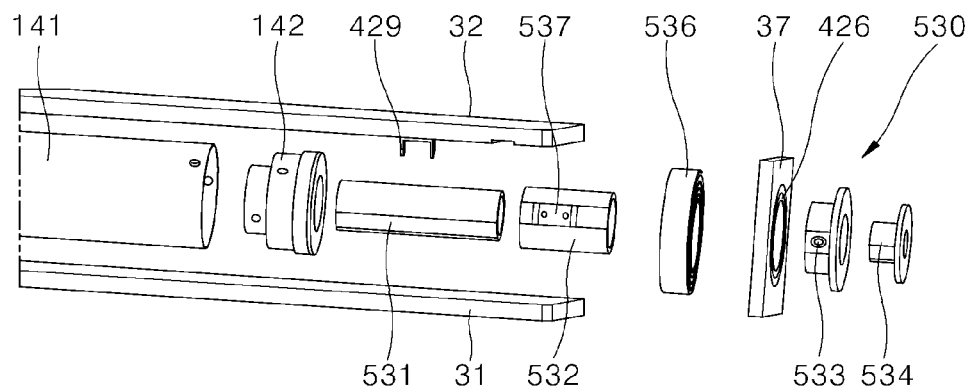
FIG. 63 is an exploded perspective view showing an elastic assembly of an example display device.

FIG. 61 is a view showing an elastic assembly of a display device according to an embodiment of the present disclosure and is an enlarged view of area "A" in FIG. 60. FIG. 62 is a perspective view showing an elastic assembly of a flexible display device according to an embodiment of the present disclosure. FIG. 63 is an exploded perspective view showing an elastic assembly of a flexible display device according to an embodiment of the present disclosure.

Referring to FIGS. 61, 62 and 63, the elastic assembly 530 may include a shaft assembly 535 coupled to an end of the panel roller 143 and an elastic member 536 configured to surround at least part of the shaft assembly 535. One end of the elastic member 536 may be fixed to the shaft assembly 535, and the other end of the elastic member 536 may be fixed to the support frame 39. The elastic assembly 530 may be configured to provide elastic force to the panel roller 143 in the direction in which the flexible display 20 is wound. When the flexible display 20 is wound around the panel roller 143 and disposed in the housing 30, the elastic assembly 530 may provide a first elastic force to the panel roller 143, and, when the flexible display 20 is unwound from the panel roller 143 and drawn out of the housing 30, the elastic assembly 530 may a second elastic force greater than the first elastic force to the panel roller 143.

The shaft assembly 535 may include a guide shaft 531, a cover shaft 532, a guide shaft cap 534, and a cover shaft cap 533.

The guide shaft 531 may have a through hole 531a and extend in the axis direction of the panel roller 143. The cables 250, extending from the timing controller board 105 disposed in the panel roller 143, may pass through the through hole 531a of the guide shaft 531 and escape from the panel roller 143. One end of the guide shaft 531 may be coupled to one end of the panel roller 143. For example, one end of the guide shaft 531 may be coupled to the cover fixation part 142 in a state of being inserted into the cover fixation part 142 of the panel roller 143. The guide shaft 531 and the cover fixation part 142, for example, may be coupled by a bolt or a pin. The other end of the guide shaft 531, for example, may be inserted into the cover shaft cap 533.

The guide shaft cap 534 may be coupled to the other end of the guide shaft 531. For example, a part of the guide shaft cap 534 may be inserted into the other end of the guide shaft 531.

The guide shaft cap 534 may have an opening 534a connected to the through hole 531a of the guide shaft 531. A diameter of the opening 534a of the guide shaft cap 534 may be smaller than a diameter of the through hole 531a of the guide shaft 531.

The cover shaft 532 may surround a part of an outer circumferential surface of the guide shaft 531. The cover shaft 532 may extend in the axis direction of the panel roller 143 and have a shorter length than the guide shaft 531.

The cover shaft cap 533 may be coupled to the other end of the cover shaft 532. For example, an end of the cover shaft 532 may be inserted into the cover shaft cap 533. The guide shaft cap 534 may be coupled to the cover shaft cap 533 in a way that a part of the guide shaft cap 534 is inserted into the cover shaft cap 533. For example, the other end of the guide shaft 531 may be inserted into the cover shaft cap 533, and the guide shaft cap 534 may be coupled to the cover shaft cap 533 in the way that a part of the guide shaft cap 534 is inserted into the other end of the guide shaft 531. The cover shaft cap 533 may surround at least part of the guide shaft cap 534.

The cover shaft cap 533 and the guide shaft cap 534, for example, may be coupled by a bolt or a pin. The cover shaft cap 533 may be rotatably coupled to the side support plate 37 of the support frame 39. A bearing 426 may be provided between the guide shaft cap 533 and the side support plate 37 such that the guide shaft cap 533 is rotatably supported by the side support plate 37.

The elastic member 536 may surround a part of an outer circumferential surface of the cover shaft 532. The elastic member 536, for example, may be a spiral spring. Magnitude of elastic force of the spiral spring may be adjusted as a result of adjustment of a degree to which the spiral spring is wound. One end of the elastic member 536 may be fixed to the cover shaft 532 of the shaft assembly 535, and the other end of the elastic member 536 may be fixed to the second base 32 of the support frame 39. One end of the elastic member 536 may be fixed to the cover shaft 532 by a first fixation part 537 coupled to the outer circumferential surface of the cover shaft 532. The other end of the elastic member 536 may be fixed to the second base 32 by a second fixation part 429 coupled to a lower surface of the second base 32. As the panel roller 143 rotates, the shaft assembly 535 may also rotate. Accordingly, the rotation of the panel roller 143 may result in a change in the magnitude of the elastic force of the elastic member 536. When the panel roller 143 rotates in the direction in which the flexible display 20 is unwound, the elastic force of the elastic member 536 may increase, and, when the panel roller 143 rotates in the direction in which the flexible display 20 is wound, the elastic force of the elastic member 536 my decrease.

When a spring 627 in a panel roller 620 extends along a shaft 625 and has a long length as in the comparative examples of FIGS. 67 and 68, friction noise between the shaft 625 and the spring 627 may be made due to buckling of the spring 627. On the contrary, in one embodiment, the elastic member 536 may not extend along the cover shaft 532 and has a short length. Accordingly, friction noise between the cover shaft 532 and the elastic member may not be made due to the elastic member 536. Additionally, when a spiral spring is used as the elastic member 536, one end of the spiral spring may be fixed to the cover shaft 532 and support the spiral spring. Thus, friction noise may not occur between the cover shaft 532 and the elastic member 536.

In the embodiment, the cover shaft 532 may have an inner diameter greater than an outer diameter of the guide shaft 531 such that the cover shaft is rotatable with respect to the guide shaft to adjust a elastic force of the elastic member 536. The elastic members 536 may be a commercially available product or self-manufactured. In this case, characteristics of a pair of elastic members 536 coupled to both ends of the panel roller 143 may differ. As described above, it is important that the pair of elastic members 536 coupled to both sides of the panel roller 143 provide the same magnitude of elastic force to each end of the panel roller 143, for the display device. To this end, an initial elastic force of the elastic member 536 needs to be adjusted. The initial elastic force may denote elastic force of the elastic member 536 when the flexible display 20 is fully wound around the panel roller 143 and disposed in the housing 30. A method for adjusting the initial elastic force of the elastic member 536 is described hereunder with reference to FIGS. 64 and 65.

Figure 64:
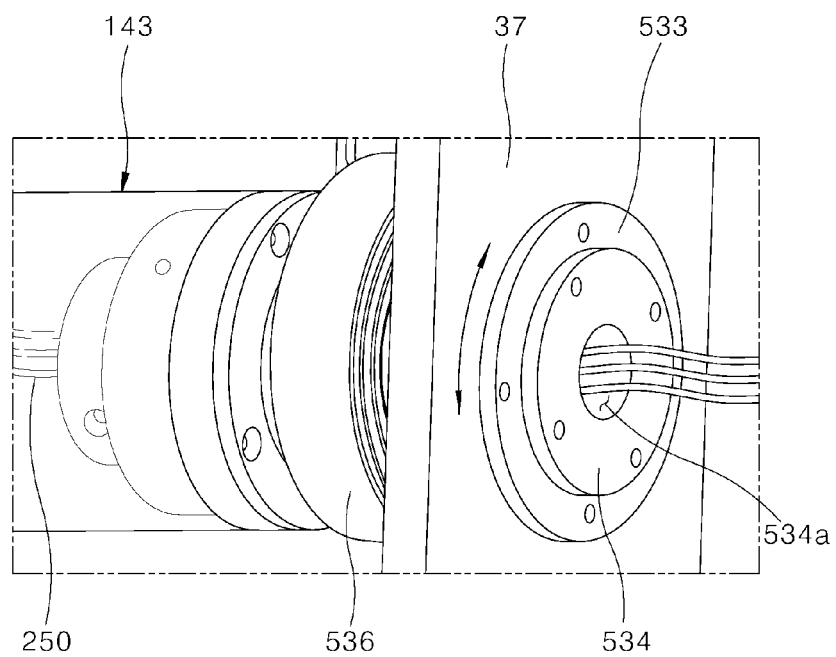
FIGS. 64 and 65 are views for describing a method for controlling elastic force of an elastic assembly of an example display device.
Figure 65:
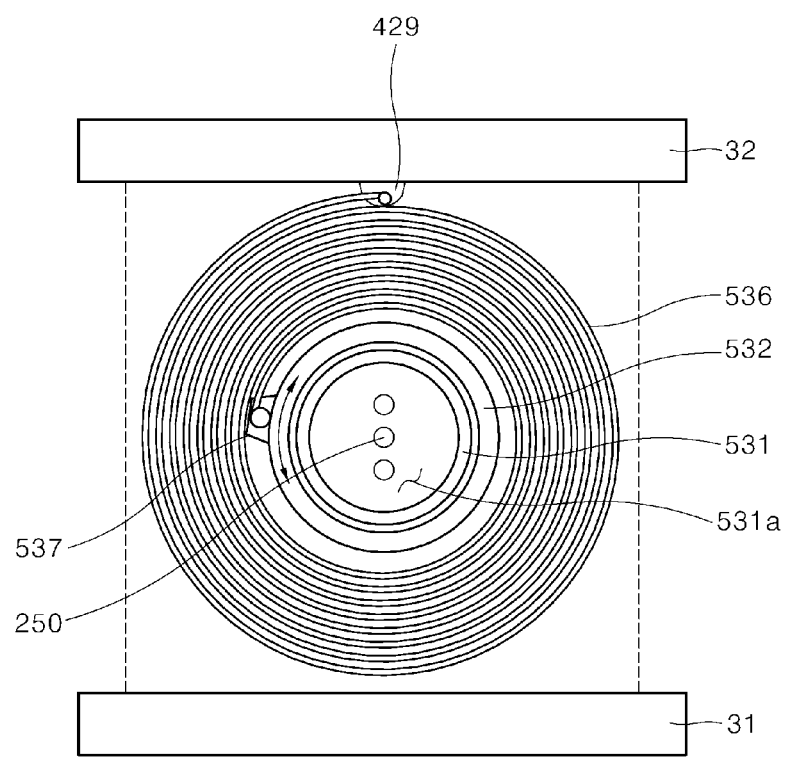

FIGS. 64 and 65 are views for describing a method for adjusting elastic force of an elastic member in an elastic assembly of an example display device.

Referring to FIGS. 64 and 65, one end of the elastic member 536 may be fixed to the cover shaft 532 through the first fixation part 537 coupled to the cover shaft 532, and the other end of the elastic member 536 may be fixed to the support frame 39 through the second fixation part 429 coupled to the second base 32 of the support frame 39. To adjust the elastic force of the elastic member 536, the cover shaft 532 needs to rotate. The cover shaft 532 may be coupled to the cover shaft cap 533. Thus, rotation of the cover shaft cap 533 may result in rotation of the cover shaft 532 and adjustment of the elastic force of the elastic member 536. For example, a clockwise rotation of the cover shaft cap 533 may lead to a clockwise rotation of the cover shaft 532 and a decrease in the elastic force of the elastic member 536, while a counterclockwise rotation of the cover shaft cap 533 may lead to a counterclockwise rotation of the cover shaft 532 and an increase in the elastic force of the elastic member 536.

The elastic assembly 530 disposed at one end of the panel roller 143 is described above. Details in the above description may also be similarly applied to the elastic assembly 530 disposed at the other end of the panel roller 143.

Figure 66:
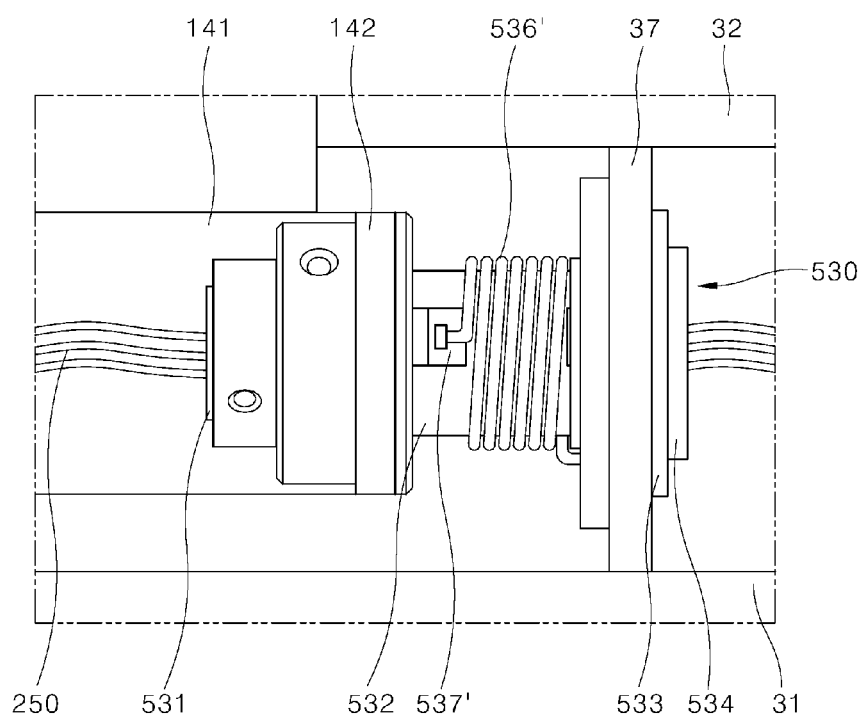
FIG. 66 is a view showing an elastic assembly of an example display device.

FIG. 66 is a view showing an elastic assembly of an example display device.

Referring to FIG. 66, the elastic assembly 530' of the display device may include a shaft assembly 536 and an elastic member 536'. The elastic member 536' may be a torsion spring that surrounds a part of the cover shaft 532. Adjustment of a degree to which the torsion spring is twisted may result in adjustment of magnitude of elastic force of the torsion spring.

One end of the elastic member 536' may be fixed to the cover shaft 532 of the shaft assembly 535, and the other end of the elastic member 536' may be fixed to the side suppler plate 37 of the support frame 39. A fixation groove, into which the other end of the elastic member 536' is inserted, may be formed on the side support plate 37. Alternatively, the other end of the elastic member 536' may be fixed to the second base 32 or the first base 31 of the support frame 39.

A configuration of the shaft assembly 535 is identical or similar to the one described with reference to FIGS. 61 to 65, and specific description in relation to the configuration is omitted. However, a structure and position of a first fixation part 537' may differ from those of the first fixation part 537 in FIG. 61. Unlike the elastic member 536, the elastic member 536' may have one end close to the cover fixation part 142 of the panel roller 143. Accordingly, the first fixation part 537' may be disposes closer to the cover fixation part 142 of the panel roller 143 than the first fixation part 537 on an outer circumferential surface of the cover shaft 532. A fixation groove, into which one end of the elastic member 536' is inserted, may be formed on the outer circumferential surface of the cover shaft 532.

In one embodiment, the rest components of the shaft assembly 535 except the elastic member 536' are identical or similar to those described with reference to FIGS. 61 to 65, and, accordingly, effects thereof may be identical or similar to those described with reference to FIGS. 61 to 65.

FIGS. 67 and 68 are views showing some components of a display device according to a comparative example. The display device according to the comparative example is described with reference to FIGS. 67 and 68.

Referring to FIGS. 67 and 68, the display device according to the comparative example may include a flexible display 20, a source PCB 120, a timing controller board 105, cables 117 configured to connect the source PCB 120 and the timing controller board 105, a roller 600, and a support frame 39.

The flexible display 20, the source PCB 120, the timing controller board 105, the cables 117 and the support frame 39 of the display device according to the comparative example are identical with those described above.

A roller 600 may include a panel roller 620, a shaft 625, an intermediate fixation part 626, a spring 627, a spring fixation part 628, and a shaft fixation part 629. The panel roller 620 may include a roller cover 621 and a cover fixation part 622. The timing controller board 105 may be installed in the roller cover 621, and a cable 250 extending from the timing controller board 105 may connect to the outside only through a single end of the panel roller 620. In the roller 600 of the display device according to the comparative example, the cable 250 extending from the timing controller board 105 may not come out through a left end of the panel roller 620, in which the shaft 625 and the spring 627 are disposed, and may come out inevitably only through a right end of the panel roller 620.

The timing controller board 105 may be disposed in a central area of the roller cover 623. The intermediate fixation part 626 may be disposed at one side of the timing controller board 105 in the roller cover 623, and may be fixed to the roller cover 623. One end of the shaft 625 may be rotatably coupled to the intermediate fixation part 626. The other end of the shaft 625 may be fixed to the shaft fixation part 629. The shaft fixation part 629 may be fixed to the side support plate 37 of the support frame 39. The spring 627 may extend along the shaft 625 while surrounding the shaft 625. One end of the spring 627 may be fixed to the intermediate fixation part 626, and the other end of the spring 627 may be fixed to the spring fixation part 628 coupled to the shaft 627 at a position close to the cover fixation part 622 of the panel roller 620. One end of the spring 627 may rotate as a result of rotation of the panel roller 620, and elastic force of the spring 627 may change. The spring 627 may provide elastic force in a direction in which the flexible display 20 is wound. The spring 627 may be a torsion spring.

The roller 600 of the display device according to the comparative example may include the spring 627 only in one area of the panel roller 620, e.g., a left area in the drawing). Accordingly, a greater elastic force may be provided to a left area of the flexible display 20 connected to a left area of the panel roller 620. With the structure, when the flexible display 20 is unwound from the panel roller 620 and ready to display an image, tension in left and right areas of a display panel 10 may be unbalanced. That is, tension in the left area of the display panel 10 may be greater than tension in the right area of the display panel 10. In the structure where the spring 627 is included only in one area of the panel roller 620, e.g., the left area in the drawing, a height of an upper end of in the left and right areas of the display panel 10 may differ in the state in which the flexible display 20 is unwound from the panel roller 620 and ready to display an image. That is, the upper end of the display panel 10 may tilt and the left end may be lower than the right end.

In the roller 600 of the display device according to the comparative example, the spring 627 may extend along the shaft 625 and has a long length. Accordingly, friction noise between the shaft 625 and the spring 627 may be made due to buckling of the spring 627.

In the embodiments, the housing 30 is disposed at a lower side and the flexible display 20 comes out in an upward direction to display an image. However, the configurations of the embodiments may also be applied to a structure in which the housing 30 is disposed at an upper side and the flexible display 20 comes out in a downward direction to display an image.

The configurations of the embodiments set forth herein may be applied to a fixed terminal such as a digital TV, a desktop computer, digital signage and the like. It may be apparent to one skilled in the art that the configurations are applied not only to a fixed terminal but also to a mobile terminal. The mobile terminal may include a mobile phone, a smartphone, a laptop computer, a digital broadcasting terminal, a personal digital assistant (PDA), a portable multimedia player (PMP), a navigator, a slate PC, a table PC, an ultra-book, a wearable device (e.g., a watch-type terminal (a smartwatch)), a glasses-type terminal (smart glasses), a head mounted display (HMD) and the like.

Some embodiments or other embodiments set forth herein are not exclusive or distinct from each other. Each of the configurations and functions of some or all components of the embodiments may be used in combination with each other or combined.

For example, a configuration "A" in one embodiment and/or the drawings, and a configuration "B" in another embodiment and/or the drawings may be combined with each other. Namely, the configurations may be combined unless stated to the contrary.

Although the embodiments are described above with reference to a number of illustrative embodiments thereof, it should be understood that numerous other modifications and embodiments may be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
    a flexible display configured to display an image;
    a panel roller, wherein the flexible display is wound around or unwound from the panel roller;
    a timing controller board mounted at the panel roller; and
    a pair of elastic assemblies each disposed at respective ends of the panel roller to provide elastic force to the panel roller in a direction in which the flexible display is wound.

2. The display device of claim 1, wherein each of the pair of elastic assemblies comprises a through hole for passing through cables extending from the timing controller board.

3. The display device of claim 1, wherein each of the pair of elastic assemblies comprises:
    a shaft assembly coupled to an end of the panel roller; and
    an elastic member configured to cover at least a part of the shaft assembly.

4. The display device of claim 3, further comprising a support frame configured to rotatably support the shaft assembly, wherein a first end of the elastic member is coupled to the shaft assembly, and a second end of the elastic member is coupled to the support frame.

5. The display device of claim 4, wherein the shaft assembly comprises:
    a guide shaft coupled to the end of the panel roller and comprising a through hole;
    a cover shaft configured to cover a part of an outer circumferential surface of the guide shaft;
    a guide shaft cap coupled to an end of the guide shaft and having an opening configured to communicate the through hole; and
    a cover shaft cap coupled to an end of the cover shaft and configured to cover at least part of the guide shaft cap.

6. The display device of claim 5, wherein the elastic member covers a part of an outer circumferential surface of the cover shaft,
    wherein the cover shaft comprises a fixation part on the outer circumferential surface of the cover shaft, wherein the fixation part is used to couple the first end of the elastic member to the cover shaft.

7. The display device of claim 6, wherein an inner diameter of the cover shaft is greater than an outer diameter of the guide shaft such that the cover shaft is rotatable with respect to the guide shaft to adjust an elastic force of the elastic member.

8. The display device of claim 5, wherein the guide shaft cap is coupled to the cover shaft cap after an elastic force of the elastic member is adjusted.

9. The display device of claim 5, wherein the support frame comprises a first base, a second base, and a side support plate located between the first base and the second base, wherein the cover shaft cap is rotatably coupled to the side support plate of the support frame.

10. The display device of claim 3, wherein the elastic member is a spiral spring.

11. The display device of claim 3, wherein the elastic member is a torsion spring.

12. A display device, comprising:
    a flexible display configured to display an image;
    a panel roller, wherein the flexible display is wound around or unwound from the panel roller;
    a timing controller mounted at the panel roller;
    a pair of elastic assemblies each disposed at respective ends of the panel roller to provide elastic force to the panel roller in a direction in which the flexible display is wound; and
    a support frame configured to rotatably support the elastic assemblies,
    wherein each of the pair of elastic assemblies comprises a through hole for passing through cables extending from the timing controller.

13. The display device of claim 12, wherein each of the elastic assemblies, comprises:
- a guide shaft coupled to an end of the panel roller and comprising the through hole; and
- a cover shaft configured to cover a part of an outer circumferential surface of the guide shaft; and
- an elastic member comprising a first end coupled to the cover shaft.

14. The display device of claim 13, wherein a second end of the elastic member is coupled to the support frame.

15. The display device of claim 13, wherein an inner diameter of the cover shaft is greater than an outer diameter of the guide shaft such that the cover shaft is rotatable with respect to the guide shaft to adjust an elastic force of the elastic member.

16. The display device of claim 13, wherein the elastic member is a spiral sprung.

17. The display device of claim 13, wherein the elastic member is a torsion spring.

* * * * *